United States Patent
Watanabe et al.

(10) Patent No.: US 9,933,872 B2
(45) Date of Patent: Apr. 3, 2018

(54) TOUCH PANEL

(71) Applicant: Semiconductor Energy Laboratory Co., Ltd., Atsugi-shi, Kanagawa-ken (JP)

(72) Inventors: Kazunori Watanabe, Tokyo (JP); Kensuke Yoshizumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 171 days.

(21) Appl. No.: 14/949,961

(22) Filed: Nov. 24, 2015

(65) Prior Publication Data
US 2016/0179259 A1  Jun. 23, 2016

(30) Foreign Application Priority Data
Dec. 1, 2014 (JP) ................. 2014-243346

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 5,565,657 A * | 10/1996 | Merz | ............ G06F 3/0414 178/18.01 |
| 6,972,753 B1 | 12/2005 | Kimura et al. | |
| 7,399,991 B2 | 7/2008 | Seo et al. | |
| 8,367,440 B2 | 2/2013 | Takayama et al. | |
| 8,674,972 B2 | 3/2014 | Kurokawa et al. | |
| 8,823,893 B2 | 9/2014 | Yamazaki | |
| 9,134,864 B2 | 9/2015 | Tamura | |
| 2012/0153970 A1 | 6/2012 | Mignard et al. | |
| 2013/0257798 A1 | 10/2013 | Tamura et al. | |

(Continued)

FOREIGN PATENT DOCUMENTS

| | | |
|---|---|---|
| JP | 2000-172444 | 6/2000 |
| JP | 2002-324673 | 11/2002 |

(Continued)

*Primary Examiner* — Gustavo Polo
(74) *Attorney, Agent, or Firm* — Fish & Richardson, P.C.

(57) ABSTRACT

An input device or an input/output device with higher sensing accuracy is provided. An input device or an input/output device with higher detection sensitivity is provided. A display device or an input/output device with high visibility is provided. A plurality of conductive layers arranged in a matrix has an outline including a linear portion parallel to a direction along an outline of a display region of a display portion and linear portions of adjacent two conductive layers face each other. Furthermore, in the plurality of conductive layers arranged in a matrix, a plurality of conductive layers arranged in a line in an oblique direction to the outline of the display portion are electrically connected to each other. Alternatively, a plurality of conductive layers arranged in a zigzag line along the outline of the display portion are electrically connected to each other.

14 Claims, 38 Drawing Sheets

(56) References Cited

U.S. PATENT DOCUMENTS

| | | |
|---|---|---|
| 2013/0321366 A1 | 12/2013 | Kozuma et al. |
| 2014/0043546 A1 | 2/2014 | Yamazaki et al. |
| 2014/0240617 A1 | 8/2014 | Fukutome et al. |
| 2014/0285732 A1 | 9/2014 | Tanabe et al. |
| 2014/0306260 A1 | 10/2014 | Yamazaki et al. |
| 2015/0062525 A1 | 3/2015 | Hirakata |
| 2015/0144920 A1 | 5/2015 | Yamazaki et al. |
| 2015/0255518 A1 | 9/2015 | Watanabe et al. |

FOREIGN PATENT DOCUMENTS

| | | |
|---|---|---|
| JP | 2003-174153 | 6/2003 |
| JP | 2012-256819 | 12/2012 |
| JP | 2014-508337 | 4/2014 |

* cited by examiner

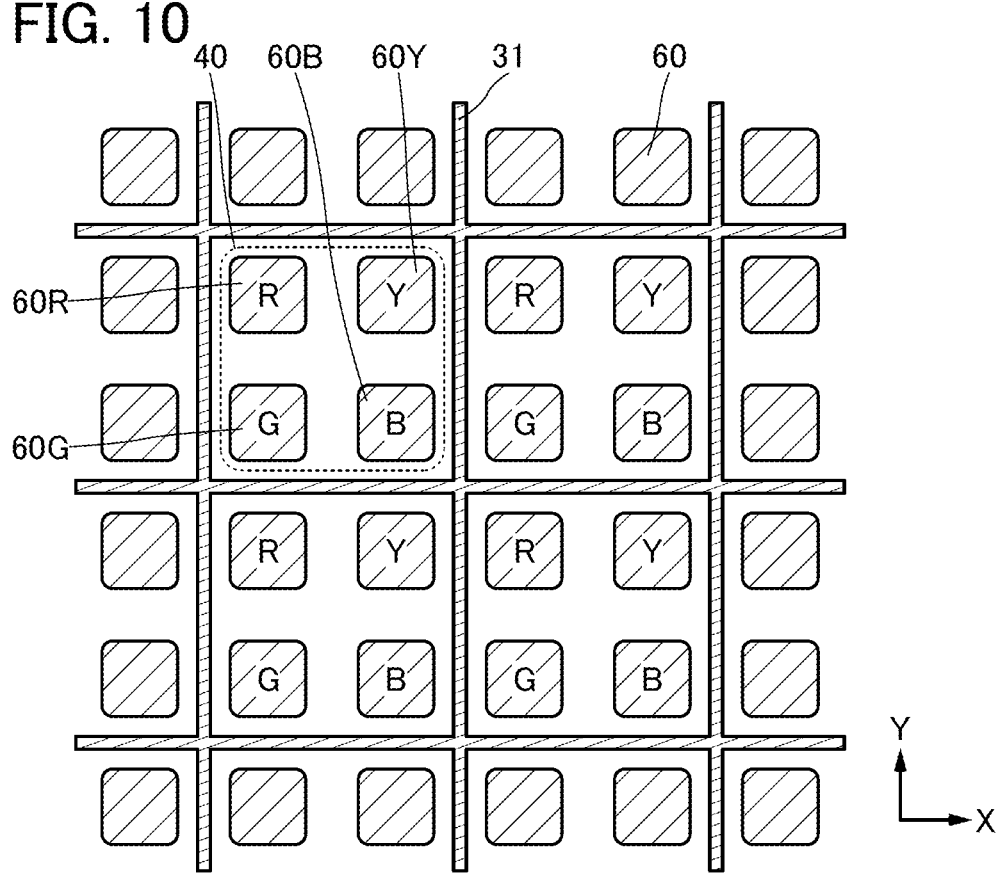

Writing Preriod 3510
3511

Sensing Period 3510
3511

FIG. 35A
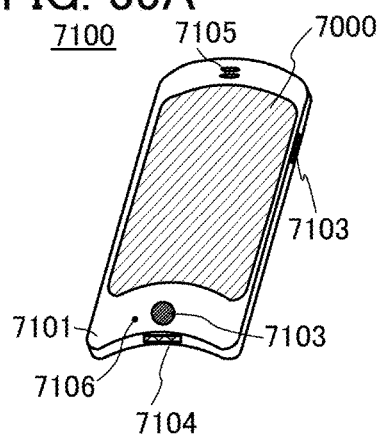
FIG. 35B1
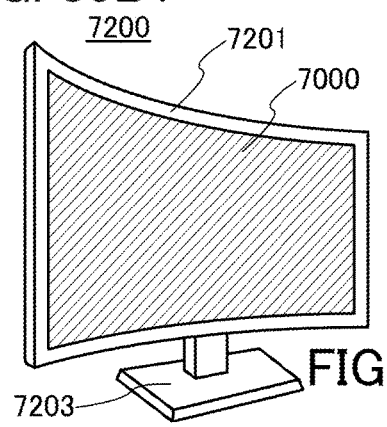
FIG. 35B2
FIG. 35C1
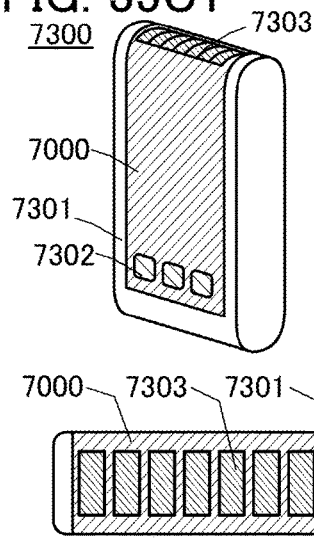
FIG. 35D
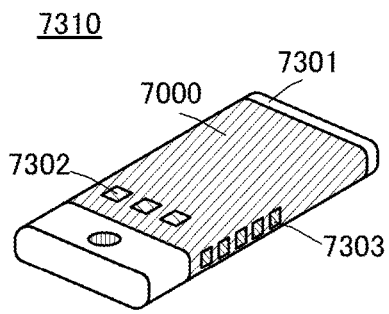
FIG. 35E
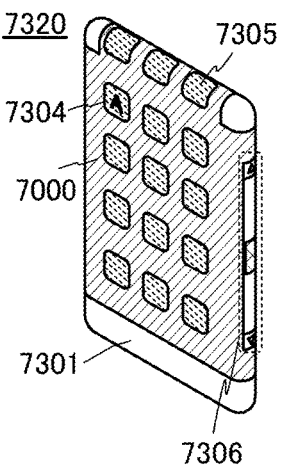
FIG. 35C2
FIG. 35F
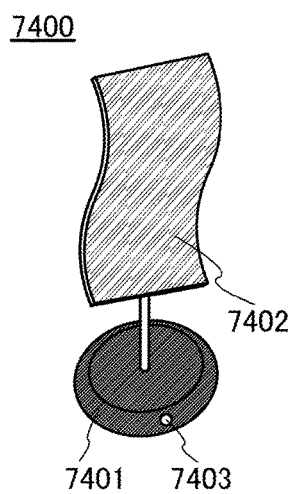
FIG. 35G
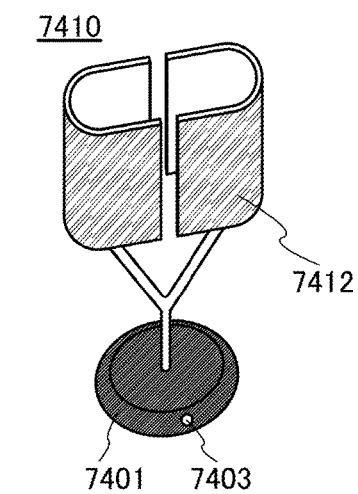
FIG. 35H
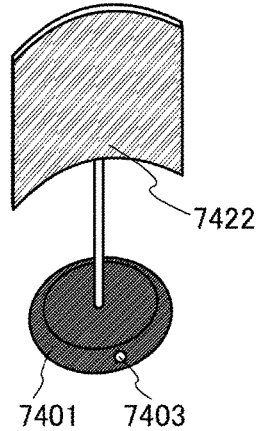

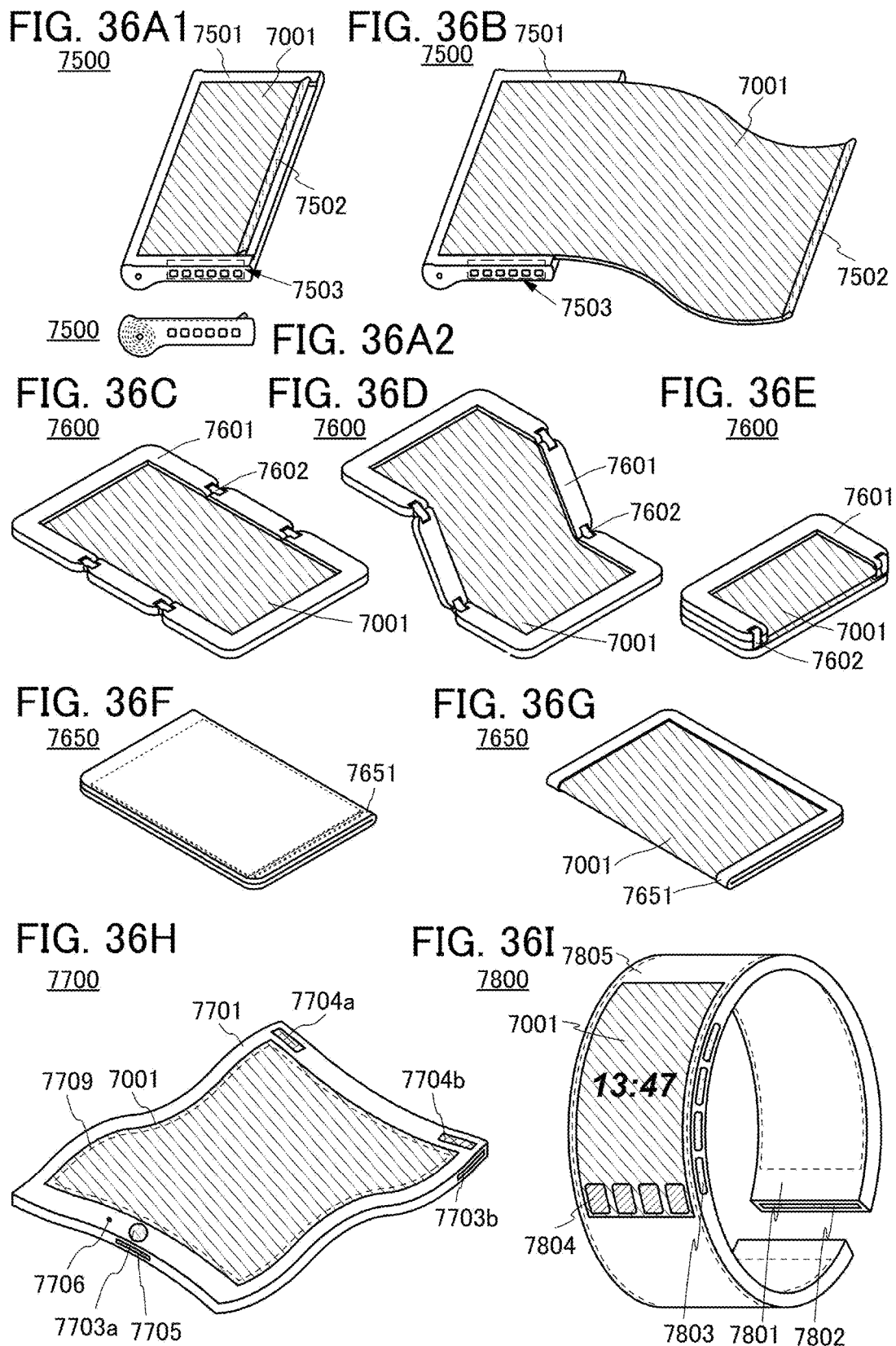

TOUCH PANEL

BACKGROUND OF THE INVENTION

1. Field of the Invention

One embodiment of the present invention relates to an input device. One embodiment of the present invention relates to a display device. One embodiment of the present invention relates to an input/output device. Specifically, one embodiment of the present invention relates to a touch panel.

2. Description of the Related Art

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

2. Description of the Related Art

In recent years, a display device provided with an input device such as a touch sensor as a position-input means has been in practical use. A display device provided with a touch sensor is called a touch panel, a touch screen, or the like (the display device is hereinafter also referred to simply as a touch panel). For example, a smartphone and a tablet terminal are examples of a portable information terminal provided with a touch panel.

Examples of the display device include, typically, a liquid crystal display device including a liquid crystal element, a light-emitting device including a light-emitting element such as an organic electroluminescent (EL) element or a light-emitting diode (LED), and electronic paper performing display by an electrophoretic method or the like.

For example, in a basic structure of an organic EL element, a layer containing a light-emitting organic compound is provided between a pair of electrodes. By voltage application to this element, the light-emitting organic compound can emit light. A display device including such an organic EL element does not need a luminous source such as backlight which is necessary for liquid crystal display devices and the like; therefore, thin, lightweight, high contrast, and low power consumption display devices can be obtained. Patent Document 1, for example, discloses an example of a display device using organic EL elements.

In a touch panel, a pressure-sensitive sensor array or a capacitive sensor array is provided so as to overlap with a display panel, for example; by touching a substrate of the sensor array with a finger or an input pen (also referred to as a stylus), the touched position is sensed.

Patent Document 2 discloses a structure of a touch panel in which a touch sensor is provided on a display screen of an electroluminescence display device.

REFERENCE

Patent Document

[Patent Document 1] Japanese Published Patent Application No. 2002-324673
[Patent Document 2] Japanese Published Patent Application No. 2000-172444

SUMMARY OF THE INVENTION

In order to obtain positional information of an object touching a touch sensor or a touch panel more precisely, a touch sensor with higher sensitivity is required.

An object of one embodiment of the present invention is to provide an input device or an input/output device with higher sensing accuracy. Another object is to provide an input device or an input/output device with higher detection sensitivity. Another object is to provide a display device or an input/output device with higher visibility.

Note that the descriptions of these objects do not disturb the existence of other objects. In one embodiment of the present invention, there is no need to achieve all the objects. Note that other objects can be derived from the description of the specification, the drawings, the claims, and the like.

One embodiment of the present invention is a touch panel including a first conductive layer, a second conductive layer, a third conductive layer, a fourth conductive layer, and a display portion. The display portion has an outline including a portion parallel to a first direction and a portion parallel to a second direction intersecting with the first direction. The display portion includes a plurality of display elements. The plurality of display elements are arranged at regular intervals in the first direction and the second direction. The first to the fourth conductive layers and the display portion partly overlap with each other. The first conductive layer and the second conductive layer are arranged in the first direction. The third conductive layer and the fourth conductive layer are arranged in the first direction. The first conductive layer and the third conductive layer are arranged in the second direction. The second conductive layer and the fourth conductive layer are arranged in the second direction. The first conductive layer and the fourth conductive layer are electrically connected to each other through a first connection portion. The second conductive layer and the third conductive layer are electrically connected to each other through a second connection portion. The first connection portion and the second connection portion partly intersect with each other.

In the above touch panel, the first to the fourth conductive layers each preferably have an outline partly including a first portion that is a linear portion parallel to the first direction and a second portion that is a linear portion parallel to the second direction, in a plan view. It is preferable that the second portion of the first conductive layer and the second portion of the second conductive layer be provided so as to face each other, the first portion of the first conductive layer and the first portion of the third conductive layer be provided so as to face each other, and the first portion of the second conductive layer and the first portion of the fourth conductive layer be provided so as to face each other.

In the above, it is preferable that the touch panel further include a fifth conductive layer positioned on the side opposite to the first conductive layer with the fourth conductive layer provided therebetween. Alternatively, it is preferable that the touch panel further include a fifth conductive layer positioned on the side opposite to the first conductive layer with the third conductive layer provided therebetween. In either case, it is preferable that the fourth conductive layer and the fifth conductive layer be electrically connected through a third connection portion.

In the above touch panel, it is preferable that the first to the fourth conductive layers each have a lattice shape where stripes are parallel to the first direction and the second direction. In this case, openings of the lattice preferably overlap with the display elements.

In the above, it is preferable that the touch panel include a first substrate and a second substrate, and the first to the fourth conductive layers and the display elements be provided between the first substrate and the second substrate.

In the above touch panel, it is preferable that one of the first connection portion and the second portion and the first to the fourth conductive layers be formed on the same surface. Alternatively, it is preferable that the first conductive layer, the fourth conductive layer, and the first connection portion be formed on a first surface, and the second conductive layer, the third conductive layer, and the second connection portion be formed on a second surface.

In the above touch panel, it is preferable that the distance between the first conductive layer and the second conductive layer and the distance between the first conductive layer and the third conductive layer be each greater than or equal to 1 µm and less than or equal to 10 mm.

Another embodiment of the present invention is a touch panel module including the above touch panel and an FPC. Another embodiment of the present invention is an electronic device including the above touch panel or the above touch panel module, and at least one of an antenna, a button, a battery, a speaker, a microphone, and a lens.

According to one embodiment of the present invention, an input device or an input/output device with higher sensing accuracy can be provided. Alternatively, an input device or an input/output device with higher detection sensitivity can be provided. Alternatively, an input/output device with high visibility can be provided. Alternatively, a novel input device or a novel input/output device can be provided.

Note that the descriptions of these effects do not disturb the existence of other effects. One embodiment of the present invention does not necessarily achieve all the effects listed above. Other effects can be derived from the description of the specification, the drawings, the claims, and the like.

BRIEF DESCRIPTION OF THE DRAWINGS

In the accompanying drawings:

FIG. 10 illustrates a structure example of a touch panel of one embodiment;

FIGS. 35A, 35B1, 35B2, 35C1, 35C2, and 35D to 35H illustrate examples of electronic devices and lighting devices of embodiments;

FIGS. 36A1, 36A2, and 36B to 36I illustrate examples of electronic devices of embodiments;

DETAILED DESCRIPTION OF THE INVENTION

Figure 1A:
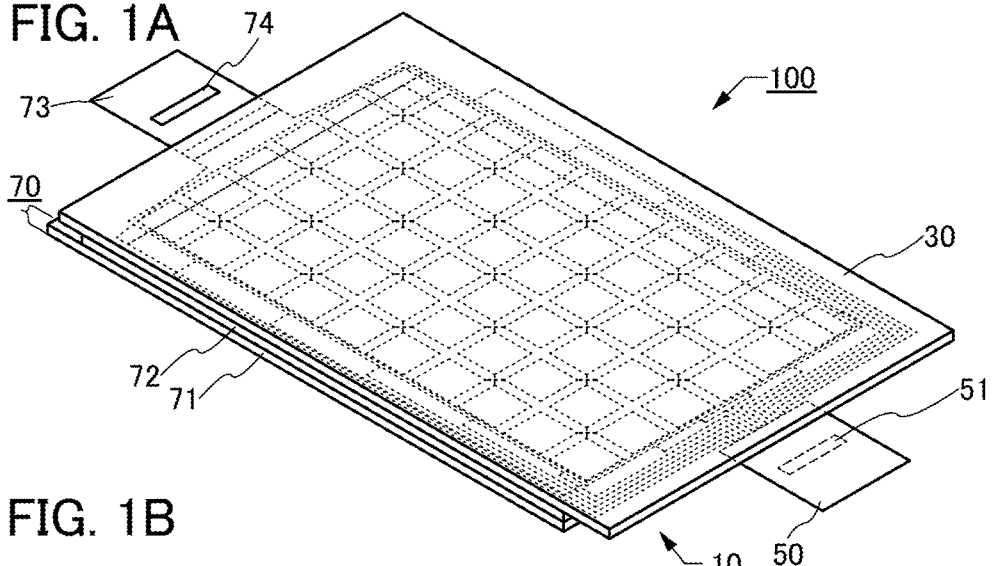
FIGS. 1A to 1C illustrate a structure example of a touch panel of one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

A transistor is a kind of semiconductor elements and can achieve amplification of current or voltage, switching operation for controlling conduction or non-conduction, or the like. A transistor in this specification is an insulated-gate field effect transistor (IGFET) or a thin film transistor (TFT), for example.

Embodiment 1

In this embodiment, a structure example of an input device (a touch sensor) of one embodiment of the present invention, and a structure example of an input/output device (a touch panel) including the input device of one embodiment of the present invention and a display device (a display panel) are described with reference to drawings.

Note that in this specification and the like, a touch panel has a function of displaying or outputting an image or the like on or to a display surface and a function as a touch sensor capable of detecting contact or proximity of an object such as a finger or a stylus on or to the display surface. Therefore, the touch panel is one embodiment of an input/output device.

In this specification and the like, a display panel has a function of displaying an image or the like on a display surface, and thus is one embodiment of an output device. In this specification and the like, a touch sensor has a function of detecting an object and thus is one embodiment of an input device. Therefore, a structure including the display panel (output device) and the touch sensor (input device) can also be referred to as a touch panel.

In this specification and the like, a structure in which a connector such as a flexible printed circuit (FPC) or a tape carrier package (TCP) is attached to a substrate of a touch panel, or a structure in which an integrated circuit (IC) is directly mounted on a substrate by a chip on glass (COG) method or the like is referred to as a touch panel module or simply referred to as a touch panel in some cases.

Similarly, a structure in which the connector, the IC, or the like is attached to a substrate of a display panel is referred to as a display panel module, or simply referred to as a display panel in some cases. Furthermore, a structure in which the connector, the IC, or the like is attached to a substrate of a touch sensor is referred to as a touch sensor module, or simply referred to as a touch sensor in some cases.

A capacitive touch sensor that can be used in one embodiment of the present invention includes a pair of conductive layers. A capacitor is formed between the pair of conductive layers. The capacitance of the pair of conductive layers changes when an object gets close to the pair of conductive layers. Utilizing the difference in capacitance, detection can be conducted. The capacitor formed by the pair of conductive layers are provided in a matrix; thus, positional information can be obtained.

Examples of the capacitive touch sensor are a surface capacitive touch sensor and a projected capacitive touch sensor. Examples of the projected capacitive touch sensor are a self-capacitive touch sensor and a mutual capacitive touch sensor. The use of the mutual capacitive touch sensor is preferable because simultaneous detection of multiple points can be performed easily.

The pair of conductive layers of one embodiment of the present invention has an outline partly including a linear portion in a plan view. The linear portions of the two conductive layers face and are parallel to each other. With such a structure, the capacitance between the two conductive layers can be increased. In a portion where the two conductive layers face each other, lines of electric force generated when a potential difference is applied between the two conductive layers are distributed at a uniform density. Therefore, the difference of detection sensitivity depending on positions can be reduced. Thus, a touch sensor with higher sensing accuracy can be obtained.

The touch panel of one embodiment of the present invention includes a touch sensor and a display panel (a display device) that displays an image. The touch sensor is provided to overlap with a display surface of the display panel.

In one embodiment of the present invention, a plurality of conductive layers arranged in a matrix can be used as the pair of conductive layers. The plurality of conductive layers is preferably arranged so as to have an outline including a linear portion that is parallel to a direction along an outline of a display region of a display portion. With such a structure, edge portions (outlines) of the conductive layers can be arranged so as not to cross a display element of a pixel of the display portion. As a result, light scattering from the pixel at the edge portions of the conductive layers can be suppressed and thus visibility is improved.

When focusing on 2×2 (four) conductive layers in the plurality of conductive layers, the following structure is preferably employed. That is, two adjacent conductive layers are arranged so that linear portions thereof face each other. Furthermore, it is preferable that two conductive layers that are positioned diagonally be electrically connected through a connection portion, and two connection portions intersect with each other. With such a structure, when focusing on one conductive layer, large capacitance can be formed between the one conductive layer and four conductive layers adjacent to the one conductive layer. Thus, sensing accuracy can be further increased.

In the plurality of conductive layers arranged in a matrix, it is preferable that a plurality of conductive layers arranged in a line in an oblique direction to the outline of the display portion be electrically connected. Alternatively, it is preferable that a plurality of conductive layers arranged in a zigzag line along the outline of the display portion be electrically connected.

In addition, it is preferable that the display element of the display panel and the pair of conductive layers of the touch sensor be provided without overlapping with each other. Specifically, it is preferable that the pair of conductive layers of the touch sensor have a top surface with a lattice shape, and an opening of the lattice overlap with the display element. With such a structure, a decrease in luminance of an image displayed on the touch panel can be prevented, and the touch panel can have higher visibility. Furthermore, loss of luminance can be minimized; thus, power consumption can be reduced.

Specifically, the following structure can be employed for example.

Structure Example 1

Structure examples of an input device, an output device, and an input/output device each of which are one embodiment of the present invention are described below with reference to drawings.

Structure Example of Touch Panel

Figure 1B:
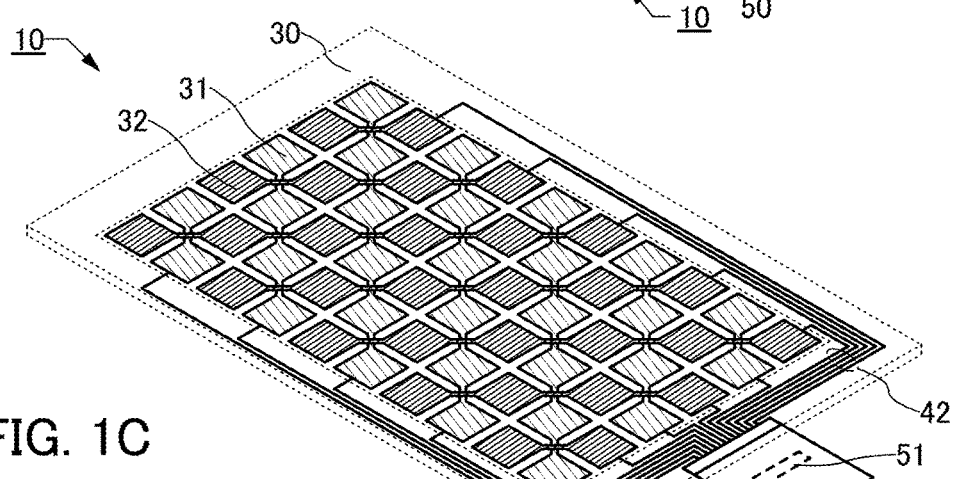
Figure 1C:
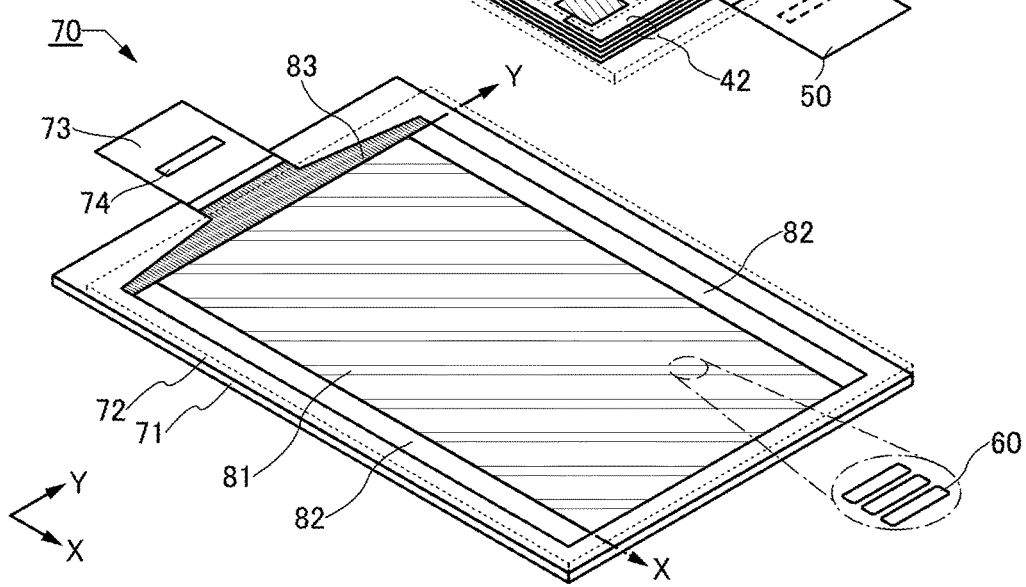

FIG. 1A is a schematic perspective view of a touch panel 100 of one embodiment of the present invention. FIGS. 1B and 1C are schematic perspective developed views of FIG. 1A. Note that only main components are illustrated for simplicity. In FIGS. 1B and 1C, as to some components (a substrate 30, a substrate 71, and the like), only their outlines are shown by the broken lines.

The touch panel 100 includes an input device 10 and a display panel 70 that overlap with each other.

As the input device 10, a capacitive touch sensor can be used, for example. Here, the case of using a projected capacitive touch sensor is described.

Note that one embodiment of the present invention is not limited to this example, and any of a variety of sensors capable of detecting the proximity or touch of an object, such as a finger or a stylus, can be used as the input device 10.

Note that a specific structure of the input device 10 will be described later.

The display panel 70 includes the substrate 71 and a substrate 72 that face each other. A display portion 81, a driver circuit 82, a wiring 83 and the like are provided over the substrate 71. The substrate 71 is also provided with an FPC 73 which is electrically connected to the wiring 83. Here, an example is illustrated in which an IC 74 is provided over the FPC 73.

The display portion 81 is a region where an image is displayed, and includes a plurality of pixels. FIG. 1C is a schematic view illustrating enlarged part of the display portion 81. The pixel includes at least one display element 60. The pixel preferably includes a transistor and the display element 60. As the display element 60, typically, a light-emitting element such as an organic EL element, a liquid crystal element, or the like can be used.

For the driver circuit 82, a circuit that can drive the pixels in the display portion 81, such as a scan line driver circuit or a signal line driver circuit, can be used. Here, an example where a scan line driver circuit is used as the driver circuit 82 is described.

The wiring 83 is capable of transferring a signal or an electric power to the display portion 81 or the driver circuit 82. The signal or power is input to the wiring 83 from the outside or the IC 74 through the FPC 73.

The display portion 81 includes a plurality of scan lines (also referred to as gate lines) (not shown) that are electrically connected to the driver circuit 82. The scan line is a wiring that is electrically connected to a gate of a transistor in the pixel. The driver circuit 82 can sequentially supply the scan lines with signals each of which selects a plurality of pixels electrically connected to the scan lines.

The display portion 81 preferably has an outline including two or more linear portions. FIGS. 1A to 1C show the case where the outline of the display portion 81 is a rectangle. Here, in the outline of the display portion 81, a direction parallel to one of two adjacent sides (two linear portions forming one angle) is referred to as an X direction, and a direction parallel to the other side is referred to as a Y direction. In FIGS. 1A to 1C, the long-side direction and the short-side direction are referred to as the X direction and the Y direction, respectively. The X direction and the Y direction each can also be referred to as a direction in which the plurality of pixels or the plurality of display elements 60 in the display portion 81 is arranged at regular intervals or a direction parallel to a direction in which wirings (a scan line, a signal line, and a capacitor line) electrically connected to the pixels extend. Furthermore, the X direction and the Y direction may be parallel to the linear portions included in the outlines of the substrate 71 and the substrate 72.

In the case where the outline of the display portion 81 is a rectangle, the X direction and the Y direction are perpendicular to each other. However, they are not necessarily to be perpendicular to each other and an angle therebetween may be less than 90°. For example, the angle between the X direction and the Y direction may be greater than or equal to 30° and less than or equal to 90°, preferably greater than or equal to 45° and less than or equal to 90°, further preferably greater than or equal to 60° and less than or equal to 90°. In this specification, and the like, an angle between two straight lines means an angle on an acute angle side. That is, in the case where the angle between the X direction and the Y direction is $\alpha°$ ($\alpha°$ is greater than or equal to 0° and less than or equal to 90°), there are two cases where an interior angle is $\alpha°$ and where an interior angle is $180-\alpha°$.

In the case where the outline of the display portion 81 is a triangle or a polygon having five or more angles, such as a pentagon, respective directions parallel to any adjacent two sides in the outline of the display portion 81 can be referred to as the X direction and the Y direction. Furthermore, in the case where the display portion 81 has a curved outline not have two adjacent linear portions, the X direction and the Y direction can be replaced with the direction parallel to an arrangement direction of pixels or display elements, an extending direction of the wirings electrically connected to the pixels, an extending direction of the linear portion of the outline of the substrate 71 or the substrate 72, or the like.

In the example illustrated in FIGS. 1A to 1C, the IC 74 is mounted on the FPC 73 by a chip-on-film (COF) method. As the IC 74, an IC serving as a scan line driver circuit or a signal line driver circuit, for example, can be used. Note that it is possible that the IC 74 is not provided when the display panel 70 includes circuits serving as a scan line driver circuit and a signal line driver circuit or when circuits serving as a scan line driver circuit and a signal line driver circuit are externally provided and a signal for driving the display panel 70 is input through the FPC 73. The IC 74 may be directly mounted on the substrate 71 by a chip-on-glass (COG) method or the like.

Structure Example 1 of Input Device

Figure 2A:
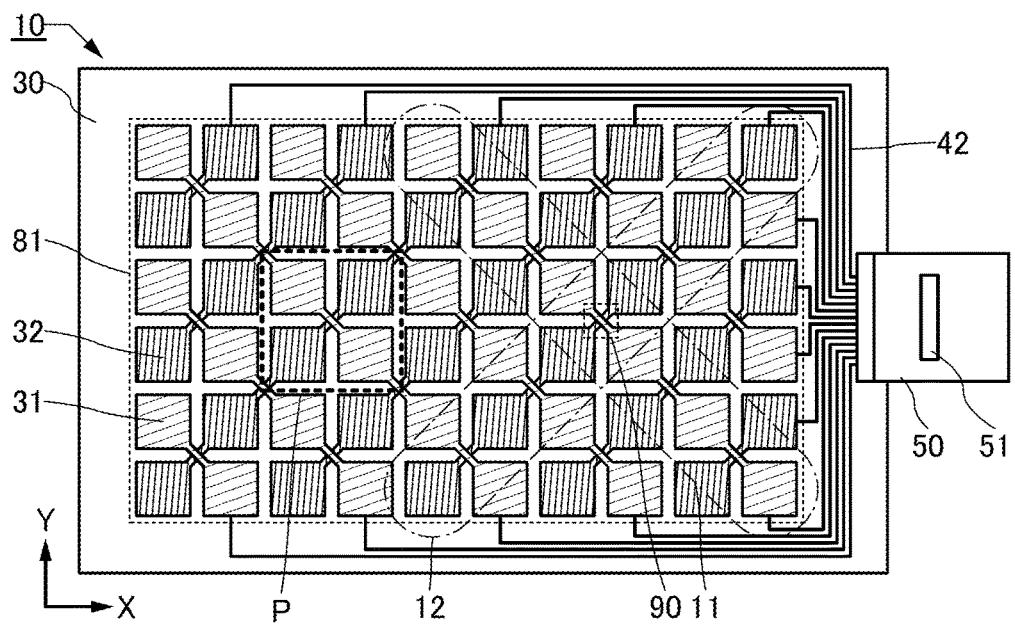
FIGS. 2A and 2B illustrate a structure example of an input device of one embodiment.

FIG. 2A is a schematic top view of the input device 10. In FIG. 2A, the outline of the display portion 81 is shown by the broken line. Also in FIG. 2A, the X direction and the Y direction are shown.

The input device 10 includes a plurality of electrodes 31, a plurality of electrodes 32, and a plurality of wirings 42 over the substrate 30. In addition, the substrate 30 is provided with an FPC 50 that is electrically connected to each of the plurality of wirings 42. FIG. 2A illustrates an example in which the FPC 50 is provided with an IC 51.

The electrodes 31 and the electrodes 32 are arranged in the X and Y directions in a matrix. Furthermore, the electrode 31 and the electrode 32 are alternately arranged in the X and Y directions.

The plurality of electrodes 31 arranged in an oblique direction to the X and Y directions (that is, a direction intersecting with both the X and Y directions) is electrically connected to each other through a plurality of connection portions 33 that is described later. Furthermore, the plurality of electrodes 31 electrically connected to each other through the plurality of connection portions 33 are arranged in a line 11, and a plurality of lines 11 is arranged parallel to one another. The plurality of electrodes 32 arranged in an oblique direction to the X and Y directions is electrically connected through a plurality of connection portions 34 that is described later. Furthermore, the plurality of electrodes 32 electrically connected to each other through the plurality of connection portions 34 is arranged in a line 12, and a plurality of lines 12 is arranged parallel to one another. Here, as shown in FIG. 2A, the line 11 including the electrodes 31 and the line 12 including the electrodes 32 intersect with each other. An intersecting portion of the line 11 and the line 12 is referred to as an intersecting portion 90.

The plurality of lines 11 and the plurality of lines 12 are electrically connected to the FPC 50 through the wirings 42. In the case of a projected capacitive touch sensor, a driving signal is supplied to the lines 11 or lines 12, and current flowing in the other is sensed, whereby positional information of an object that comes in contact with or close to the input device 10 can be obtained. Note that an example of a driving method applicable to the input device 10 is described later.

The extending directions of the line 11 and the line 12 intersect with the X direction and the Y direction. In the case where the X direction and the Y direction are perpendicular to each other, an angle between the extending direction of the line 11 and the X direction is preferably greater than or equal to 40° and less than or equal to 50°, typically, 45°. Similarly, an angle between the extending direction of the line 12 and the X direction is preferably greater than or equal to 40° and less than or equal to 50°, typically, 45°. Furthermore, an angle between the extending directions of the line 11 and the line 12 is preferably greater than or equal to 85° and less than or equal to 90°, typically, 90°.

Here, the number of the electrodes 31 in one line 11 is not always equal to that in another line. Similarly, the number of electrodes 32 in one line 12 is not always equal to that in another line. FIG. 2A shows an example of a structure where the line 11 including six electrodes 31, the line 11 including four electrodes 31, and the line 11 including two electrodes 31 exist. Furthermore, in FIG. 2A, the line 12 including six electrodes 32, the line 12 including four electrodes 32, and the line 12 including two electrodes 32 exist.

The values of time constant (RC) of the line 11 and the line 12 depend on the number of the electrodes 31 and the number of the electrode 32; thus, a difference may occur in the amplitude and the width of output signals. Thus, the input device 10 is preferably driven so as to correct the difference in time constants. For example, the IC 51 may have a function of performing correction. Alternatively, in order to correct the difference in time constants, a structure may be employed in which a capacitor and a resistor each with an appropriate value are electrically connected to the line 11, the line 12, a wiring electrically connected to the line 11 and/or the line 12, or the like.

Figure 2B:
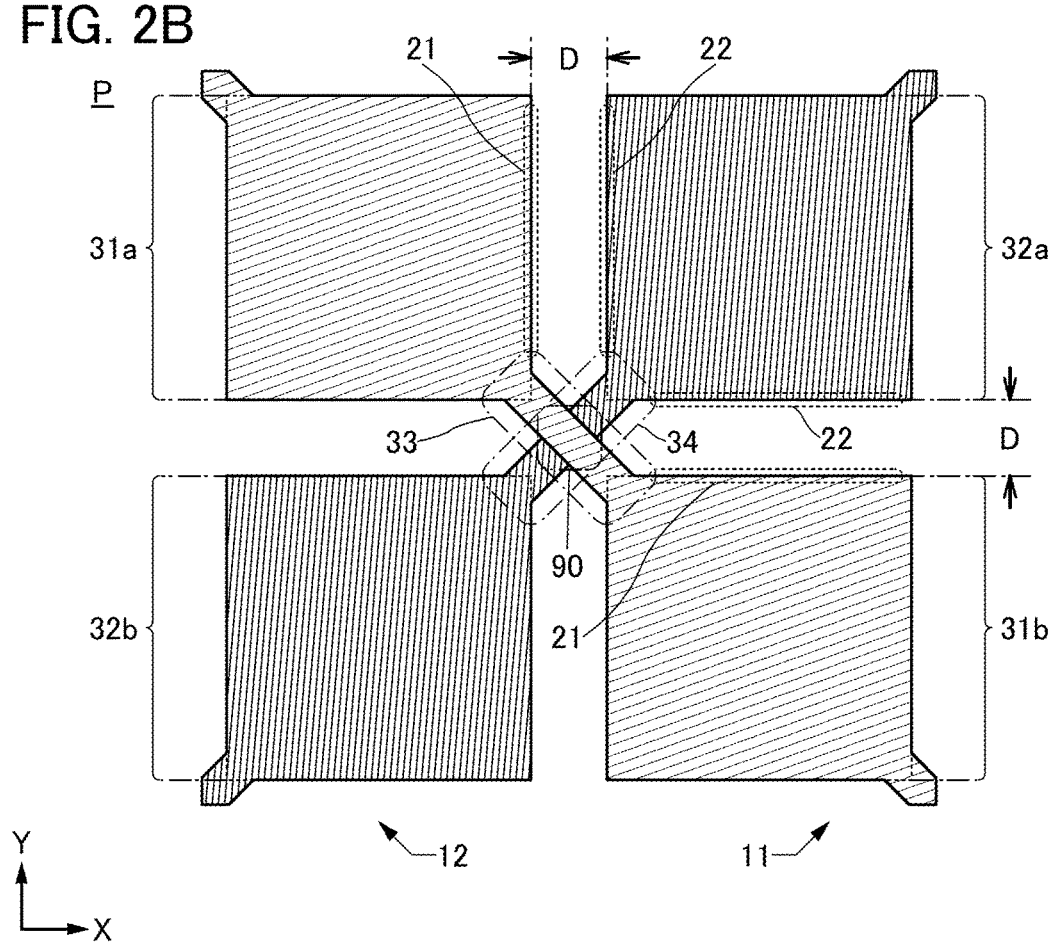

FIG. 2B is an enlarged schematic view of a region P in FIG. 2A. Here, the region P includes two electrodes 31 (electrodes 31a and 31b) and two electrodes 32 (electrodes 32a and 32b) which are adjacent to the intersecting portion 90. In the case where common part to the electrodes 31a and 31b is described, the electrodes 31a and 31b are referred to as electrodes 31 without distinction. Also, in the case where common part to the electrodes 32a and 32b is described, the electrodes 32a and 32b are referred to as electrodes 32 without distinction.

The electrodes 31a and 31b are electrically connected through the connection portion 33. The electrodes 32a and 32b are electrically connected through the connection portion 34. The connection portions 33 and 34 overlap with each other in the intersecting portion 90. An insulating layer is provided between the connection portions 33 and 34 in order to avoid an electrical short-circuit between the connection portions 33 and 34.

The electrodes 31 and 32 each have an outline with a rectangular pattern in a plan view. The outlines of the line 11 and 12 in a plan view have shapes in which the rectangular patterns (that is, the electrodes 31 and the electrodes 32) are connected in the directions intersecting with the X direction and the Y direction through the connection portions 33 and 34. In this case, as shown in FIG. 2B, the rectangular pattern is preferably a square, in which case a pitch for arranging the electrodes 31 and a pitch for arranging the electrodes 32 can be equal to each other. Accordingly, detecting points can be arranged at equal intervals in a matrix in a sensing region of the input device 10, so that sensing accuracy of positional information of an object can be increased.

FIG. 2B shows the case where the electrode 31a, the connection portion 33, and the electrode 31b are integrally formed in the line 11. Similarly, the electrode 32a, the connection portion 34, and the electrode 32b are integrally formed in the line 12. In this case, part of the line 11 including a portion included in at least the intersecting portion 90 can be referred to as the connection portion 33, and part of the line 12 including a portion included in at least the intersecting portion 90 can be referred to as the connection portion 34. In FIG. 2B, a virtual boundary between the electrode 31 and the connection portion 33 is represented by the broken line for simplicity. Also, a virtual boundary between the electrode 32 and the connection portion 34 is represented by the broken line for simplicity.

Part of the outline of the electrode 31 has a linear portion 21. Part of the outline of the electrode 32 has a linear portion 22. The electrodes 31 and 32 are positioned such that the linear portions 21 and 22 face and are parallel to each other. With such a structure, a constant gap is obtained between the electrodes 31 and 32, and the length of the facing portions of the two electrodes can be increased. In a portion where the two electrodes face each other, lines of electric force generated when a potential difference is applied between the two electrodes are distributed at a uniform density. Therefore, the difference of detection sensitivity depending on positions can be reduced. Thus, a touch sensor with higher sensing accuracy can be obtained.

The linear portion 21 of the electrode 31 and the linear portion 22 of the electrode 32 are preferably parallel to the X direction or the Y direction. For example, an angle between the extending direction of the linear portion 21 and the X or Y direction and an angle between the extending direction of the linear portion 22 and the X or Y direction is preferably greater than or equal to 0° and less than or equal to 10°, preferably greater than or equal to 0° and less than or equal to 5°, typically 0°.

A gap between the electrodes 31 and 32 is expressed as a gap D. As the gap D is smaller, the capacitance between the two electrodes can be increased and thus the detection sensitivity can be increased. The size of the gap D is, for example, greater than 0 mm and less than or equal to 10 mm, preferably greater than or equal to 1 μm and less than or equal to 5 mm, more preferably greater than or equal to 3 µm and less than or equal to 1 mm, or still more preferably greater than or equal to 5 µm and less than or equal to 500 µm. Alternatively, the gap D may be the integral multiple of a pitch of arranged pixels or subpixels in the display portion 81, or the integral multiple of a pitch of the arranged display elements 60.

Figure 3:
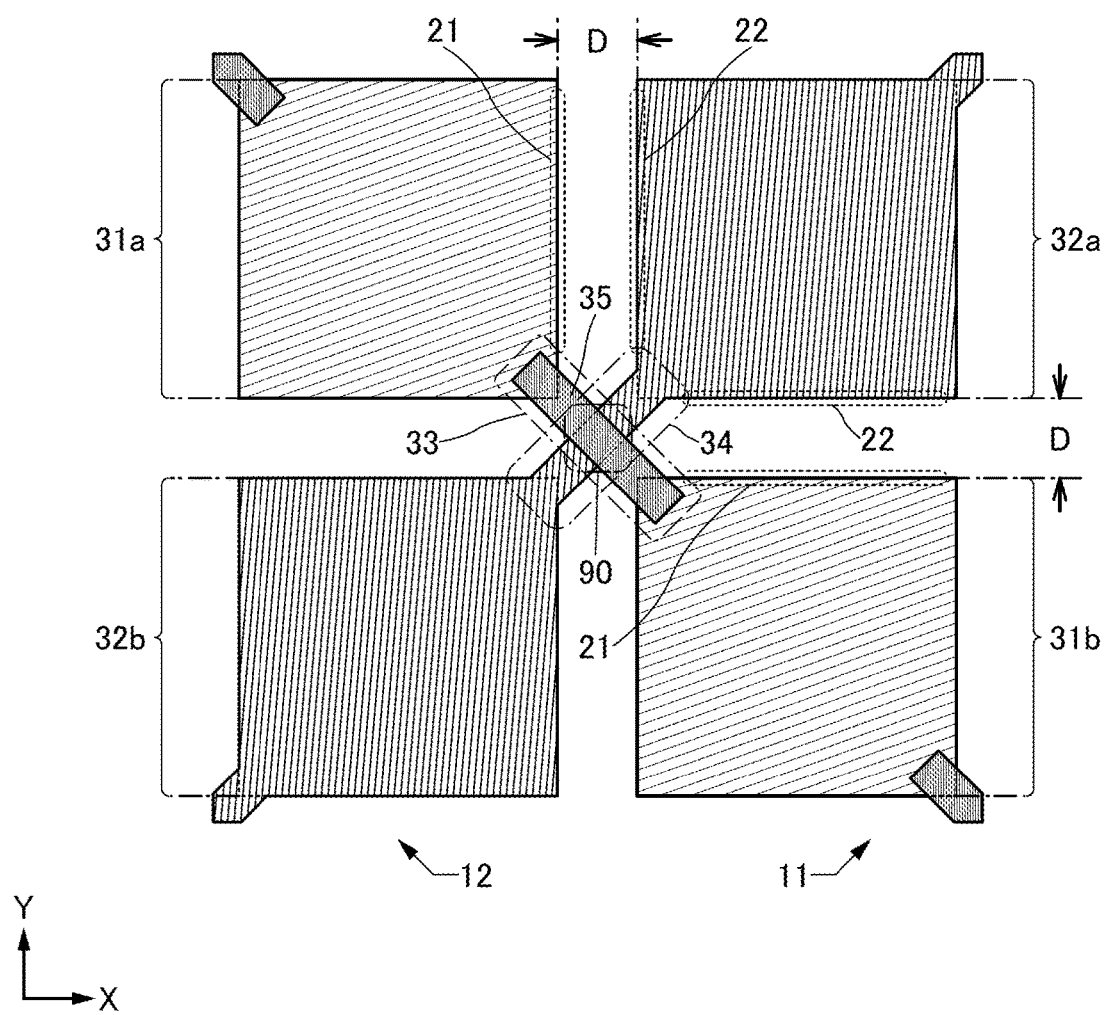
FIG. 3 illustrates a structure example of an input device of one embodiment.

As shown in FIG. 3, a bridge electrode 35 may be formed in the connection portion 33. The electrodes 31a and 31b each of which are processed into an island shape are electrically connected through the bridge electrode 35. The bridge electrode 35 intersects with part of the connection portion 34. Thus, the electrodes 31a, 31b, 32a, 32b, and the connection portion 34 are formed in the same plane, and the distance between the electrodes can be reduced, whereby sensing accuracy can be increased. Note that the bridge electrode 35 is used as the connection portion 33; however, the bridge electrode 35 may be used as the connection portion 34. There is no particular limitation on the positional relation of the bridge electrode 35 and the connection portion 34, and either the bridge electrode 35 or the connection portion 34 may be provided on the substrate 30 side.

Structure Example 2 of Input Device

Described below is a structural example of an input device that is different from the input device in the structural example 1 in a connection method of electrodes. Note that portions which are the same as those described above are not described in some cases.

Figure 4A:
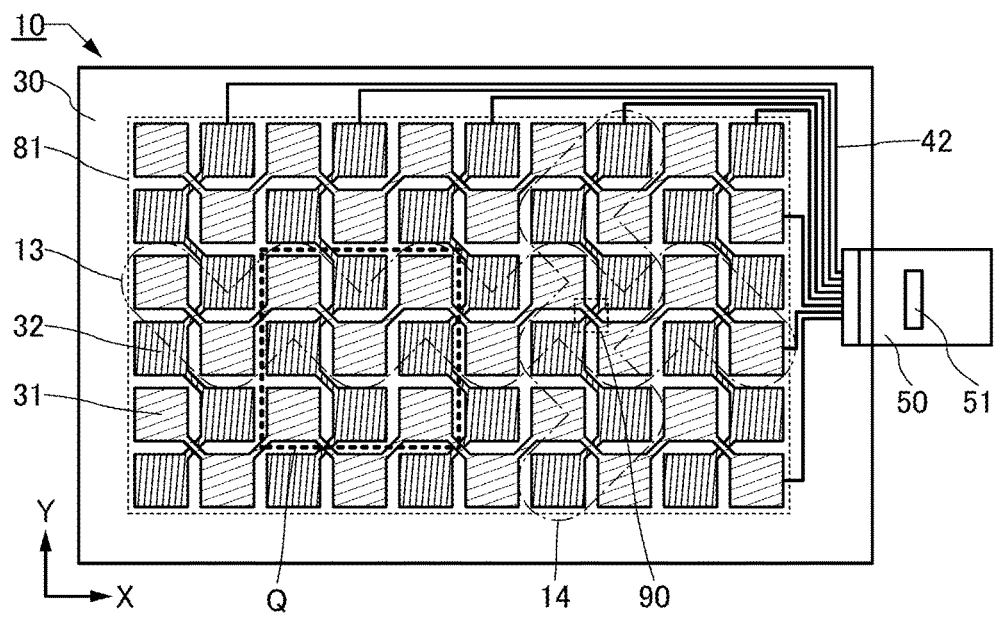
FIGS. 4A and 4B illustrate a structure example of an input device of one embodiment.
Figure 4B:
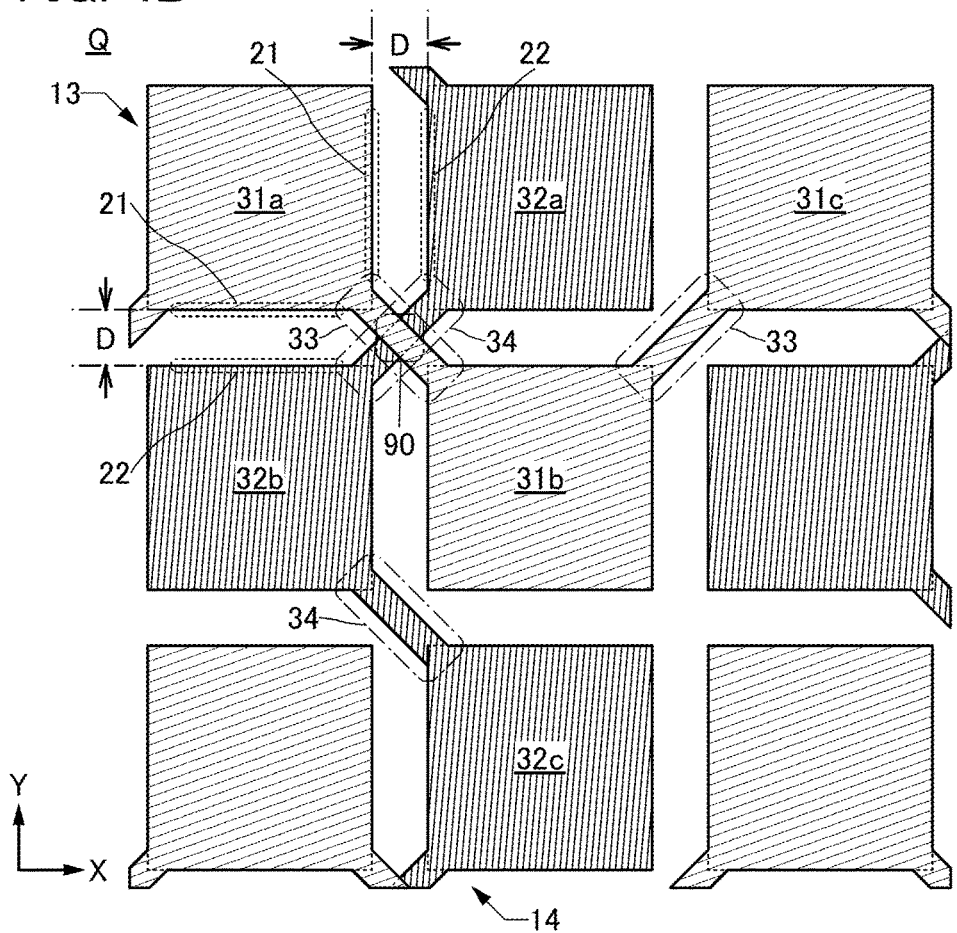

FIG. 4A is a schematic top view of the input device 10 to be described later. FIG. 4B is an enlarged schematic view of a region Q in FIG. 4A.

As shown in FIG. 4A, the input device 10 includes a line 13 and a line 14. The line 13 includes the plurality of electrodes 31 arranged in a zigzag line along the X direction. The line 14 includes the plurality of electrodes 32 arranged in a zigzag line along the Y direction. The intersecting portion 90 is formed in a portion where the line 13 and the line 14 intersect with each other.

FIG. 4B shows three electrodes 31 (the electrode 31a, the electrode 31b, and an electrode 31c) included in the line 13, three electrodes 32 (the electrode 32a, the electrode 32b, and an electrode 32c) included in the line 14, and their periphery.

The electrode 31c is positioned on the side opposite to the electrode 31a when seen from the electrode 32a. That is, the electrode 32a is sandwiched between the electrode 31a and the electrode 31c. The electrode 31a and the electrode 31b are electrically connected through the connection portion 33. Similarly, the electrode 31b and the electrode 31c are electrically connected through the connection portion 33.

The electrode 32c is positioned on the side opposite to the electrode 32a when seen from the electrode 31b. That is, the electrode 31b is sandwiched between the electrode 32a and the electrode 32c. The electrode 32a and the electrode 32b are electrically connected through the connection portion 34. Similarly, the electrode 32b and the electrode 32c are electrically connected through the connection portion 34.

The connection portion 33 positioned between the electrode 31a and the electrode 31b and the connection portion 34 positioned between the electrode 32a and the electrode 32b intersect with each other, and the intersecting portion 90 is formed. However, the intersecting portion 90 is formed neither in the connection portion 33 between the electrode 31b and the electrode 31c nor in the connection portion 34 between the electrode 32b and the electrode 32c.

With such a structure, the number of the electrodes 31 included in each of the plurality of lines 13 can be the same. Similarly, the number of the electrodes 32 included in each of the plurality of lines 14 can be the same. Since it is not necessary to correct the difference in time constants or to add a structure for correcting the difference in time constants in the aforementioned manner, the driving method and the structure can be simplified.

Here, the electrode 31a, the electrode 31b, the electrode 31c, and the connection portion 33 are integrally formed, and the electrode 32a, the electrode 32b, the electrode 32c, and the connection portion 34 are integrally formed; however, as described above, the bridge electrode 35 may be used instead of the connection portion 33 or the connection portion 34.

Here, the width of the line 13 in the Y direction corresponds to the width of two lines in which the electrode 31 and the electrode 32 are alternately arranged in the X direction. Similarly, the width of the line 14 corresponds to the width of two lines in which the electrode 31 and the electrode 32 are alternately arranged in the Y direction. For example, in FIG. 4A, ten electrodes 31 and 32 are alternately arranged in the X direction, six electrodes 31 and 32 are alternately arranged in the Y direction, and three lines 13 and five lines 14 are provided in the X direction and the Y direction, respectively. The sizes of the electrodes 31 and 32, the gap therebetween, and the pitch thereof are made small, so that the number of the lines 13 and 14 and detecting points can be increased. Thus, sensing accuracy of positional information of an object can be increased.

Figure 5A:
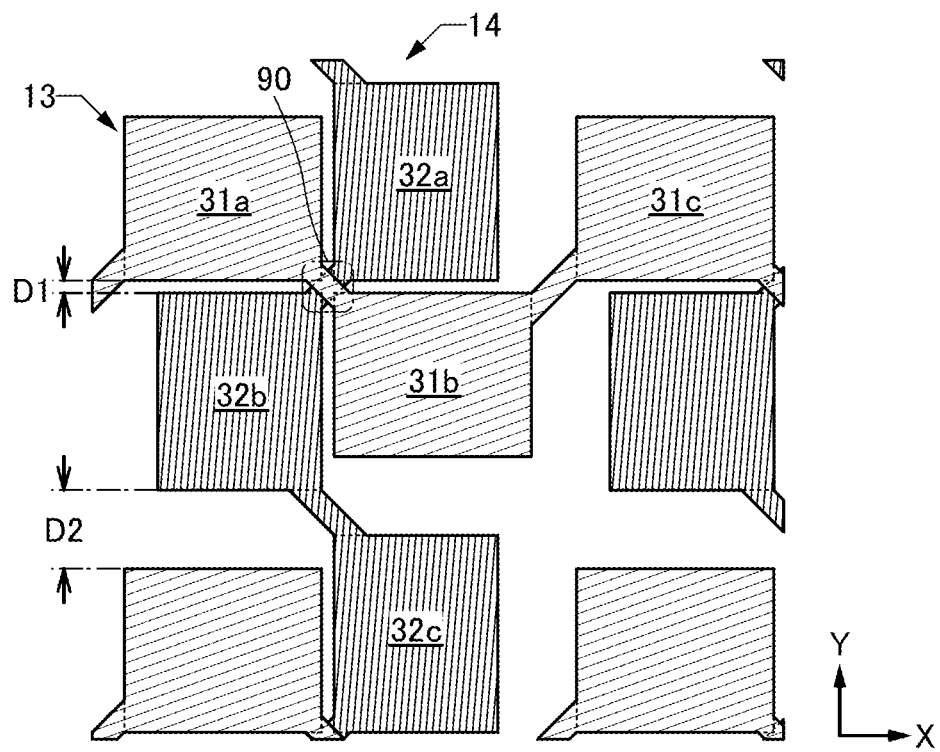
FIGS. 5A and 5B each illustrate a structure example of an input device of one embodiment.

As shown in FIG. 5A, in the four electrodes each adjacent to the intersecting portion 90, a gap D1 between the electrodes 31 and 32 can be made smaller than a gap D2 between the electrodes 31 and 32 in the other part. In that way, the capacitance between the lines 13 and 14 which intersect with each other at the intersecting portion 90 can be increased and the capacitances between adjacent lines 13 and between adjacent lines 14 can be decreased, so that sensing accuracy can be further increased.

Figure 5B:
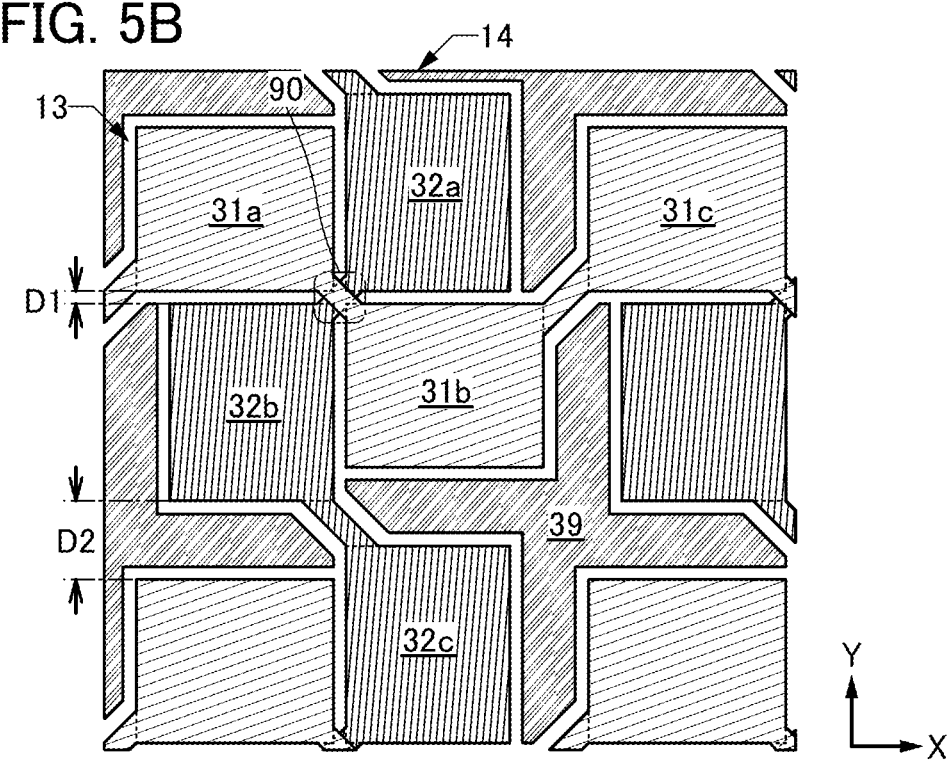

In that case, as shown in FIG. 5B, a dummy electrode 39 may be provided so as to fill a space where the electrodes 31 and the electrodes 32 are not formed. With such a structure, generation of a difference in optical properties (e.g., transmittance, reflectance, and the amount of light scattering) between a portion including the electrodes 31 and 32 and a portion without the electrodes 31 and 32 can be suppressed. Thus, the portion without the electrodes 31 and 32 is less likely to be recognized by a user. It is preferable that the dummy electrode 39 be electrically insulated from the electrodes 31 and 32. Specifically, the dummy electrode 39 is preferably made in an electrically floating state by being not supplied with a specific potential because a decrease in detection sensitivity due to provision of the dummy electrode 39 can be suppressed.

Structure Example of Sensor Electrode

Structure examples of electrodes that can be used for the electrode 31, the electrode 32, and the like are described below. Although electrodes to which the connection method described in the structure example 1 of the input device is applied are described here, the electrodes can be used for the content in the structure example 2 of the input device by a change in the connection method of the electrodes.

When the touch panel 100 is formed in such a manner that the input device 10 is provided over a display surface of the display panel 70, a light-transmitting conductive material is preferably used for the electrodes 31 and the electrodes 32. In the case where a light-transmitting conductive material is used for the electrodes 31 and the electrodes 32 and light from the display panel 70 is extracted through the electrodes 31 or the electrodes 32, it is preferable that a conductive film containing the same conductive material be arranged between the electrodes 31 and the electrodes 32 as a dummy pattern (a dummy electrode). Part of a space between the electrodes 31 and the electrodes 32 is filled with the dummy pattern, which can reduce variation in light transmittance. As a result, unevenness in luminance of light transmitted through the input device 10 can be reduced.

As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

Further, a metal film or an alloy film which is thin enough to have a light-transmitting property can be used. For example, a metal material such as gold, silver, platinum, aluminum, magnesium, nickel, tungsten, chromium, molybdenum, iron, cobalt, copper, palladium, tin, zinc, indium, tantalum, or titanium, or an alloy material containing any of these metal materials can be used. Alternatively, a nitride of the metal material or the alloy material (e.g., titanium nitride), or the like may be used. Alternatively, a semiconductor such as silicon or germanium to which conductivity is imparted by addition of an impurity may be used. Alternatively, a stacked film in which two or more of conductive films containing the above materials are stacked may be used.

For the electrodes 31 and the electrodes 32, a conductive film which is processed to be too thin to see by the user may be used. Such a conductive film is processed into a lattice shape (a mesh shape), for example, which makes it possible to achieve high conductivity and high visibility of the display device. It is preferable that the conductive film have a portion in which the width is greater than or equal to 30 nm and less than or equal to 100 μm, preferably greater than or equal to 50 nm and less than or equal to 50 μm, and further preferably greater than or equal to 50 nm and less than or equal to 20 μm. In particular, the conductive film having the pattern width of 10 μm or less is extremely difficult to see by the user, which is preferable.

Figure 6A:
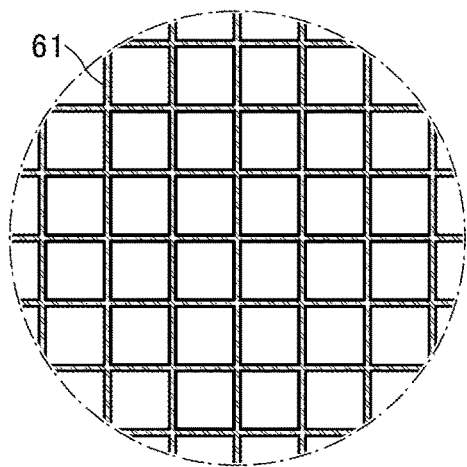
FIGS. 6A to 6D each illustrate a structure example of an input device of one embodiment.

As examples, enlarged schematic views of part of the electrodes 31 or the electrodes 32 are shown in FIGS. 6A to 6D. FIG. 6A shows an example of the case in which a lattice-shaped conductive film 61 is used. The conductive film 61 is preferably placed so as not to overlap the display element 60 included in the display panel 70 because light from the display panel 70 is not blocked. In that case, it is preferable that the direction of the lattice be the same as the direction of the arrangement of the display element 60 and that the pitch of the lattice be an integer multiple of the pitch of the arrangement of the display element 60.

Figure 6B:
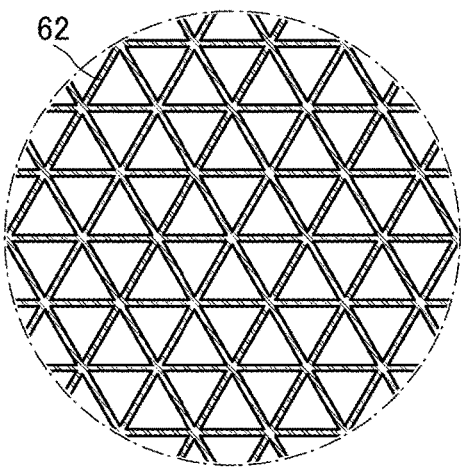

FIG. 6B shows an example of a lattice-shaped conductive film 62, which is processed so as to be provided with triangle openings. Such a structure makes it possible to further reduce the resistance compared with the structure shown in FIG. 7A.

Figure 6C:
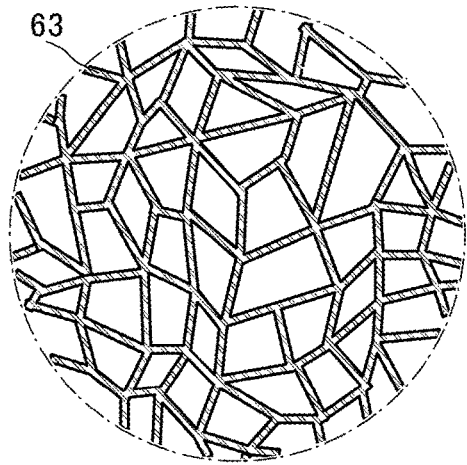

In addition, a conductive film 63, which has an irregular pattern shape, may be used as shown in FIG. 6C. Such a structure can prevent generation of moiré when overlapping with the display portion of the display panel 70.

Figure 6D:
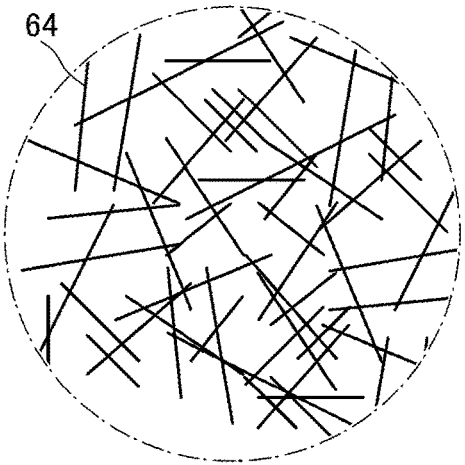

Conductive nanowires may be used for the electrodes 31 and the electrodes 32. FIG. 6D shows an example of the case in which nanowires 64 are used. The nanowires 64 are dispersed at appropriate density so as to be in contact with the adjacent nanowires, which can form a two-dimensional network; therefore, a conductive film with extremely high light-transmitting property can be provided. For example, a nanowire which has a mean value of the diameters of greater than or equal to 1 nm and less than or equal to 100 nm, preferably greater than or equal to 5 nm and less than or equal to 50 nm, further preferably greater than or equal to 5 nm and less than or equal to 25 nm can be used. As the nanowire 64, a metal nanowire such as an Ag nanowire, a Cu nanowire, and an Al nanowire, a carbon nanotube, or the like can be used. In the case of using an Ag nanowire for example, light transmittance of 89% or more and a sheet resistance of 40 ohm/square or more and 100 ohm/square or less can be achieved.

Figure 7A:
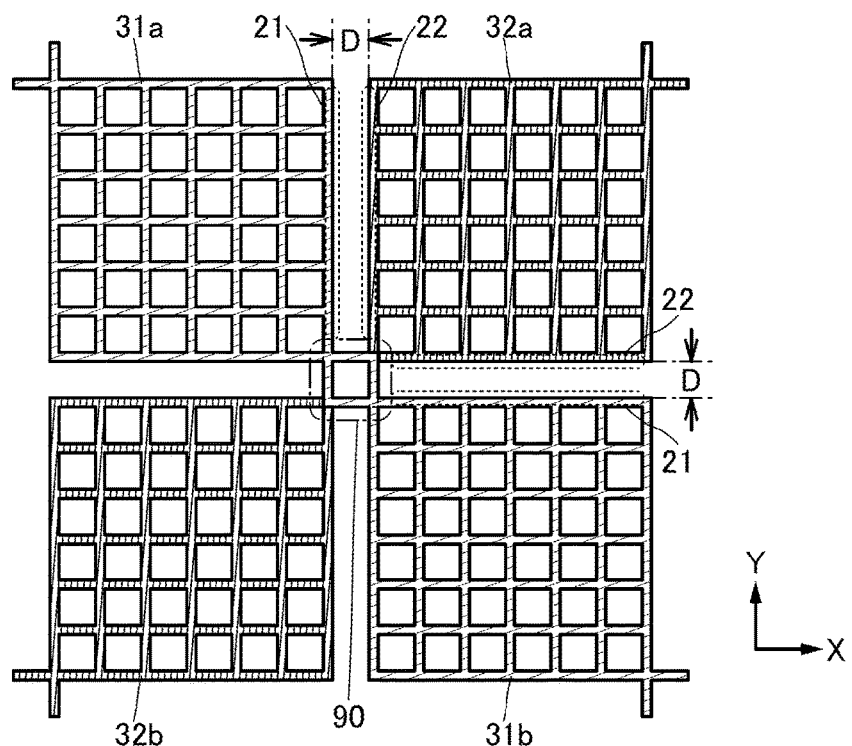
FIGS. 7A to 7C illustrate a structure example of an input device of one embodiment.
Figure 7B:
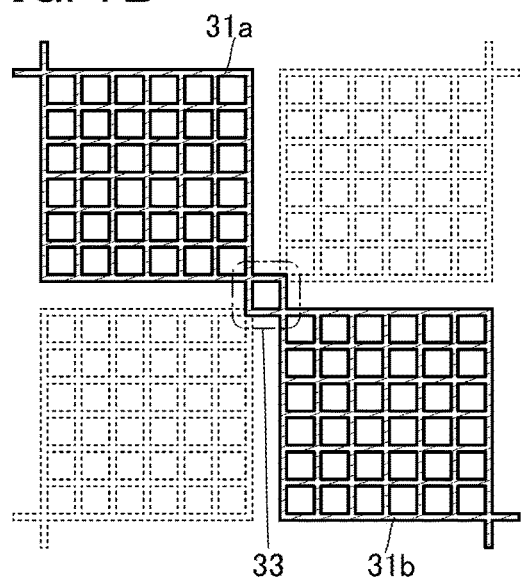
Figure 7C:
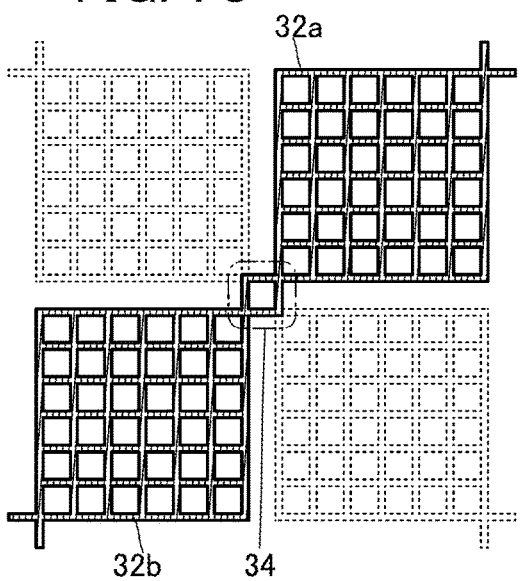

FIG. 7A shows an example of the case in which square electrode patterns of the electrodes 31 and the electrodes 32 shown in FIG. 2B have a lattice-shaped top surface. For easy understanding of the shapes of the electrodes, the electrodes 32 are indicated by the dashed line in FIG. 7B, and the electrodes 31 are indicated by the dashed line in FIG. 7C.

The integral multiple of the pitch of the lattice of the electrode 31 and the electrode 32 is preferably equal to the gap D between the electrodes 31 and 32. Furthermore, the directions of the lattices of the electrode 31 and the electrode 32 are preferably parallel to the X direction and the Y direction.

Although an opening of the lattice of each of the electrode 31 and the electrode 32 is a square in FIG. 7A and the like, the shape of the opening is not limited thereto and can have any of various shapes, such as a rectangle, a polygon, a circle, an ellipse, and a polygon with rounded corners.

The openings of the electrode 31 and the electrode 32 are preferably arranged so as to overlap with the display element 60 included in the display panel 70. Furthermore, it is preferable that the connection portion 33 and the connection portion 34 each also have an opening. With such a structure, light emission from the display element 60 is not blocked by the electrode 31, the electrode 32, and the like, so that light extraction efficiency can be enhanced. As a result, an input/output device with high visibility and low power consumption can be obtained.

In that case, the electrode 31 and the electrode 32 are preferably formed so as to overlap with the wirings (the signal line, the scan line, and the capacitor line) of the display panel 70, an insulating layer (also referred to as a partition) provided between the display elements 60, a transistor, a capacitor, and the like. The electrode 31 and the electrode 32 are arranged so as to overlap with such components, so that a highly sensitive touch panel can be provided without a reduction in the aperture ratio of the pixel.

Figure 8A:
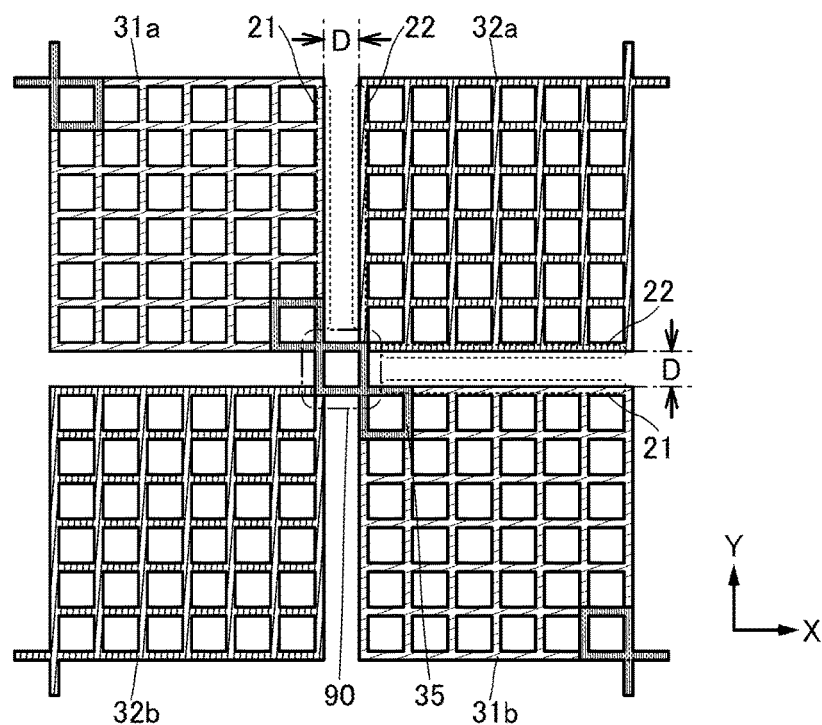
FIGS. 8A to 8C illustrate a structure example of an input device of one embodiment.
Figure 8B:
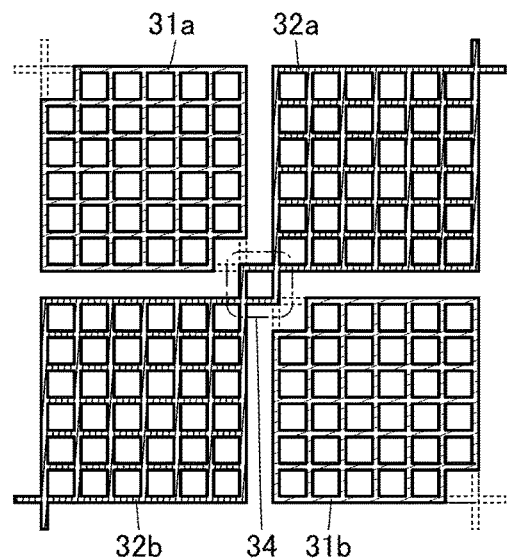
Figure 8C:
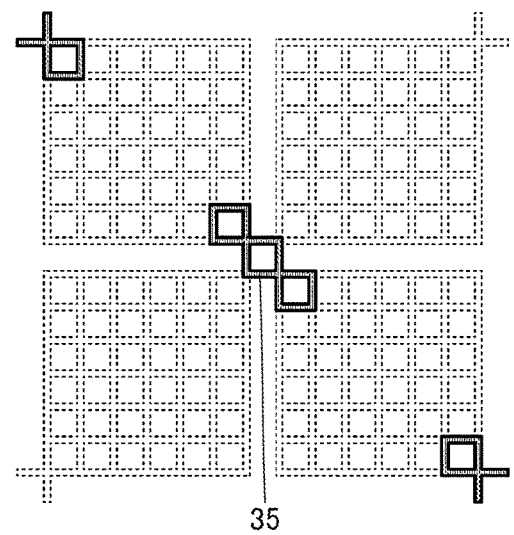

FIG. 8A shows an example of the case where the bridge electrode 35 is used. For easy understanding of the shapes of the electrodes, the bridge electrodes 35 are indicated by the dashed line in FIG. 8B, and the electrodes 31 and the electrodes 32 are indicated by the dashed line in FIG. 8C. There is no particular limitation on the formation order of the bridge electrode 35 and the electrodes 31 and 32, and either the bridge electrode 35 or the electrodes 31 and 32 may be provided on the substrate 30 side.

Figure 9A:
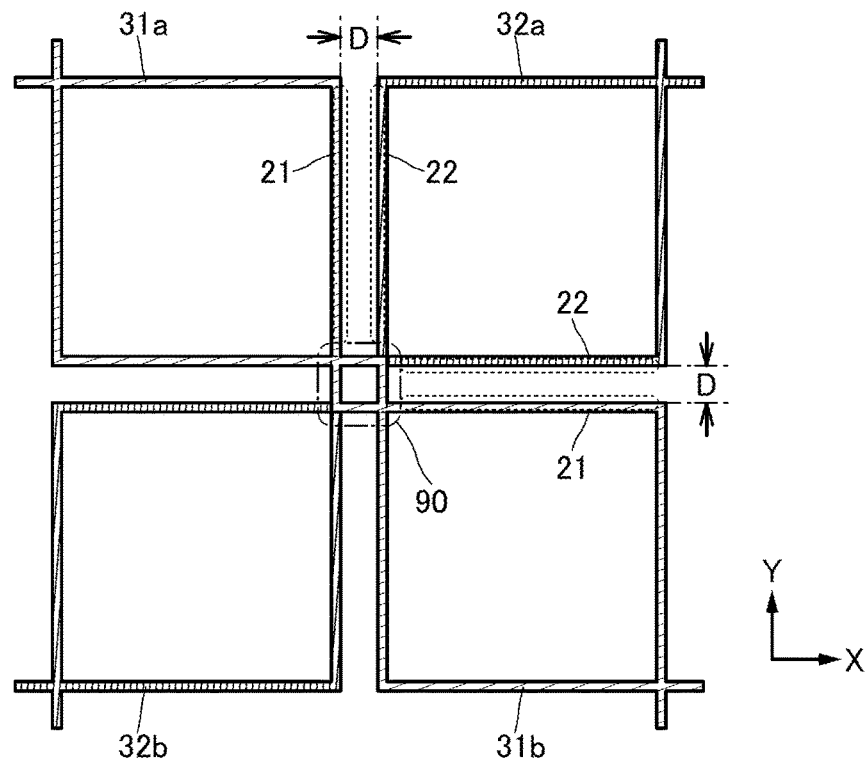
FIGS. 9A and 9B each illustrate a structure example of an input device of one embodiment.
Figure 9B:
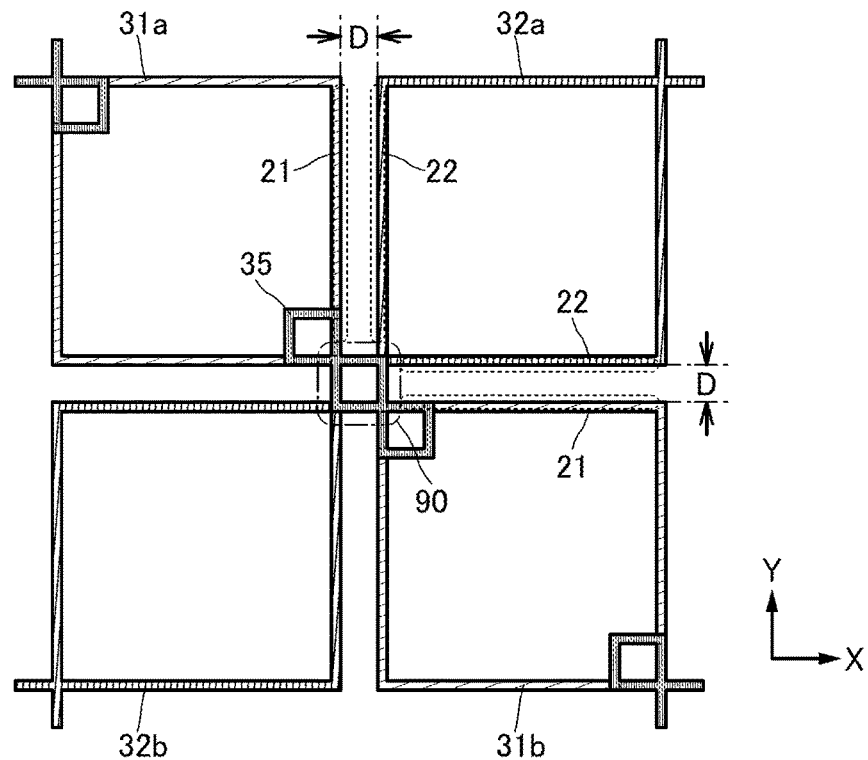

A pattern for forming only the outline in a plan view may be used for the electrodes 31 and 32. FIG. 9A shows the case where a design in which inner part of square electrode patterns of the electrodes 31 and 32 shown in FIG. 2B are removed and only edge portions are left is used. In that case, when the electrodes 31 and the electrodes 32 are too small in width for the user to see, the electrodes 31 and the electrodes 32 can be formed using a light-blocking material of any of the above metals and the above alloys. FIG. 9B shows an example of the case where the bridge electrode 35 which connects adjacent electrodes 31 (or adjacent electrodes 32) is used.

The above is the description of the shapes of the sensor electrodes.

Structure Example of Pixel

Structure examples of a pixel in the display panel 70 in the touch panel 100 of one embodiment of the present invention are described below.

As described above, there is a plurality of pixels in the display portion 81 of the display panel 70. A pixel includes one or more display elements 60. If the display panel 70 displays a full color image, a structure where the display elements 60 for exhibiting three colors of red (R), green (G), and blue (B) are provided in one pixel is preferable, for example. A structure where the display elements 60 for exhibiting yellow (Y) and white (W) are provided in addition to the display elements for the above three colors is also preferable because color reproducibility is improved and power consumption can be reduced. Here, a structure including one display element 60 and a pixel circuit corresponding thereto is referred to as a subpixel in some cases. The subpixel can include the display element 60, a transistor, and a capacitor, for example. When a pixel includes the three display elements 60, the pixel can have a structure with three subpixels.

When the input device 10 overlaps with the display panel 70, it is preferable that the electrodes 31 and 32 in the input device 10 be positioned between the display elements 60. Then, the electrodes 31 and 32 do not block light from the display elements 60, whereby it is possible to almost completely avoid, or greatly reduce luminance decrease in the display panel 70 provided with the input device 10. Therefore, a touch panel with high visibility and low power consumption can be achieved. In addition, since the electrodes 31 and 32 do not overlap with the display element 60, it is not necessary to use a light-transmitting conductive material, which has relatively high resistance, for the electrodes 31 and 32. Therefore, it is possible to use a metal or an alloy material with low resistance for the electrodes 31 and 32, and thus it is possible to make the electrodes 31 and 32 extremely thin so as not to be recognized by bare eyes. Thus, the electrodes 31 and 32 are less likely to be recognized by light reflection or the like, whereby a touch panel with higher visibility can be obtained.

A positional relationship of the display element 60 included in the display panel 70 and the electrodes 31 and 32 included in the input device 10 is described below.

FIG. 10 is an enlarged view of the display portion 81 and the input device 10 that overlap with each other when viewed from the display surface side of the touch panel 100 of FIG. 1A. Here, a pixel 40 in the display panel 70 includes four display elements 60 exhibiting different colors (a display element 60R, a display element 60G, a display element 60B, and a display element 60Y). Hereinafter, description is made for the display element 60 when matters common to the four kinds of display elements are described.

FIG. 10 shows a positional relationship between the electrode 31 and the display elements 60. Note that the electrode 31 is illustrated here, but the same applies to the electrode 32 (or the bridge electrode 35).

Here, the display elements 60R, 60G, 60B, and 60Y are display elements exhibiting red, green, blue, and yellow, respectively.

A plurality of pixels 40 are arranged at regular intervals in the X direction and the Y direction. Furthermore, two kinds of display elements 60 corresponding to two different colors are alternately arranged in the X direction or the Y direction.

Furthermore, FIG. 10 shows the case where the electrode 31 has a lattice shape having linear portions parallel to the X direction and the Y direction.

An outline of one display element 60 preferably has a portion parallel to the linear portion of the electrode 31. With such a form, a gap between the two display elements 60 can be reduced when the display elements 60 are arranged, whereby an aperture ratio can be increased. Although the outline of the display element 60 is a quadrangle with rounded corners in FIG. 10, the outline shape is not limited thereto, and may be a square, a rectangle, a polygon, an ellipse, a circle, a polygon with rounded corners, or the like.

In FIG. 10, a structure where one pixel 40 (that is, four display elements 60) is included in an opening of the electrode 31 is shown; however, the structure of the electrode 31 is not limited thereto, and may be any of various structures as long as the electrode 31 is configured to be positioned between the adjacent display elements 60.

Figure 11A:
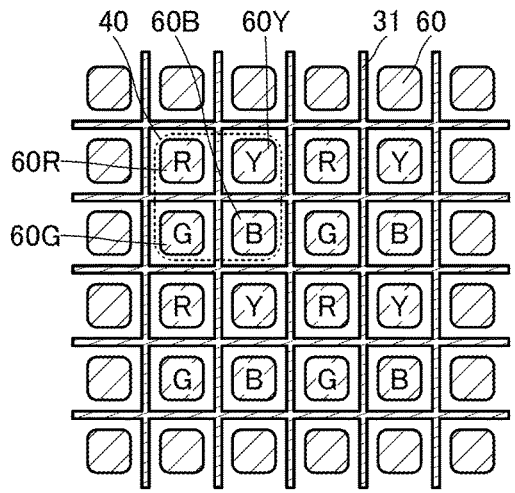
FIGS. 11A to 11F each illustrate a structure example of a touch panel of one embodiment.
Figure 11B:
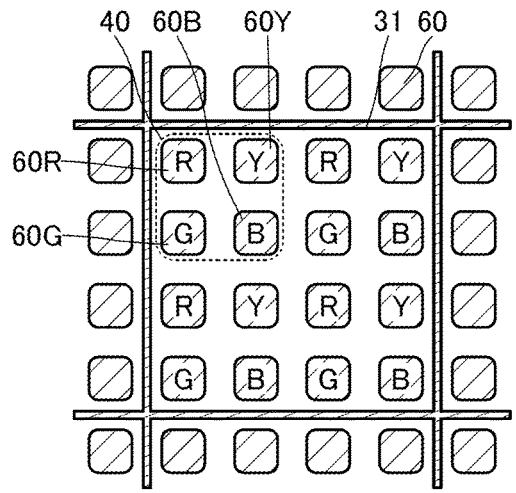
Figure 11C:
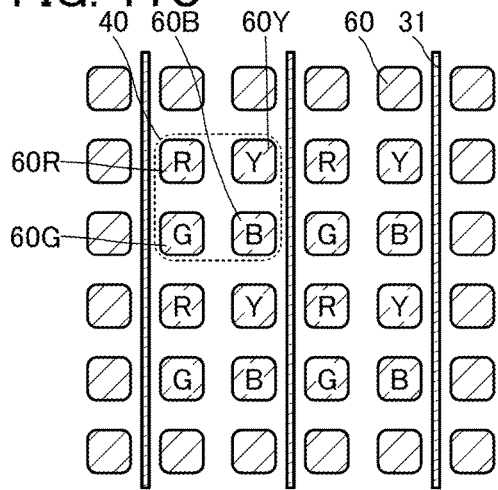
Figure 11D:
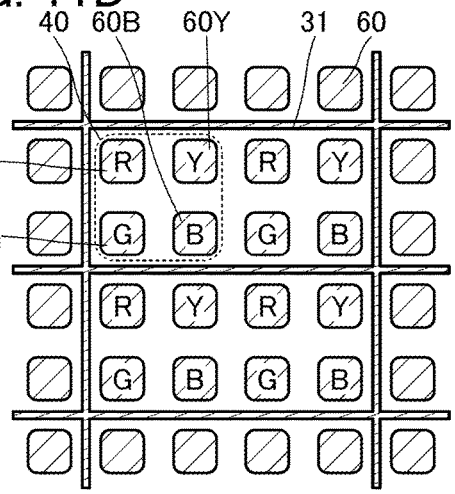
Figure 11E:
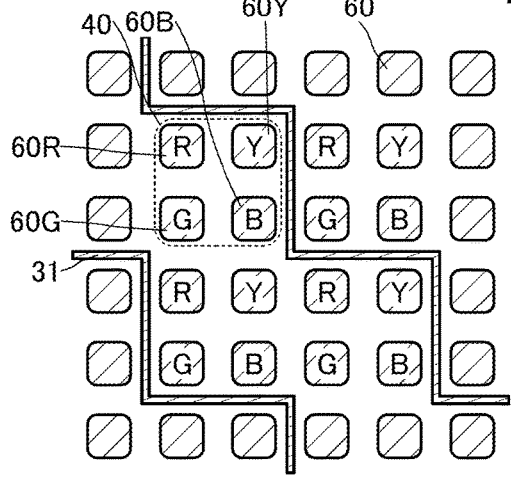
Figure 11F:
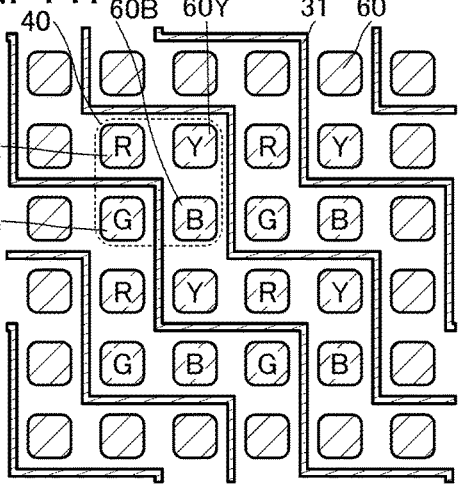

FIG. 11A shows the case where an opening of the lattice of the electrode 31 includes one display element 60. FIG. 11B shows the case where an opening of the lattice of the electrode 31 includes a plurality of pixels 40. FIG. 11C shows the case where the electrode 31 has a stripe shape. FIG. 11D shows the case where a pitch of the lattice in one direction is different from a pitch of the lattice in another direction perpendicular to the one direction, and the shape of an opening is a rectangle. FIGS. 11E and 11F each show the case where the electrode 31 has a zigzag shape.

FIG. 10 and FIGS. 11A to 11F show examples where one pixel 40 includes the display elements 60 of four colors, but the number of colors of display elements in a pixel is not limited thereto, and the display elements of three colors, five colors, or more may be provided.

Figure 12A:
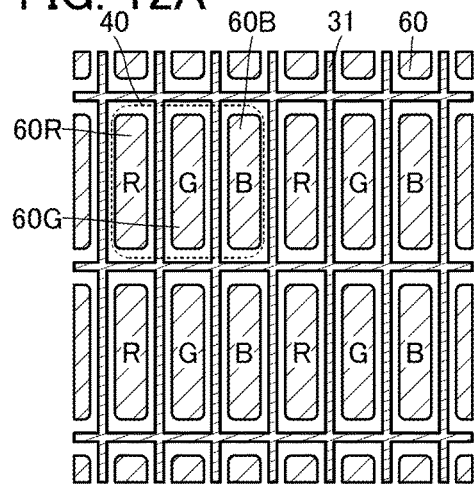
FIGS. 12A to 12F each illustrate a structure example of a touch panel of one embodiment.

FIG. 12A shows the case where one pixel 40 includes the display elements 60 of three colors. In FIG. 12A, the display elements 60 of the same color are arranged along the Y direction, which constitutes stripe arrangement. Arrangement of the display elements 60 of the same color in one direction is preferable because alignment with an underlying layer becomes easy when light-emitting elements of different colors are formed and when a color filter is formed.

In FIG. 12A, the outline of the display element 60 has a linear portion along a direction of the lattice of the electrode 31 (that is, the X direction or the Y direction), and has a rectangular shape with rounded corners.

Figure 12B:
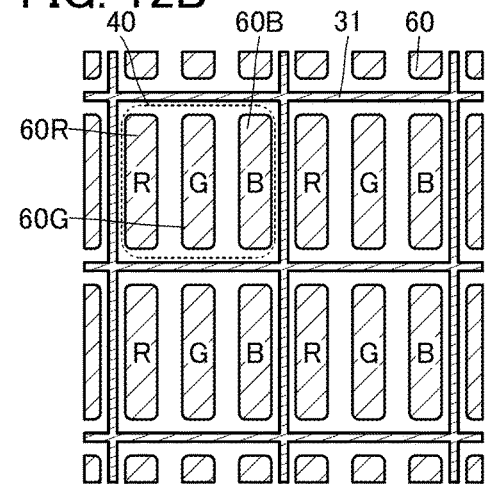
Figure 12C:
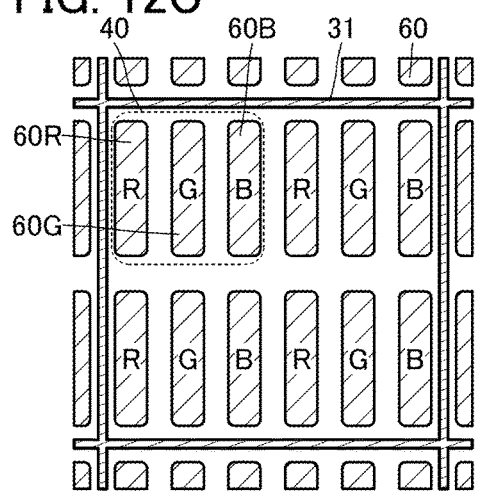
Figure 12D:
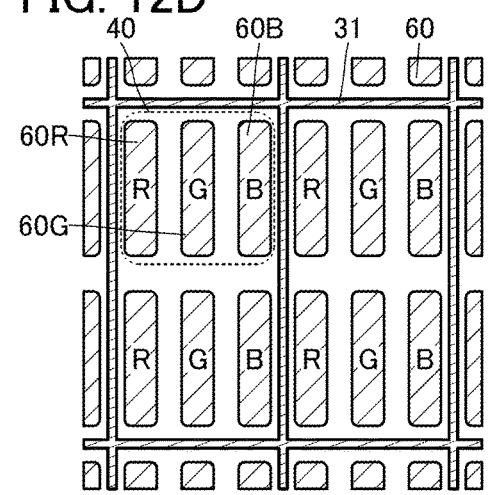
Figure 12E:
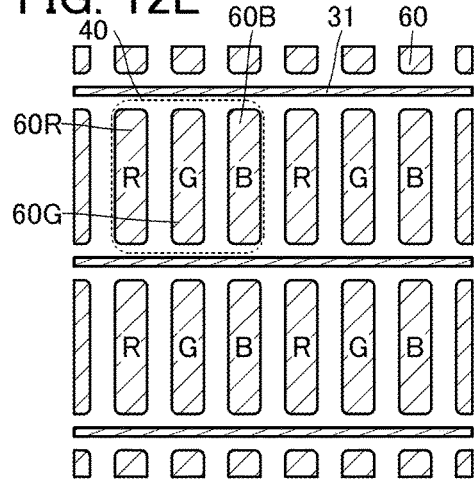
Figure 12F:
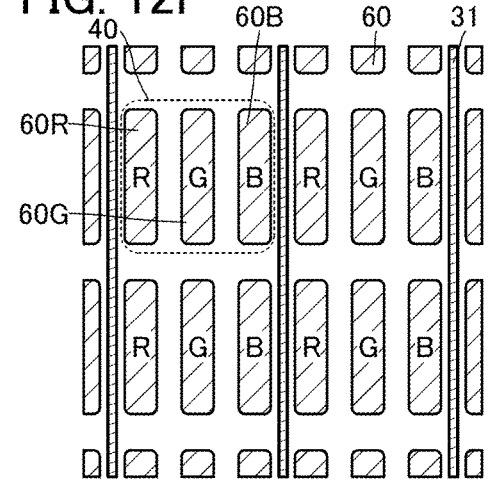

FIG. 12A shows the case where an opening of the lattice of the electrode 31 includes one display element 60. FIG. 12B shows the case where an opening of the lattice of the electrode 31 includes one pixel 40. FIG. 12C shows the case where an opening of the lattice of the electrode 31 includes a plurality of pixels 40. FIG. 12D shows the case where a pitch of the lattice in one direction is different from a pitch of the lattice in another direction perpendicular to the one direction, and the shape of an opening is a rectangle. FIGS. 12E and 12F each show the case where the electrode 31 has a stripe shape parallel to the X direction or the Y direction.

Note that marks such as R, G, B, and Y are given to some display elements 60 in FIG. 10, FIGS. 11A to 11F, FIGS.

12A to 12F to facilitate description; however, the arrangement method is just an example, and does not limit an arrangement method of the display elements 60. R, G, B, and Y can be replaced with one another. In addition, W that corresponds to a display element of white may be provided in replacement of R, G, B, or Y.

Here, the electrode 31 and the like has a lattice shape so that the electrode 31 and the like and the display element 60 do not overlap with each other; however, one embodiment of the present invention is not limited thereto. A structure in which the electrode 31 does not have a lattice shape may be employed in the case where the electrode 31 is formed using the above light-transmitting material or the above material that is too small in width for the user to see and the display element 60 and the electrode 31 and the like are provided to overlap with each other.

The above is the description of the structure examples of the pixel.

Cross-Sectional Structure Example

An example of a cross-sectional structure of the touch panel 100 is described below with reference to drawings.

Cross-Sectional Structure Example 1

Figure 13:
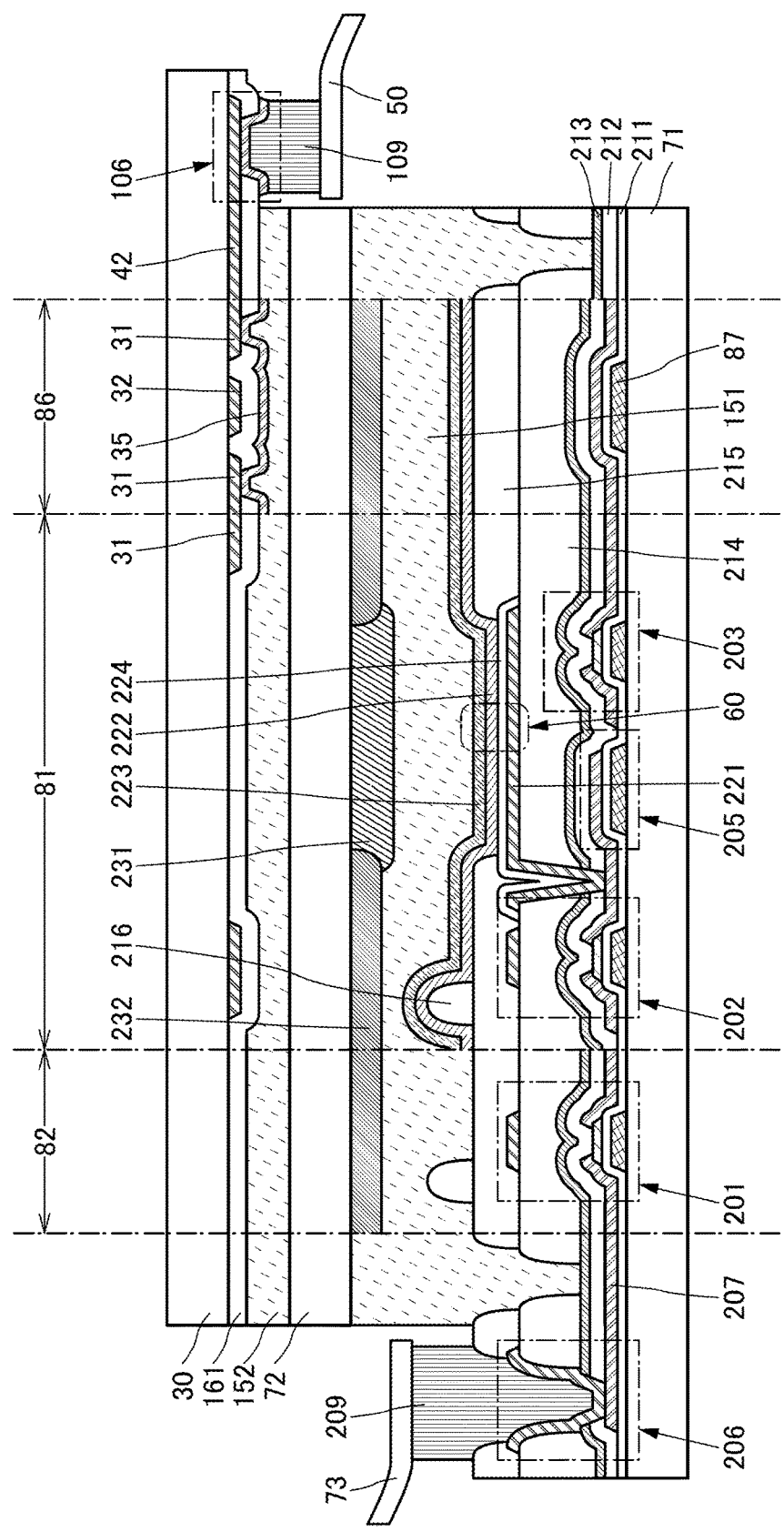
FIG. 13 illustrates a structure example of a touch panel of one embodiment.

FIG. 13 is a schematic cross-sectional view of the touch panel 100. FIG. 13 illustrates cross sections of a region including an FPC 73, a region including the driver circuit 82, a region including the display portion 81, and a region including the FPC 50 in FIGS. 1A and 1B.

The substrate 71 and the substrate 72 are attached to each other with an adhesive layer 151. The substrate 72 and the substrate 30 are attached to each other with an adhesive layer 152. Here, a structure including the substrate 71, the substrate 72, and components provided therebetween corresponds to the display panel 70. A structure including the substrate 30 and components provided for the substrate 30 corresponds to the input device 10.
<Display Panel 70>

A transistor 201, a transistor 202, a transistor 203, the display element 60, a capacitor 205, a connection portion 206, a wiring 207, and the like are provided between the substrates 71 and 72.

An insulating layer 211, an insulating layer 212, an insulating layer 213, an insulating layer 214, an insulating layer 215, a spacer 216, and the like are provided over the substrate 71. Part of the insulating layer 211 functions as a gate insulating layer of each transistor, and another portion thereof functions as a dielectric of the capacitor 205. The insulating layer 212, the insulating layer 213, and the insulating layer 214 are provided to cover each transistor, the capacitor 205, and the like. The insulating layer 214 functions as a planarization layer. Note that an example where the three insulating layers, the insulating layers 212, 213 and 214, are provided to cover the transistors and the like is described here; however, the present invention is not limited to this example, and four or more insulating layers, a single insulating layer, or two insulating layers may be provided. The insulating layer 214 functioning as a planarization layer is not necessarily provided when not needed.

The display element 60 is provided over the insulating layer 214. Here, an example is shown where a top-emission type light-emitting element (organic EL element) is used as the display element 60. The display element 60 emits light toward a second electrode 223 side. The transistors 202 and 203, the capacitor 205, a wiring, and the like are provided to overlap with a light-emitting region of the display element 60. Thus, an aperture ratio of the display portion 81 can be increased.

The display element 60 includes an EL layer 222 between a first electrode 221 and the second electrode 223. An optical adjustment layer 224 is provided between the first electrode 221 and the EL layer 222. The insulating layer 215 is provided to cover end portions of the first electrode 221 and the optical adjustment layer 224.

FIG. 13 illustrates a cross section of one pixel as an example of the display portion 81. An example where the pixel includes the transistor 202 for current control, the transistor 203 for switching control, and the capacitor 205 is described here. One of a source and a drain of the transistor 202 and one electrode of the capacitor 205 are electrically connected to the first electrode 221 through an opening provided in the insulating layers 212, 213, and 214.

FIG. 13 illustrates an example of the driver circuit 82 in which the transistor 201 is provided.

In the example illustrated in FIG. 13, the transistors 201 and 202 each have a structure in which a semiconductor layer where a channel is formed is provided between two gate electrodes. Such transistors can have a higher field-effect mobility and thus have higher on-state current than other transistors. Consequently, a circuit capable of high-speed operation can be obtained. Furthermore, the area occupied by a circuit can be reduced. The use of the transistor having high on-state current can reduce signal delay in wirings and can reduce display luminance variation even in a display panel in which the number of wirings is increased because of increase in size or resolution.

Note that the transistors provided in the driver circuit 82 and the display portion 81 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable touch panel can be achieved.

The spacer 216 is provided over the insulating layer 215 and has a function of adjusting the distance between the substrate 71 and the substrate 72. In the example illustrated in FIG. 13, there is a gap between the spacer 216 and a light-blocking layer 232, which may however be in contact with each other. Although the spacer 216 is provided on the substrate 71 side in the structure described here, the spacer 216 may be provided on the substrate 72 side (e.g., in a position closer to the substrate 71 than that of the light-blocking layer 232). Alternatively, a particulate spacer may be used instead of the spacer 216. Although a material such as silica can be used for the particulate spacer, an elastic material such as an organic resin or rubber is preferably used. In some cases, the particulate spacer may be vertically crushed.

A coloring layer 231, the light-blocking layer 232, and the like are provided on the substrate 71 side of the substrate 72. The light-blocking layer 232 has an opening, and the opening overlaps with the display region of the display element 60. The coloring layer 231 overlaps with the display element 60.

As examples of a material that can be used for the light-blocking layer 232, carbon black, a metal oxide, and a composite oxide containing a solid solution of a plurality of metal oxides can be given. Stacked films containing the material of the coloring layer 231 can also be used for the light-blocking layer 232. For example, a material containing an acrylic resin can be used for the coloring layer 231, and a stacked-layer structure of a film containing a material of a coloring layer which transmits light of a certain color and a film containing a material of a coloring layer which transmits light of another color can be employed. It is preferable that the coloring layer 231 and the light-blocking layer 232 be formed using the same material because the same manufacturing apparatus can be used and the process can be simplified.

As examples of a material that can be used for the coloring layer 231, a metal material, a resin material, and a resin material containing a pigment or dye can be given.

An insulating layer which functions as an overcoat may be provided to cover the coloring layer 231 and the light-blocking layer 232.

The connection portion 206 is provided in a region near an end portion of the substrate 71. The connection portion 206 is electrically connected to the FPC 73 through a connection layer 209. In the example of the structure illustrated in FIG. 13, the connection portion 206 is formed by stacking part of the wiring 207 which is electrically connected to the driver circuit 82 and a conductive layer which is formed by processing a conductive film used for forming the first electrode 221. When the connection portion 206 is formed by stacking two or more conductive layers as described above, electric resistance can be reduced and mechanical strength of the connection portion 206 can be increased.

Furthermore, FIG. 13 illustrates a cross-sectional structure of an intersection portion 86 where a wiring formed by processing a conductive film used for forming the gate electrode of the transistor and a wiring formed by processing a conductive film used for forming a source electrode and a drain electrode of the transistor intersect with each other.

Here, a scan line 87 formed by processing a conductive film used for forming the gate electrode of the transistor is provided at the intersection portion 86. Note that the scan line 87 may be a wiring formed by processing a conductive film used for forming the source electrode and the drain electrode of the transistor or another conductive film.

<Input Device 10>

The electrode 31 and the electrode 32 are provided on the substrate 72 side of the substrate 30. As illustrated in the intersection portion 86 in FIG. 13, the electrode 31 and the electrode 32 are formed in the same plane. The bridge electrode 35 is provided over an insulating layer 161 which covers the electrode 31 and the electrode 32. The bridge electrode 35 electrically connects two electrodes 31, between which the electrode 32 is provided, through openings formed in the insulating layer 161.

In the structure of FIG. 13, the electrode 31 does not overlap with the display element 60. That is, the electrode 31 is provided such that an opening of the electrode 31 and the display element 60 overlap with each other. Here, it is preferable that the electrode 31 not overlap with the coloring layer 231. The electrode 31 preferably overlaps with the light-blocking layer 232. Note that an example of the electrode 31 is shown here, but it is preferable that the electrode 32 and the bridge electrode 35 also not overlap with the display element 60 or the like.

In FIG. 13, the electrode 31 is provided to overlap with the insulating layer 212, the insulating layer 213, the insulating layer 214, the insulating layer 215, the spacer 216, and the like. The electrode 31 may overlap with part of the gate electrode, the semiconductor layer, the gate insulating layer, and the source electrode or the drain electrode included in the transistor 202. Furthermore, the electrode 31 is provided so as to overlap also with the EL layer 222 and the second electrode 223 in a portion which does not contributes to light emission. Alternatively, the electrode 31 may be provided so as to overlap also with the first electrode 221 and the optical adjustment layer 224 in a portion which does not contributes to light emission. Alternatively, the electrode 31 may be provided so as to overlap with a layer included in the transistor 203 and a layer included in the capacitor 205.

A connection portion 106 is provided in a region near an end portion of the substrate 30. The connection portion 106 is electrically connected to the FPC 50 through a connection layer 109. In the example of the structure illustrated in FIG. 13, the connection portion 106 is formed by stacking part of the wiring 42 and a conductive layer which is formed by processing a conductive film used for forming the bridge electrode 35.

As the connection layer 109 or the connection layer 209, an anisotropic conductive film (ACF), an anisotropic conductive paste (ACP), or the like can be used.

The substrate 30 here can be used also as a substrate with which an object, such as a finger or a stylus, is to be in contact. In that case, a protective layer (such as a ceramic coat) is preferably provided over the substrate 30. The protective layer can be formed using an inorganic insulating material such as silicon oxide, aluminum oxide, yttrium oxide, or yttria-stabilized zirconia (YSZ). Alternatively, tempered glass may be used for the substrate 30. The tempered glass which is preferably used here is one that has been subjected to physical or chemical treatment by an ion exchange method, a thermal tempering method, or the like and has a surface to which compressive stress has been added. In the case where the touch sensor is provided on one side of the tempered glass and the opposite side of the tempered glass is provided on, for example, the outermost surface of an electronic device to use as a touch surface, the whole thickness of the device can be reduced.

<Components>

The above components are described below.

A substrate having a flat surface can be used as the substrate included in the touch panel. The substrate on the side from which light from the display element is extracted is formed using a material that transmits the light. For example, a material such as glass, quartz, ceramics, sapphire, or an organic resin can be used.

The weight and thickness of the touch panel can be decreased by using a thin substrate. A flexible touch panel can be obtained by using a substrate that is thin enough to have flexibility.

As the glass, for example, non-alkali glass, barium borosilicate glass, aluminoborosilicate glass, or the like can be used.

Examples of a material that has flexibility and transmits visible light include flexible glass, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). In particular, a material whose thermal expansion coefficient is low, for example, lower than or equal to $30 \times 10^{-6}$/K is preferable, and a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. Glass thin enough to have flexibility may also be used. A substrate using such a material is lightweight, and accordingly a touch panel using this substrate can also be lightweight.

In the case where a fibrous body is included in the above material, a high-strength fiber of an organic compound or an inorganic compound is used as the fibrous body. The high-strength fiber is specifically a fiber with a high tensile modulus of elasticity or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as the flexible substrate. The structure body including the fibrous body and the resin is preferably used as the flexible substrate, in which case the reliability against bending or breaking due to local pressure can be increased.

Alternatively, glass, metal, or the like that is thin enough to have flexibility can be used as the substrate. Alternatively, a composite material where glass and a resin material are attached to each other may be used.

Since it is not necessary for the substrate through which light emission is not extracted to have a light-transmitting property, a metal substrate, a ceramic substrate, a semiconductor substrate, or the like can be used as well as the above-described substrates. A metal substrate, which has high thermal conductivity, is preferable because they can easily conduct heat to the whole substrate and accordingly can prevent a local temperature rise in the touch panel. To obtain flexibility and bendability, the thickness of a metal substrate is preferably greater than or equal to 10 mm and less than or equal to 200 mm, more preferably greater than or equal to 20 mm and less than or equal to 50 mm.

Although there is no particular limitation on a material of a metal substrate, it is favorable to use, for example, a metal such as aluminum, copper, and nickel, an aluminum alloy, or an alloy such as stainless steel.

It is preferable to use a substrate subjected to insulation treatment, e.g., a metal substrate whose surface is oxidized or provided with an insulating film. An insulating film may be formed by, for example, a coating method such as a spin-coating method and a dipping method, an electrodeposition method, an evaporation method, or a sputtering method. An oxide film may be formed over the substrate surface by an anodic oxidation method, exposing to or heating in an oxygen atmosphere, or the like.

A hard coat layer (e.g., a silicon nitride layer) by which a touch panel surface is protected from damage, a layer (e.g., an aramid resin layer) that can disperse pressure, or the like may be stacked over the flexible substrate. Furthermore, to suppress a decrease in lifetime of the display element due to moisture and the like, an insulating layer with low water permeability may be stacked over the flexible substrate. For example, an inorganic insulating material such as silicon nitride, silicon oxynitride, aluminum oxide, or aluminum nitride can be used.

The substrate may be formed by stacking a plurality of layers. When a glass layer is used, a barrier property against water and oxygen can be improved and thus a highly reliable touch panel can be provided.

A substrate in which a glass layer, an adhesive layer, and an organic resin layer are stacked from the side closer to the display element can be used, for example. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a high flexibility. The thickness of the organic resin layer is greater than or equal to 10 μm and less than or equal to 200 μm, preferably greater than or equal to 20 μm and less than or equal to 50 μm. Providing such organic resin layer, occurrence of a crack or a break in the glass layer can be suppressed and mechanical strength can be improved. With the substrate that includes such a composite material of a glass material and an organic resin, a highly reliable flexible touch panel can be provided.

The transistor includes a conductive layer functioning as the gate electrode, the semiconductor layer, a conductive layer functioning as the source electrode, a conductive layer functioning as the drain electrode, and an insulating layer functioning as the gate insulating layer. FIG. 13 shows the case where a bottom-gate transistor is used.

Note that there is no particular limitation on the structure of the transistor included in the touch panel of one embodiment of the present invention. For example, a forward staggered transistor or an inverted staggered transistor may be used. A top-gate transistor or a bottom-gate transistor may be used. There is no particular limitation on the semiconductor material that is used for the transistors, and for example, an oxide semiconductor, silicon, germanium, or an organic semiconductor can be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

In particular, an oxide semiconductor with wider bandgap than silicon is preferable. A semiconductor material having a wider band gap and a lower carrier density than silicon is preferably used because off-state leakage current of the transistor can be reduced.

An oxide semiconductor with low carrier density, which has small amounts of impurities and oxygen vacancies is preferably used. Specifically, an oxide semiconductor with a carrier density of lower than $8\times10^{11}/cm^3$, preferably lower than $1\times10^{11}/cm^3$, further preferably lower than $1\times10^{10}/cm^3$, and higher than or equal to $1\times10^{-9}/cm^3$ can be used. Such an oxide semiconductor is referred to as a highly purified intrinsic or substantially highly purified intrinsic oxide semiconductor. Such an oxide semiconductor has a low impurity concentration and a low density of defect states. Thus, the oxide semiconductor can be regarded as an oxide semiconductor having stable characteristics.

For example, the oxide semiconductor preferably contains at least indium (In) or zinc (Zn). The oxide semiconductor preferably contains an In-M-Zn-based oxide (M is a metal such as Al, Ti, Ga, Ge, Y, Zr, Sn, La, Ce, or Hf).

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor: therefore, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor with crystallinity for the semiconductor layer makes it possible to provide a highly reliable transistor in which a change in the electrical characteristics is suppressed.

A transistor with an oxide semiconductor whose band gap is larger than the band gap of silicon can hold charges stored in a capacitor that is series-connected to the transistor for a long time, owing to the low off-state current of the transistor. When such a transistor is used for a pixel, operation of a driver circuit can be stopped while a gray scale of an image displayed in each display region is maintained. As a result, a display device with an extremely low power consumption can be obtained.

Alternatively, silicon is preferably used as a semiconductor in which a channel of a transistor is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has higher field effect mobility and higher reliability than amorphous silicon. When such a polycrystalline semiconductor is used for a pixel, the aperture ratio of the pixel can be improved. Even in the case where pixels are provided at extremely high resolution, a scan line driver circuit and a signal line driver circuit can be formed over a substrate over which the pixels are formed, and the number of components of an electronic device can be reduced.

As a gate, a source, and a drain of a transistor, and a wiring or an electrode included in a touch panel, any of metals such as aluminum, titanium, chromium, nickel, copper, yttrium, zirconium, molybdenum, silver, tantalum, and tungsten, or an alloy containing any of these metals as its main component can be used. A single-layer structure or multi-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that a transparent conductive material containing indium oxide, tin oxide, or zinc oxide may be used. Copper containing manganese is preferably used because controllability of a shape by etching is increased.

As a light-transmitting material that can be used for conductive layers such as wirings and electrodes in the touch panel, a conductive oxide such as indium oxide, indium tin oxide, indium zinc oxide, zinc oxide, or zinc oxide to which gallium is added, or graphene can be used. Alternatively, a metal material such as gold, silver, platinum, aluminum, magnesium, nickel, tungsten, chromium, molybdenum, iron, cobalt, copper, palladium, tin, zinc, indium, tantalum, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

Examples of an insulating material that can be used for the insulating layers, the overcoat, the spacer, and the like include a resin such as acrylic or epoxy resin, a resin having a siloxane bond, and an inorganic insulating material such as silicon oxide, silicon oxynitride, silicon nitride oxide, silicon nitride, or aluminum oxide.

The light-emitting element is preferably provided between a pair of insulating films with low water permeability, in which case impurities such as water can be prevented from entering the light-emitting element. Thus, a decrease in device reliability can be prevented.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], still further preferably lower than or equal to $1\times10^{-8}$ [g/m$^2$·day].

As the adhesive layers, a variety of curable adhesives such as a reactive curable adhesive, a thermosetting adhesive, an anaerobic adhesive, and a photo curable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

Further, the resin may include a drying agent. For example, a substance that adsorbs water by chemical adsorption, such as oxide of an alkaline earth metal (e.g., calcium oxide or barium oxide), can be used. Alternatively, a substance that adsorbs water by physical adsorption, such as zeolite or silica gel, may be used. The drying agent is preferably included because it can prevent impurities such as water from entering the functional element, thereby improving the reliability of the display panel.

In addition, it is preferable to mix a filler with a high refractive index or light-scattering member into the resin, in which case light extraction efficiency from the light-emitting element can be enhanced. For example, titanium oxide, barium oxide, zeolite, zirconium, or the like can be used.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top emission, bottom emission, or dual emission light-emitting element. A conductive film that transmits visible light is used as the electrode through which light is extracted. A conductive film that reflects visible light is preferably used as the electrode through which light is not extracted.

The EL layer includes at least a light-emitting layer. In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

Either a low molecular compound or a high molecular compound can be used for the EL layer, and an inorganic compound may also be used. The layers included in the EL layer can be formed by any of the following methods: an evaporation method (including a vacuum evaporation method), a transfer method, a printing method, an inkjet method, a coating method, and the like.

When a voltage higher than the threshold voltage of the light-emitting element is applied between the anode and the cathode, holes are injected to the EL layer from the anode side and electrons are injected to the EL layer from the cathode side. The injected electrons and holes are recombined in the EL layer, so that a light-emitting substance contained in the EL layer emits light.

In the case where a light-emitting element emitting white light is used as the light-emitting element, the EL layer preferably contains two or more kinds of light-emitting substances. For example, light-emitting substances are selected so that two or more light-emitting substances emit complementary colors to obtain white light emission. Specifically, it is preferable to contain two or more light-emitting substances selected from light-emitting substances emitting light of red (R), green (G), blue (B), yellow (Y), orange (O), and the like and light-emitting substances emitting light containing two or more of spectral components of R, G, and B. The light-emitting element preferably emits light with a spectrum having two or more peaks in the wavelength range of a visible light region (e.g., 350 nm to 750 nm). An emission spectrum of a material emitting light having a peak in the wavelength range of a yellow light preferably includes spectral components also in the wavelength range of a green light and a red light.

A light-emitting layer containing a light-emitting material emitting light of one color and a light-emitting layer containing a light-emitting material emitting light of another color are preferably stacked in the EL layer. For example, the plurality of light-emitting layers in the EL layer may be stacked in contact with each other or may be stacked with a region not including any light-emitting material therebetween. For example, between a fluorescent layer and a phosphorescent layer, a region containing the same material as one in the fluorescent layer or phosphorescent layer (for example, a host material or an assist material) and no light-emitting material may be provided. This facilitates the manufacture of the light-emitting element and reduces the drive voltage.

The light-emitting element may be a single element including one EL layer or a tandem element in which a plurality of EL layers are stacked with a charge generation layer therebetween.

The conductive film that transmits visible light can be formed using, for example, indium oxide, indium tin oxide, indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be used when formed thin so as to have a light-transmitting property. Alternatively, a stack of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material, such as aluminum, gold, platinum, silver, nickel, tungsten, chromium, molybdenum, iron, cobalt, copper, or palladium or an alloy including any of these metal materials can be used. Lanthanum, neodymium, germanium, or the like may be added to the metal material or the alloy. Alternatively, an alloy containing aluminum (an aluminum alloy) such as an alloy of aluminum and titanium, an alloy of aluminum and nickel, or an alloy of aluminum and neodymium may be used. Alternatively, an alloy containing silver such as an alloy of silver and copper, an alloy of silver and palladium, or an alloy of silver and magnesium may be used. An alloy of silver and copper is preferable because of its high heat resistance. Furthermore, when a metal film or a metal oxide film is stacked in contact with an aluminum film or an aluminum alloy film, oxidation can be prevented. Examples of a material for the metal film or the metal oxide film are titanium, titanium oxide, and the like. Alternatively, the conductive film having a property of transmitting visible light and a film containing any of the above metal materials may be stacked. For example, a stack of silver and indium tin oxide, a stack of an alloy of silver and magnesium and indium tin oxide, or the like can be used.

The electrodes may be formed separately by an evaporation method or a sputtering method. Alternatively, a discharging method such as an inkjet method, a printing method such as a screen printing method, or a plating method may be used.

The above is the descriptions of the components.

Structure examples which partly differ from the above cross-sectional structure example 1 will be described below with reference to drawings. Note that descriptions of the portions already described are omitted and different portions are described below.

Cross-Sectional Structure Example 2

Figure 14:
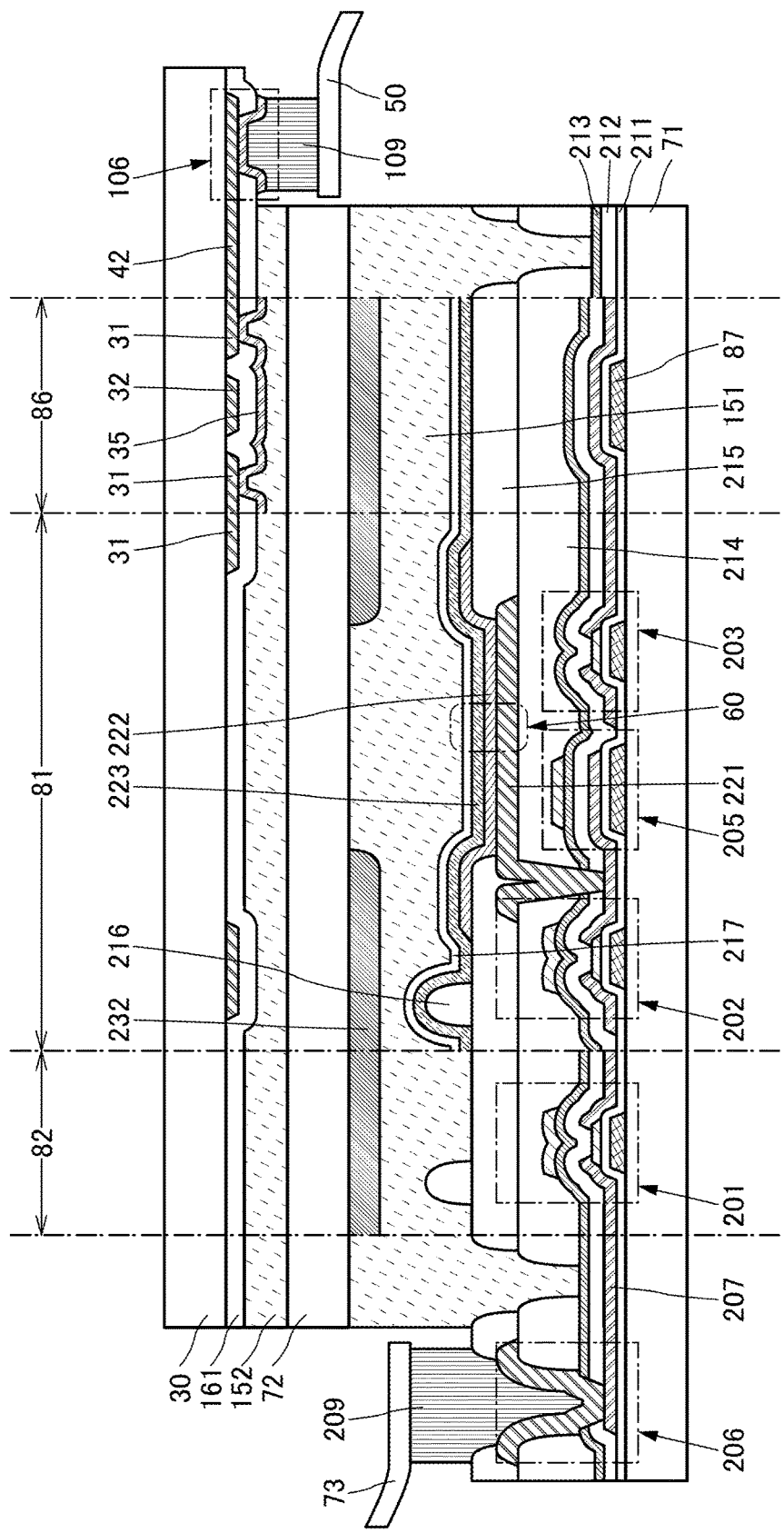
FIG. 14 illustrates a structure example of a touch panel of one embodiment.

FIG. 14 illustrates a cross-sectional structure example of the touch panel 100 which partly differs from the structure of FIG. 13.

In FIG. 14, in the transistors 201 and 202, conductive layers functioning as the second gates are provided between the insulating layer 213 and the insulating layer 214. Such a structure is preferable because the voltage to be applied to the second gates can be lowered as compared with the structure in FIG. 13.

FIG. 14 illustrates an example where the display element 60 is formed by a separate coloring method. Specifically, pixels of different colors include different EL layers 222 which emit light of the respective colors. In a region outside the light-emitting region of the display element 60, an end portion of the EL layer 222 is covered with the second electrode 223. The EL layer 222 can be formed by, for example, an evaporation method using a metal mask, a printing method, an inkjet method, or the like.

In the example illustrated in FIG. 14, the optical adjustment layer 224 and the coloring layer 231 illustrated in FIG. 13 are not provided.

FIG. 14 shows an example where a protective film 217 is provided to cover the second electrode 223. The protective film 217 serves as a barrier film that prevents impurities such as water from diffusing into the display element 60. Although not illustrated in the drawing, an end portion of the EL layer 222 or an end portion of the second electrode 223 is covered with the protective film 217, whereby entry of water into the display element 60 can be more effectively inhibited.

As the protective film 217, an organic insulation material or an inorganic insulation material can be used. An inorganic insulation material is preferably used because a film with a high barrier property can be formed to be thin. When an inorganic insulation material is used as the protective film 217, silicon nitride, silicon nitride oxide, aluminum oxide, aluminum oxynitride, aluminum nitride oxide, aluminum nitride, hafnium oxide, or the like is preferably used. Aluminum oxide is particularly preferable because of its excellent barrier property. As a deposition method of the protective film 217, a sputtering method, an evaporation method, a chemical vapor deposition (CVD) method, an atomic layer deposition (ALD) method, or the like can be used. The ALD method is particularly preferable to inhibit damage to the display element 60 at the time of deposition. Although a thermal ALD method can be used as the ALD method, a plasma enhanced ALD (PEALD) method is more preferable because a film can be formed at low temperatures around room temperature.

Note that the structures of the transistors, the display elements 60, the protective film 217, and the like can be replaced with those of the transistors, the display elements and the like shown in FIG. 13 and cross-sectional structures described below.

Cross-Sectional Structure Example 3

Figure 15:
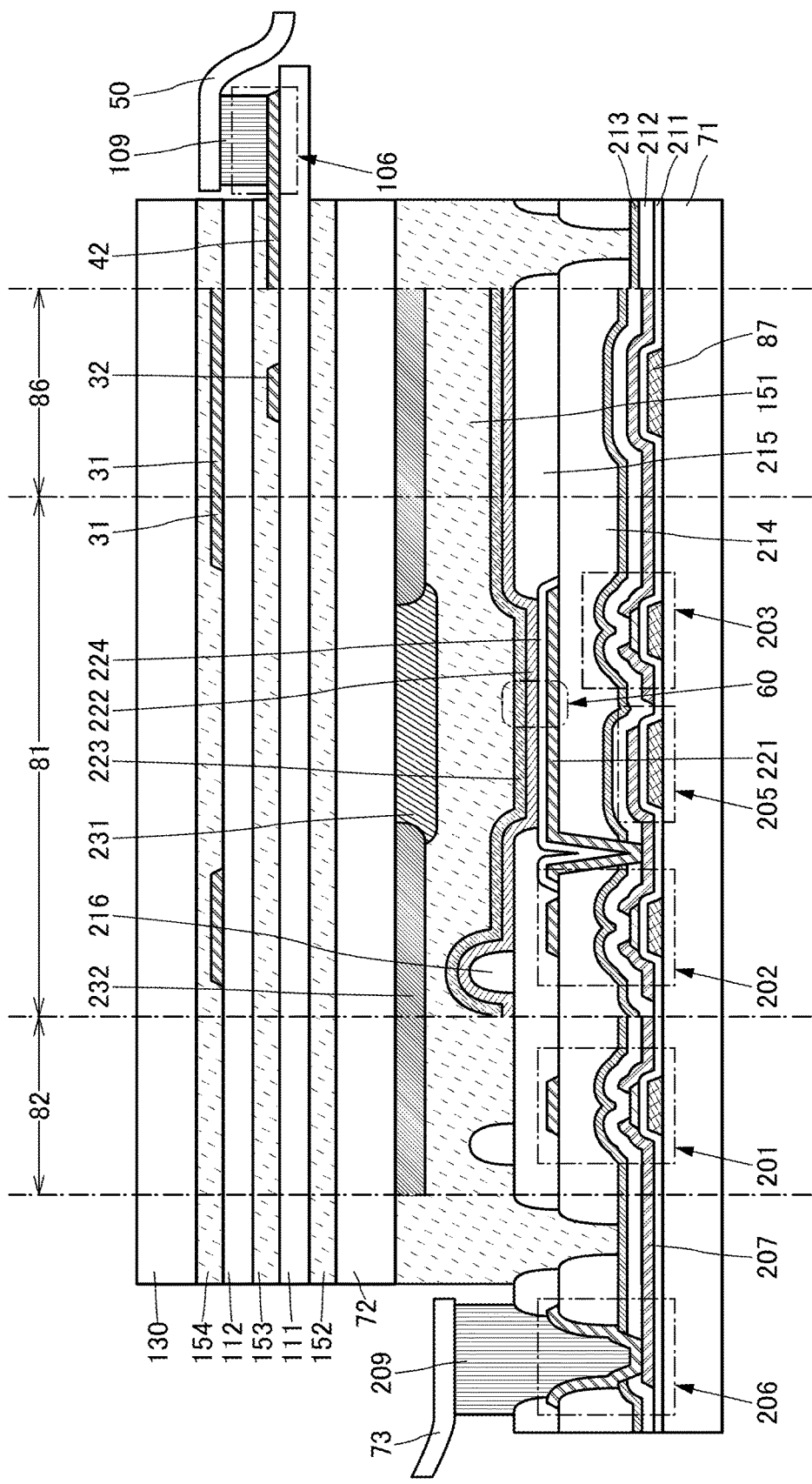
FIG. 15 illustrates a structure example of a touch panel of one embodiment.

A touch panel illustrated in FIG. 15 includes a substrate 111 and a substrate 112. The substrate 111 and the substrate 72 are attached to each other with the adhesive layer 152, and the substrate 111 and the substrate 112 are attached to each other with an adhesive layer 153.

The substrate 111 is provided with the electrode 32, the wiring 42, and the like. The substrate 112 is provided with the electrode 31, the wiring (not illustrated) electrically connected to the electrode 31, and the like. In FIG. 15, the FPC 50 is provided for the substrate 111; the substrate 112 is similarly provided with an FPC in a region not illustrated in the drawing.

In the case where two substrates are used in the structure of the input device 10 as described above, substrates as thin as, or thinner than, the substrates 71 and 72 are preferably used as the substrates 111 and 112. In particular, the material having flexibility described above is preferably used for the substrates 111 and 112, in which case the thickness of the touch panel 100 can be decreased.

A protective substrate 130 may be provided over the substrate 112 with an adhesive layer 154 therebetween as illustrated in FIG. 15. A surface of the protective substrate 130 on a side opposite to the substrate 112 side functions as a touch surface. The above description of the substrate 30 can be referred to for a material of the protective substrate 130.

Cross-Sectional Structure Example 4

Figure 16:
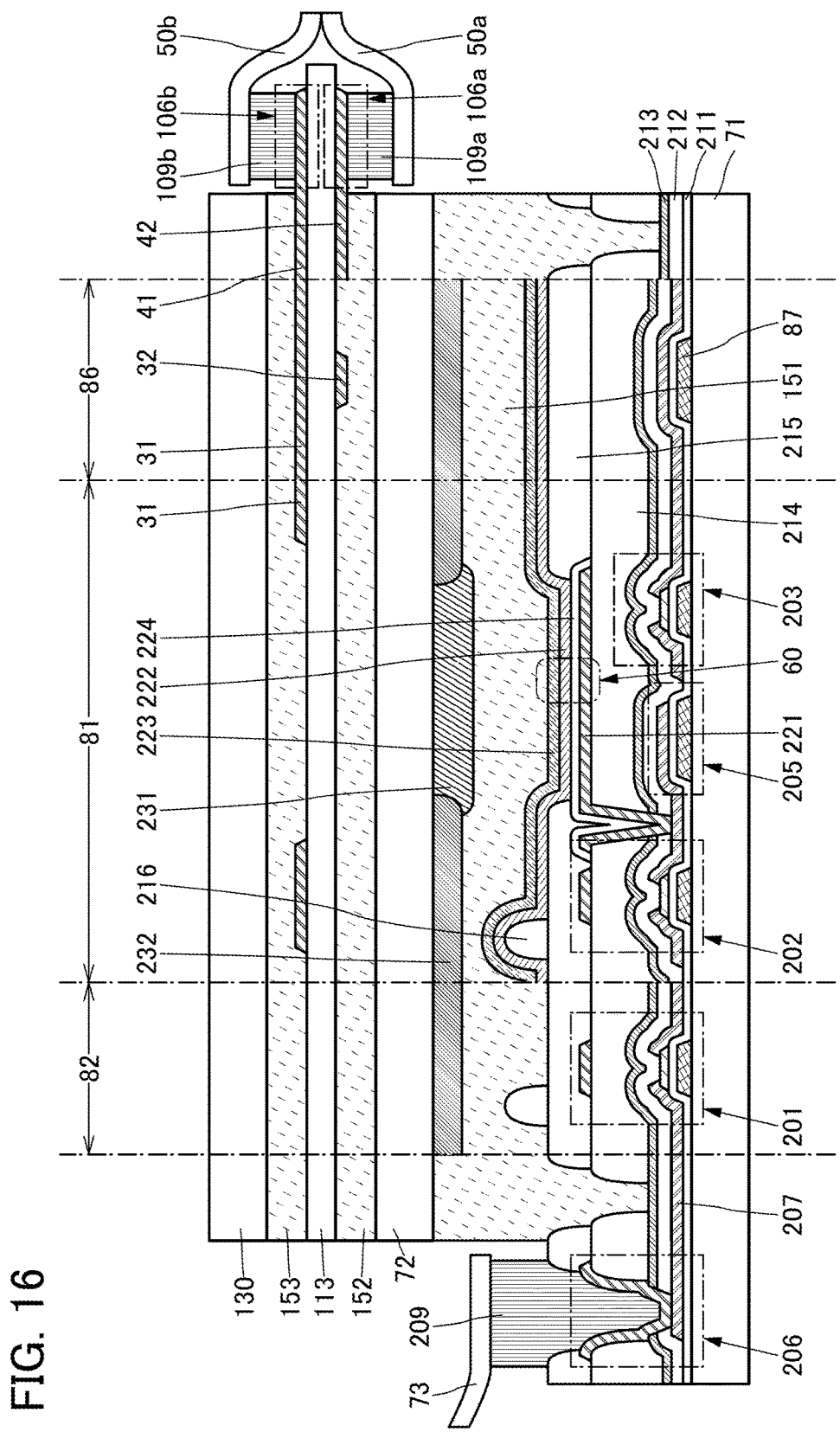
FIG. 16 illustrates a structure example of a touch panel of one embodiment.

A touch panel shown in FIG. 16 includes a substrate 113. The substrates 113 and 72 are attached to each other with the adhesive layer 152.

The substrate 113 is provided with the electrode 32, the wiring 42, and the like on one side. The substrate 113 is also provided with the electrode 31, a wiring 41 electrically connected to the electrode 31, and the like on the other side. That is, the electrodes and wirings in the touch sensor are provided on both sides of the substrate 113.

FIG. 16 illustrates an example in which an FPC 50a and a connection layer 109a are provided in a connection portion 106a where part of the wiring 42 is exposed, and an FPC 50b and a connection layer 109b are provided in a connection portion 106b where part of the wiring 41 is exposed. Note that the connection portion 106a and the connection portion 106b may overlap with each other in a plan view, or may be arranged so as not to overlap with each other.

Cross-Sectional Structure Example 5

Figure 17:
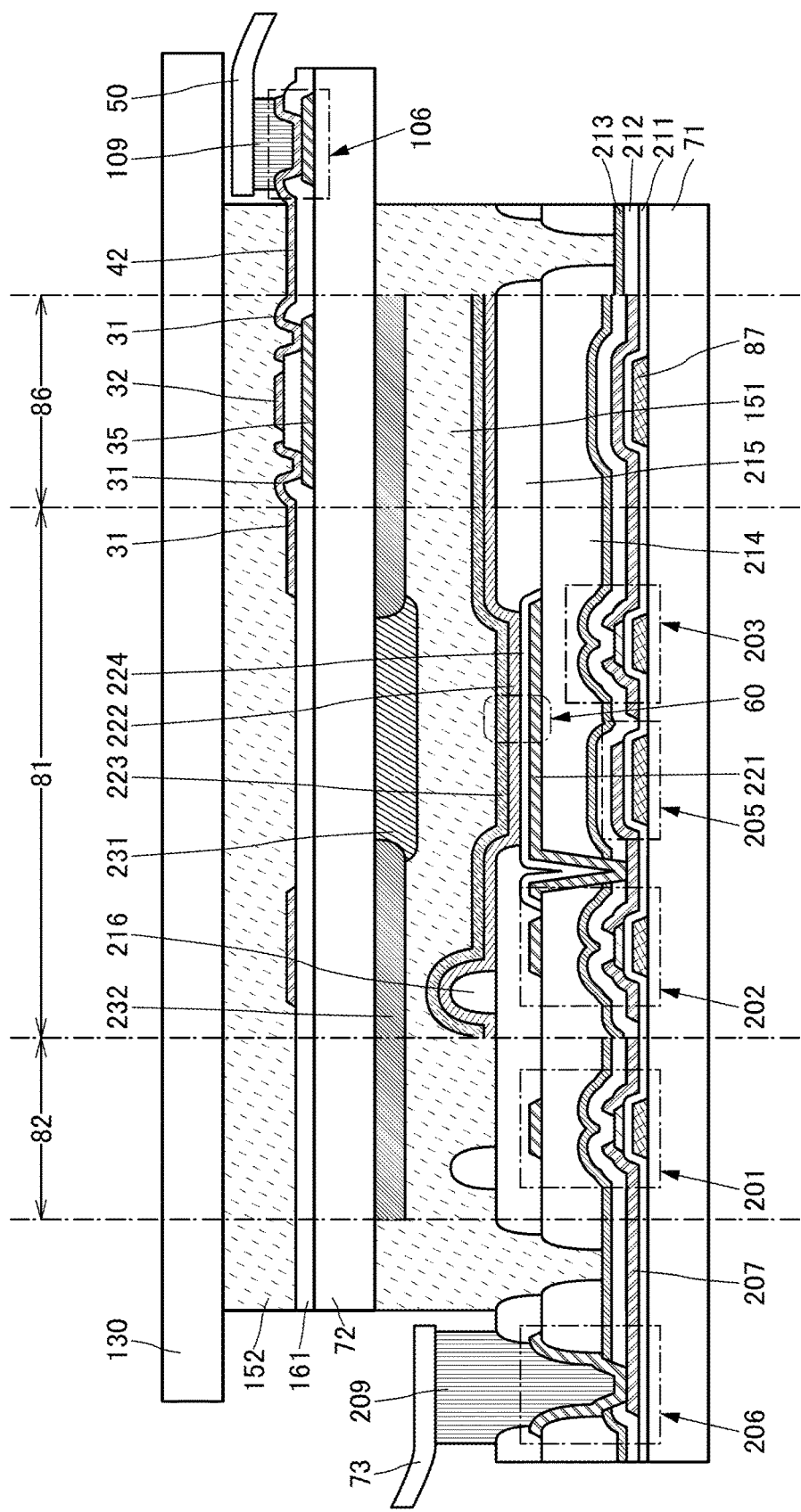
FIG. 17 illustrates a structure example of a touch panel of one embodiment.

In a touch panel illustrated in FIG. 17, the electrodes and the like of the touch sensor are provided over a surface of the substrate 72 that is opposite to a surface facing the substrate 71. Specifically, the substrate 72 is provided with the bridge electrode 35, and the insulating layer 161 covering part of the bridge electrode 35; and the electrode 31, the electrode 32, the wiring 41 (not illustrated), the wiring 42, and the like are over the insulating layer 161.

As illustrated in FIG. 17, the protective substrate 130 and the substrate 72 may be attached to each other with the adhesive layer 152.

In this structure, the input device 10 and the display panel 70 can share the substrate; thus, the thickness of the touch panel can be significantly decreased.

Cross-Sectional Structure Example 6

Figure 18:
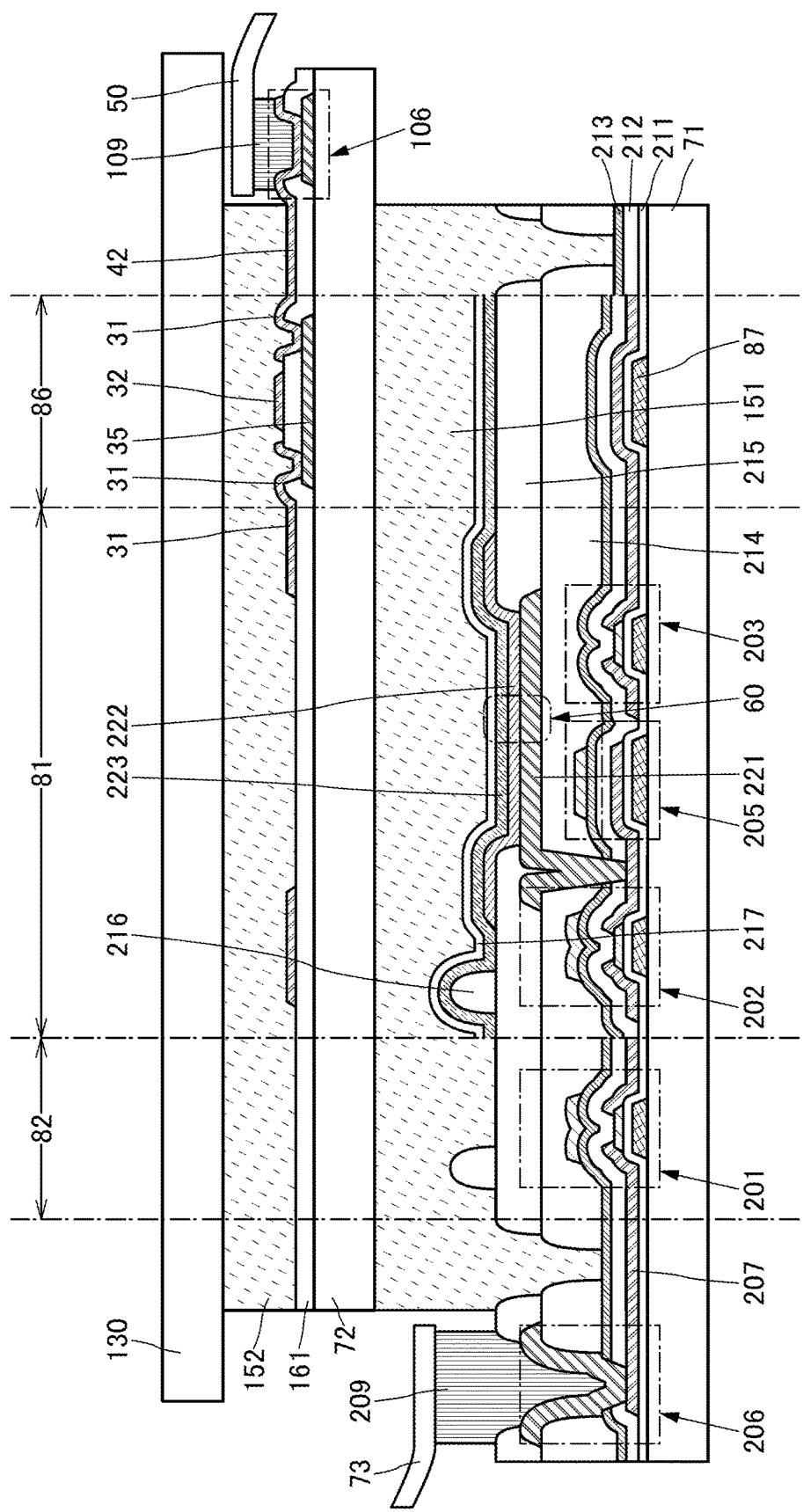
FIG. 18 illustrates a structure example of a touch panel of one embodiment.

FIG. 18 illustrates an example in which the structure of the touch sensor illustrated in FIG. 17 is combined with the structure of the touch panel illustrated in FIG. 14 where the light-emitting element formed by a separate coloring method is used as the display element 60. In the example illustrated in FIG. 18, the light-blocking layer 232 is not provided.

Cross-Sectional Structure Example 7

Figure 19:
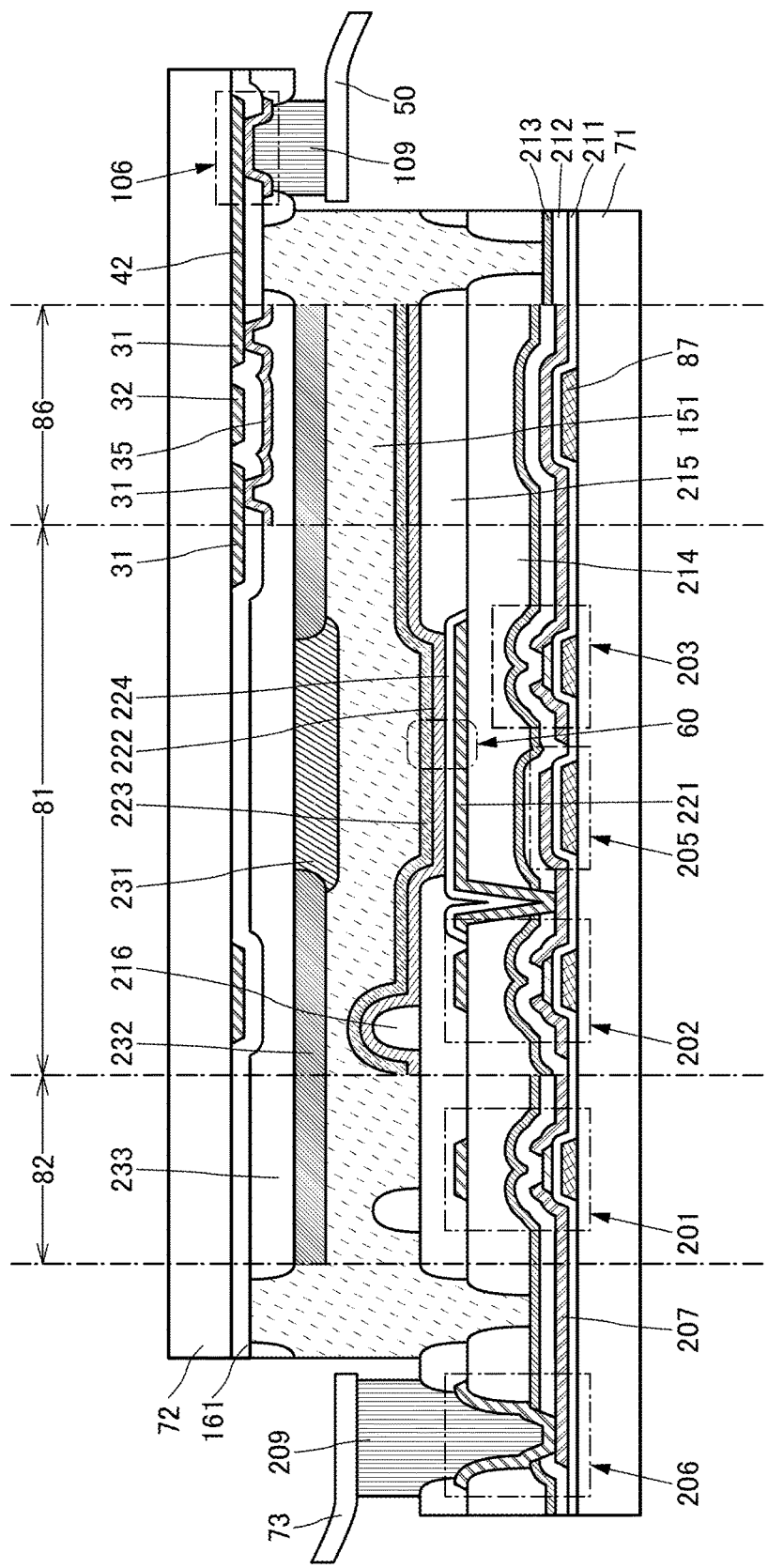
FIG. 19 illustrates a structure example of a touch panel of one embodiment.

In a touch panel illustrated in FIG. 19, the electrodes and the like in the touch sensor are provided on the substrate 71 side of the substrate 72. Specifically, the electrode 31, the electrode 32, the wiring 42, and the like are formed over the substrate 72; the insulating layer 161 is formed to cover these components; and the bridge electrode 35 and the like are formed over the insulating layer 161.

An insulating layer 233 is provided to cover the electrodes and the like in the touch sensor. In addition, the coloring layer 231, the light-blocking layer 232, and the like are provided over the insulating layer 233.

In this structure, the input device 10 and the display panel 70 can share the substrate and one surface of the substrate 72 can be used as a touch surface; thus, the thickness of the touch panel 100 can be further decreased.

Cross-Sectional Structure Example 8

Figure 20:
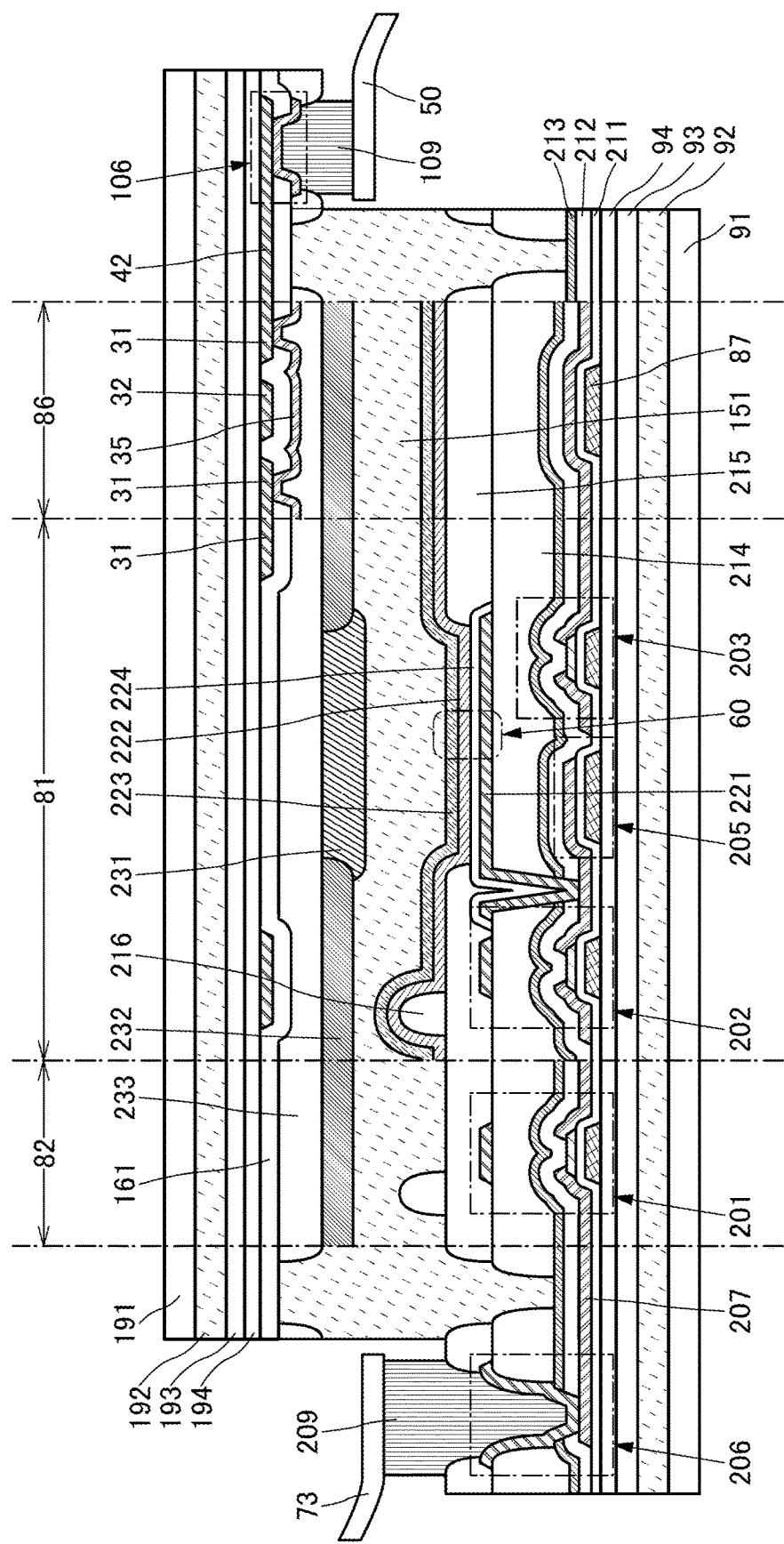
FIG. 20 illustrates a structure example of a touch panel of one embodiment.

FIG. 20 illustrates a modification example of the touch panel illustrated in FIG. 19.

The touch panel in FIG. 20 has a stacked-layer structure including a substrate 91, an adhesive layer 92, a substrate 93, and an insulating layer 94 in place of the substrate 71. The touch panel also has a stacked-layer structure including a substrate 191, an adhesive layer 192, a substrate 193, and an insulating layer 194 in place of the substrate 72.

A material through which impurities such as water or hydrogen do not easily diffuse can be used for the insulating layer 94 and the insulating layer 194. Such a structure can effectively suppress diffusion of the impurities into the display element 60 and the transistors even in the case of using a material permeable to water for the substrate 91, the substrate 93, the substrate 191, and the substrate 193, and a highly reliable touch panel can be achieved.

A material such as a resin having flexibility can be used for the substrate 93 and the substrate 193. Films having flexibility or the like are preferably used as the substrate 91 and the substrate 191. With the use of a material having flexibility for these substrates, a bendable touch panel can be achieved.

Cross-Sectional Structure Example 9

Figure 21:
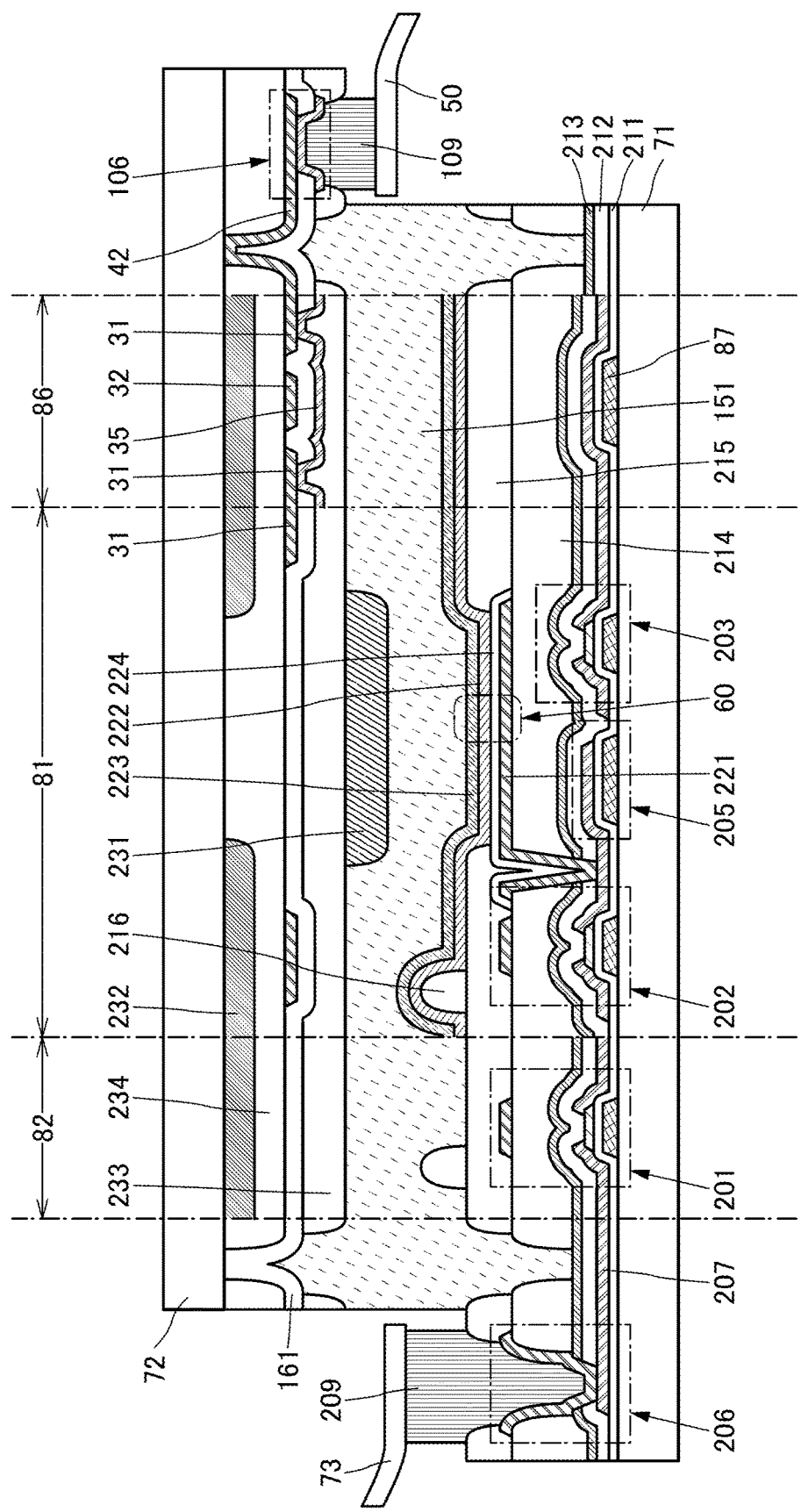
FIG. 21 illustrates a structure example of a touch panel of one embodiment.

In a touch panel illustrated in FIG. 21, the light-blocking layer 232 is provided between the electrodes and the like of the touch sensor and the substrate 72. Specifically, the substrate 72 is provided with the light-blocking layer 232, and an insulating layer 234 is formed to cover the light-blocking layer 232. The electrode 31, the electrode 32, the wiring 42, the insulating layer 161 covering these components, and the bridge electrode 35 over the insulating layer 161, and the like are provided for an insulating layer 234. In addition, the insulating layer 233 is formed over the bridge electrode 35 and the insulating layer 161, and the coloring layer 231 is formed over the insulating layer 233.

The insulating layers 233 and 234 have a function as a planarization film. Note that the insulating layer 233 and 234 are not necessarily provided when not needed.

With such a structure, the light-blocking layer 232 provided in a position closer to the viewing side than the electrodes and the like of the touch sensor can prevent external light from being reflected by the electrodes and the like, and prevent the electrodes and the like from being visible. Thus, a touch panel with not only small thickness but also improved visibility can be achieved.

Cross-Sectional Structure Example 10

Figure 22:
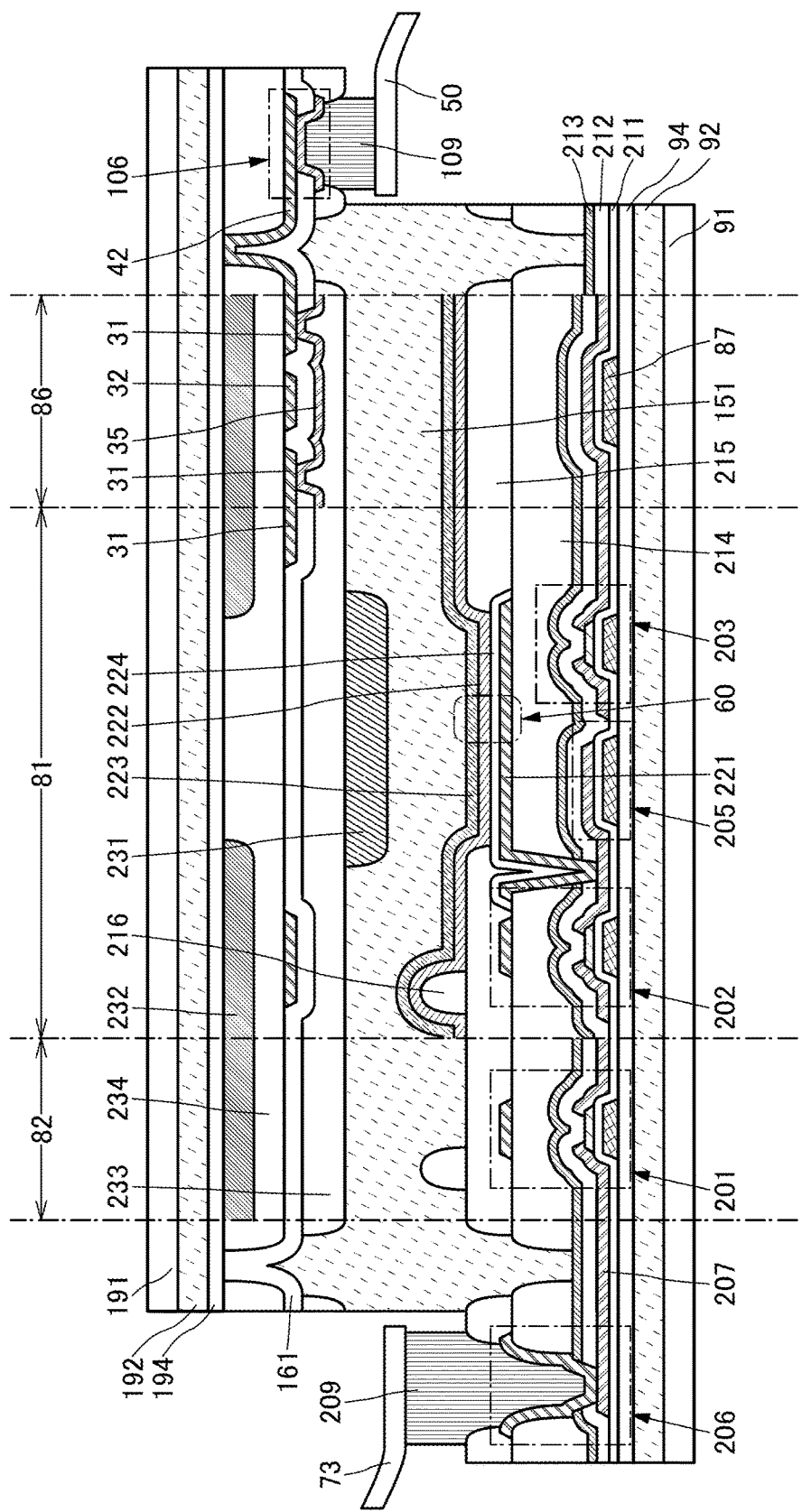
FIG. 22 illustrates a structure example of a touch panel of one embodiment.

FIG. 22 illustrates a modification example of the touch panel illustrated in FIG. 21.

The touch panel in FIG. 22 has a stacked-layer structure including the substrate 91, the adhesive layer 92, and the insulating layer 94 in place of the substrate 71. The touch panel also has a stacked-layer structure including the substrate 191, the adhesive layer 192, and the insulating layer 194 in place of the substrate 72.

With the use of a material having flexibility for the substrates 91 and 191, a bendable touch panel can be achieved.

Cross-Sectional Structure Example 11

Figure 23:
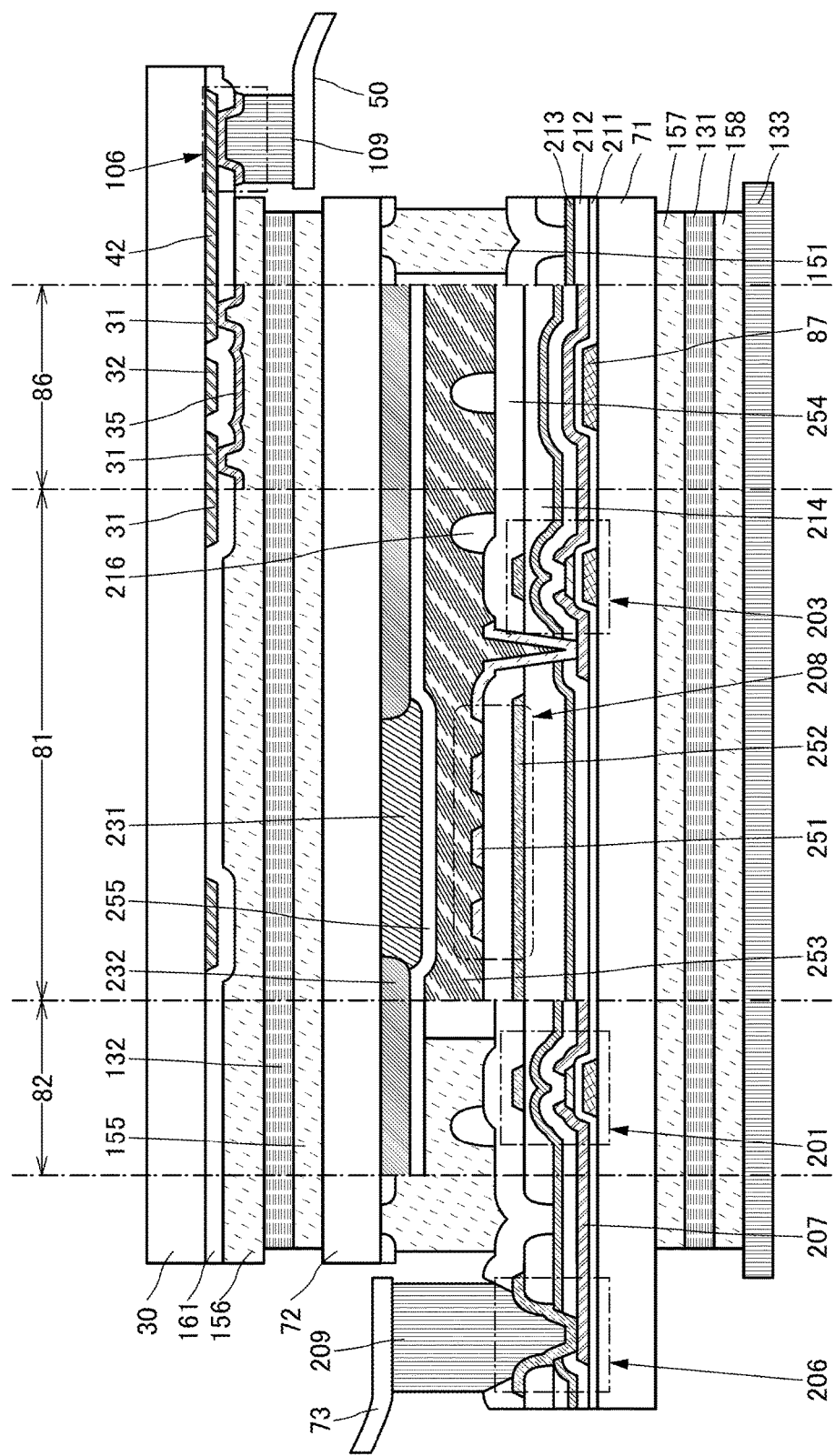
FIG. 23 illustrates a structure example of a touch panel of one embodiment.

FIG. 23 illustrates a cross-sectional structure example of a touch panel where a liquid crystal display device is used as the display panel 70. In the touch panel illustrated in FIG. 23, a liquid crystal element is used as a display element 208. The touch panel includes a polarizing plate 131, a polarizing plate 132, and a backlight 133.

In the example illustrated here, a liquid crystal element using a fringe field switching (FFS) mode is used as the display element 208. The display element 208 includes an electrode 251, an electrode 252, and a liquid crystal 253. The electrode 251 is provided over the electrode 252 with an insulating layer 254 provided therebetween, and has a comb-like shape or a shape provided with a slit.

An overcoat 255 is provided to cover the coloring layer 231 and the light-blocking layer 232. The overcoat 255 has a function of preventing a pigment or the like which is included in the coloring layer 231 or the light-blocking layer 232 from diffusing into the liquid crystal 253.

Surfaces of the overcoat 255, the insulating layer 254, the electrode 251, and the like which are in contact with the liquid crystal 253 may be provided with alignment films for controlling the orientation of the liquid crystal 253.

In FIG. 23, the polarizing plate 131 is attached to the substrate 71 with an adhesive layer 157. The backlight 133 is attached to the polarizing plate 131 with an adhesive layer 158. The polarizing plate 132 is positioned between the substrate 72 and the substrate 30. The polarizing plate 132 is attached to the substrate 72 with an adhesive layer 155, and is attached to the substrate 30 (specifically, part of the insulating layer 161 provided with the substrate 30) with an adhesive layer 156.

Although the liquid crystal element using an FFS mode is described above, a vertical alignment (VA) mode, a twisted nematic (TN) mode, an in-plane-switching (IPS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

As the liquid crystal, a thermotropic liquid crystal, a low-molecular liquid crystal, a high-molecular liquid crystal, a ferroelectric liquid crystal, an anti-ferroelectric liquid crystal, a polymer dispersed liquid crystal (PDLC), or the like can be used. Moreover, a liquid crystal exhibiting a blue phase is preferably used because an alignment film is not needed and a wide viewing angle is obtained in that case.

Cross-Sectional Structure Example 12

Figure 24:
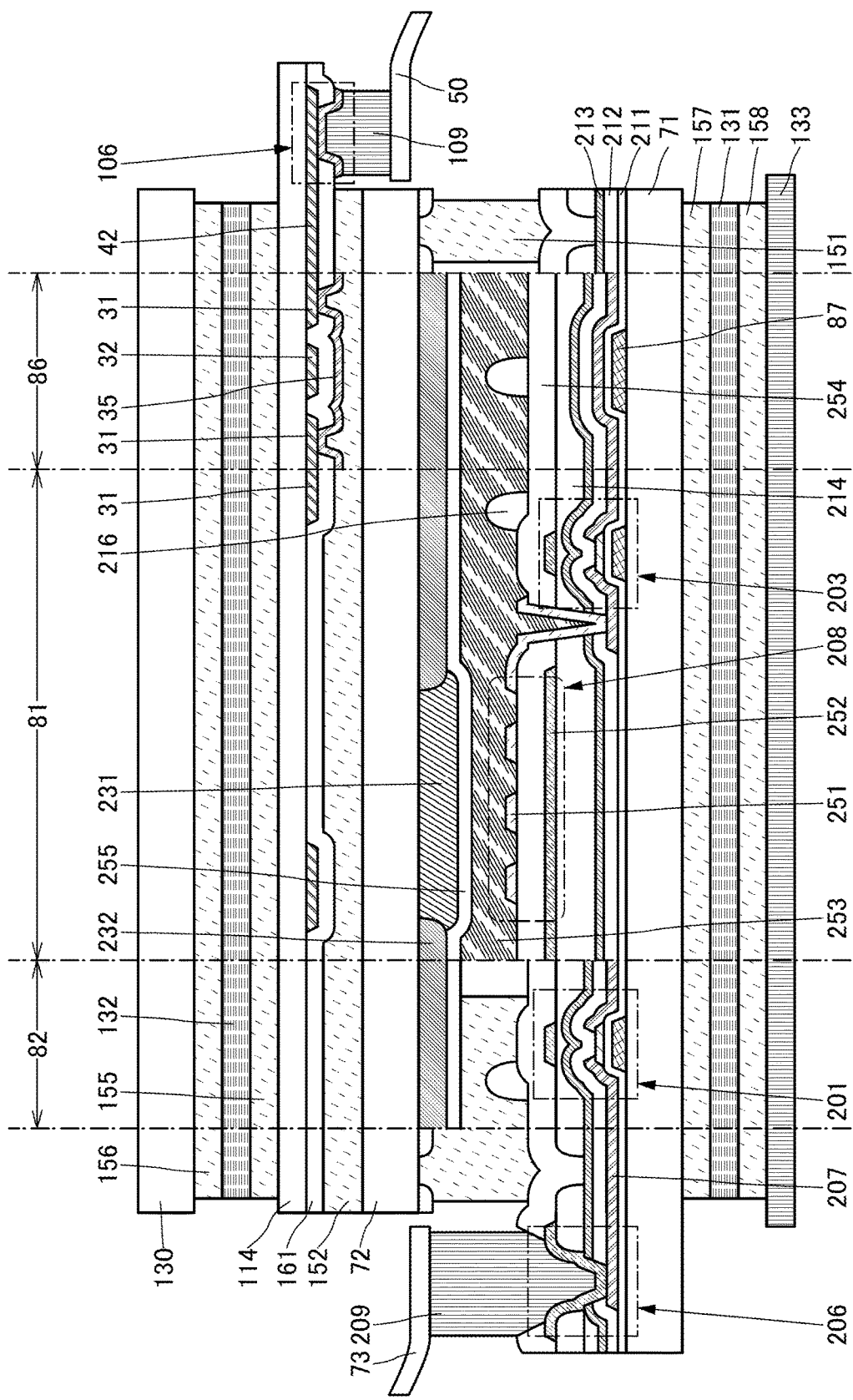
FIG. 24 illustrates a structure example of a touch panel of one embodiment.

FIG. 24 illustrates a cross-sectional structure example of a touch panel where a liquid crystal display device is used as the display panel 70. In the touch panel illustrated in FIG. 24, the polarizing plate 132 is provided in a position closer to the viewing side than that of the electrodes and the like in the touch sensor. Specifically, a substrate 114 provided with the electrode 31, the electrode 32, and the like is attached to the substrate 72 with the adhesive layer 152, and the polarizing plate 132 is attached to the substrate 114 with the adhesive layer 155. The protective substrate 130 attached to the polarizing plate 132 with the adhesive layer 156 is provided in a position closer to the viewing side than that of the polarizing plate 132.

A film having flexibility or the like is preferably used as the substrate 114 because the thickness of the touch panel can be decreased.

Cross-Sectional Structure Example 13

Figure 25:
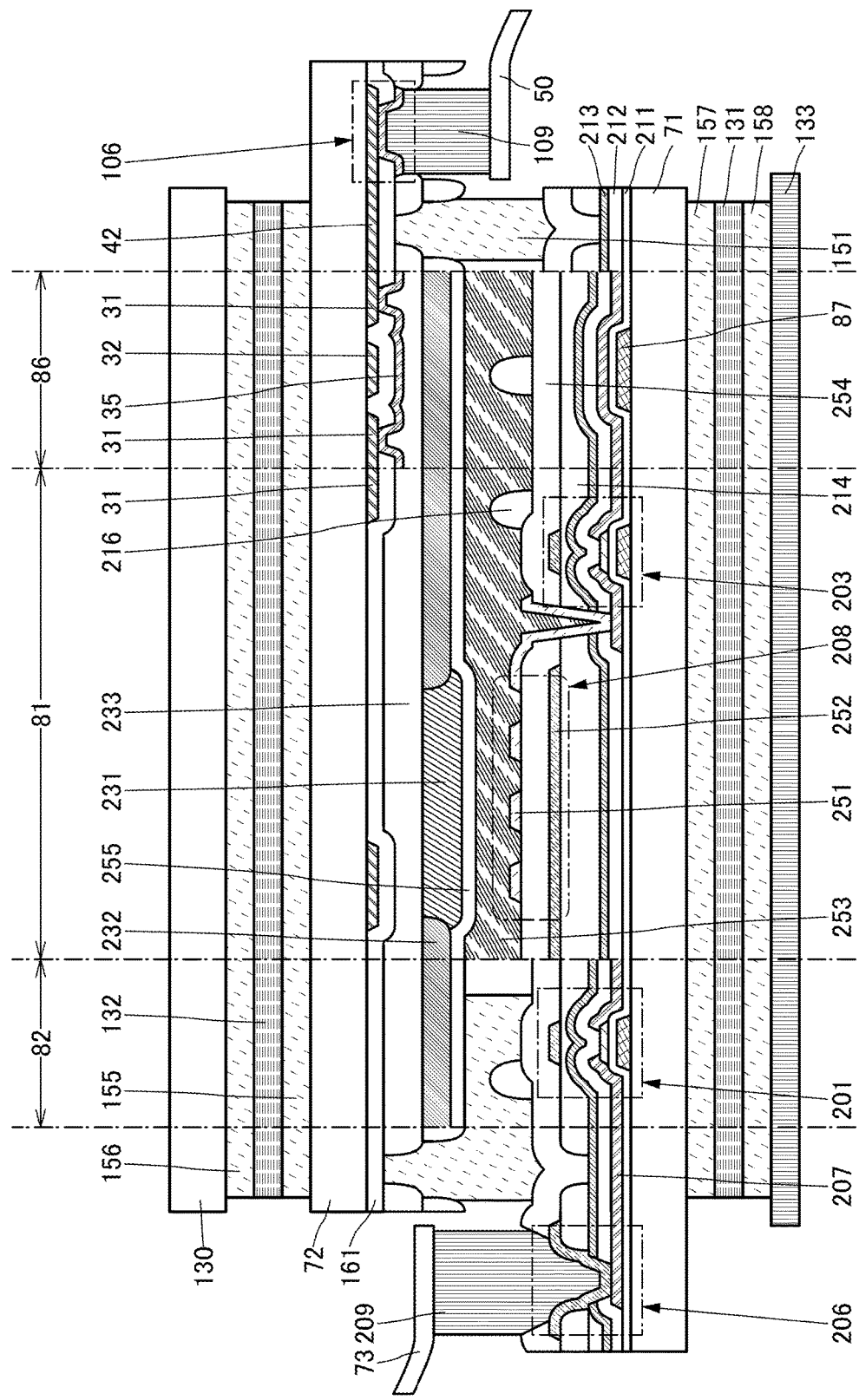
FIG. 25 illustrates a structure example of a touch panel of one embodiment.

FIG. 25 illustrates a cross-sectional structure example of a touch panel where a liquid crystal display device is used as the display panel. In the example of the touch panel illustrated in FIG. 25, the electrodes and the like in the touch sensor are formed on the substrate 71 side of the substrate 72. Specifically, the electrode 31, the electrode 32, the wiring 42, and the like are formed over the substrate 72; the insulating layer 161 is formed to cover these components; and the bridge electrode 35 and the like are formed over the insulating layer 161. The insulating layer 233 is formed to cover the electrodes and the like of the touch sensor. In addition, the coloring layer 231, the light-blocking layer 232, and the like are provided to ride the insulating layer 233.

The polarizing plate 132 is attached to the opposite side of the substrate 72 with the adhesive layer 155. The protective substrate 130 is attached to the polarizing plate 132 with the adhesive layer 156.

In this structure, the input device and the display panel can share the substrate and one surface of the substrate 72 can be used as a touch surface; thus, the thickness of the touch panel can be further decreased.

Cross-Sectional Structure Example 14

Figure 26:
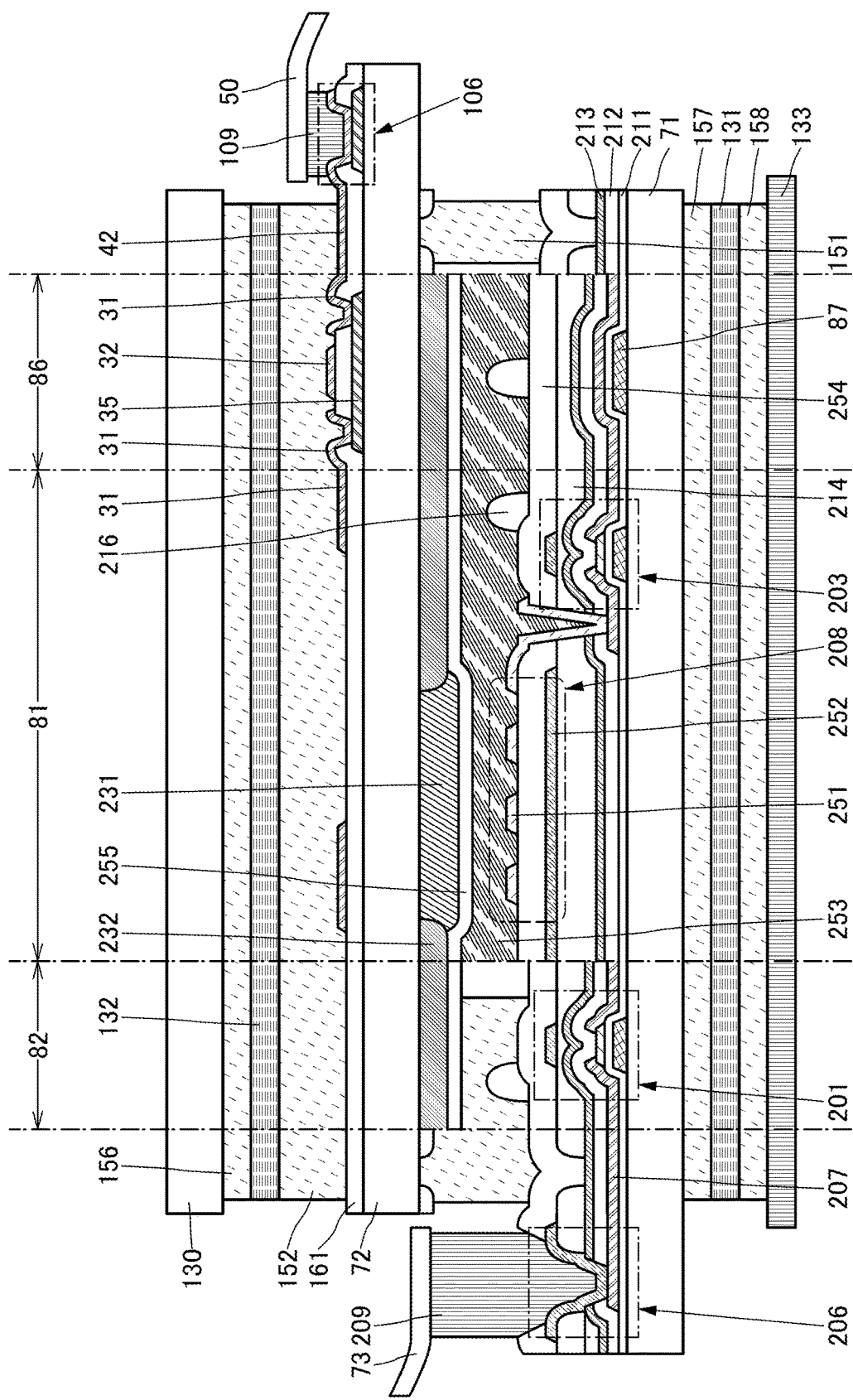
FIG. 26 illustrates a structure example of a touch panel of one embodiment.

FIG. 26 illustrates a cross-sectional structure example of a touch panel where a liquid crystal display device is used as the display panel. In the example of the touch panel illustrated in FIG. 26, the electrodes and the like of the touch sensor are provided on a side of the substrate 72 opposite to the substrate 71 side. Specifically, the bridge electrode 35 is formed over a surface of the substrate 72 on a side opposite to the side where the coloring layer 231 and the like are provided; the insulating layer 161 is formed to cover part of the bridge electrode 35; and the electrode 31, the electrode 32, the wiring 42, and the like are formed over the insulating layer 161. The polarizing plate 132 is attached to the substrate 72 with the adhesive layer 152, and the protective substrate 130 is attached to the polarizing plate 132 with the adhesive layer 156.

Modification Example

A structure example of a touch panel in which a protective film is used and the reliability is improved will be described below.

The protective film can be provided so as to cover an exposed portion of the touch panel. For example, the protective film can be provided so as to cover surfaces or side surfaces of the pair of substrates, exposed side surfaces of the adhesive layer, the insulating layer, and the like.

For the protective film, a material that is impermeable to moisture is preferably used. For example, an oxide, a nitride, a fluoride, a sulfide, a ternary compound, a metal, or a polymer can be used.

For example, a material containing aluminum oxide, hafnium oxide, hafnium silicate, lanthanum oxide, silicon oxide, strontium titanate, tantalum oxide, titanium oxide, zinc oxide, niobium oxide, zirconium oxide, tin oxide, yttrium oxide, cerium oxide, scandium oxide, erbium oxide, vanadium oxide, indium oxide, or the like can be used.

For example, a material containing aluminum nitride, hafnium nitride, silicon nitride, tantalum nitride, titanium nitride, niobium nitride, molybdenum nitride, zirconium nitride, gallium nitride, or the like can be used.

For example, a material that includes a nitride containing titanium and aluminum, an oxide containing titanium and aluminum, an oxide containing aluminum and zinc, a sulfide containing manganese and zinc, a sulfide containing cerium and strontium, an oxide containing erbium and aluminum, an oxide containing yttrium and zirconium, or the like can be used.

For example, a material that can be formed by an atomic layer deposition (ALD) method is preferably used for the protective film. The dense protective film having reduced defects such as cracks or pinholes or a uniform thickness can be formed by an ALD method. Furthermore, damage caused to a process member in forming the protective film can be reduced.

The protective film is formed by an ALD method, for example, whereby the protective film with few defects, which is uniform in thickness on a surface with complex unevenness, and the top, side, and rear surfaces of the touch panel can be formed.

Use of such a protective film in the touch panel can suppress diffusion of impurities such as moisture into the touch panel from the outside. Thus, diffusion of the impurities into a display element (e.g., an organic EL element and a liquid crystal element), a transistor, a wiring, or an electrode in the touch panel can be suppressed. As a result, a highly reliable touch panel can be achieved.

Examples of cross-sectional structures of touch panels using such a protective film are described below.

Cross-Sectional Structure Example 15

Figure 27:
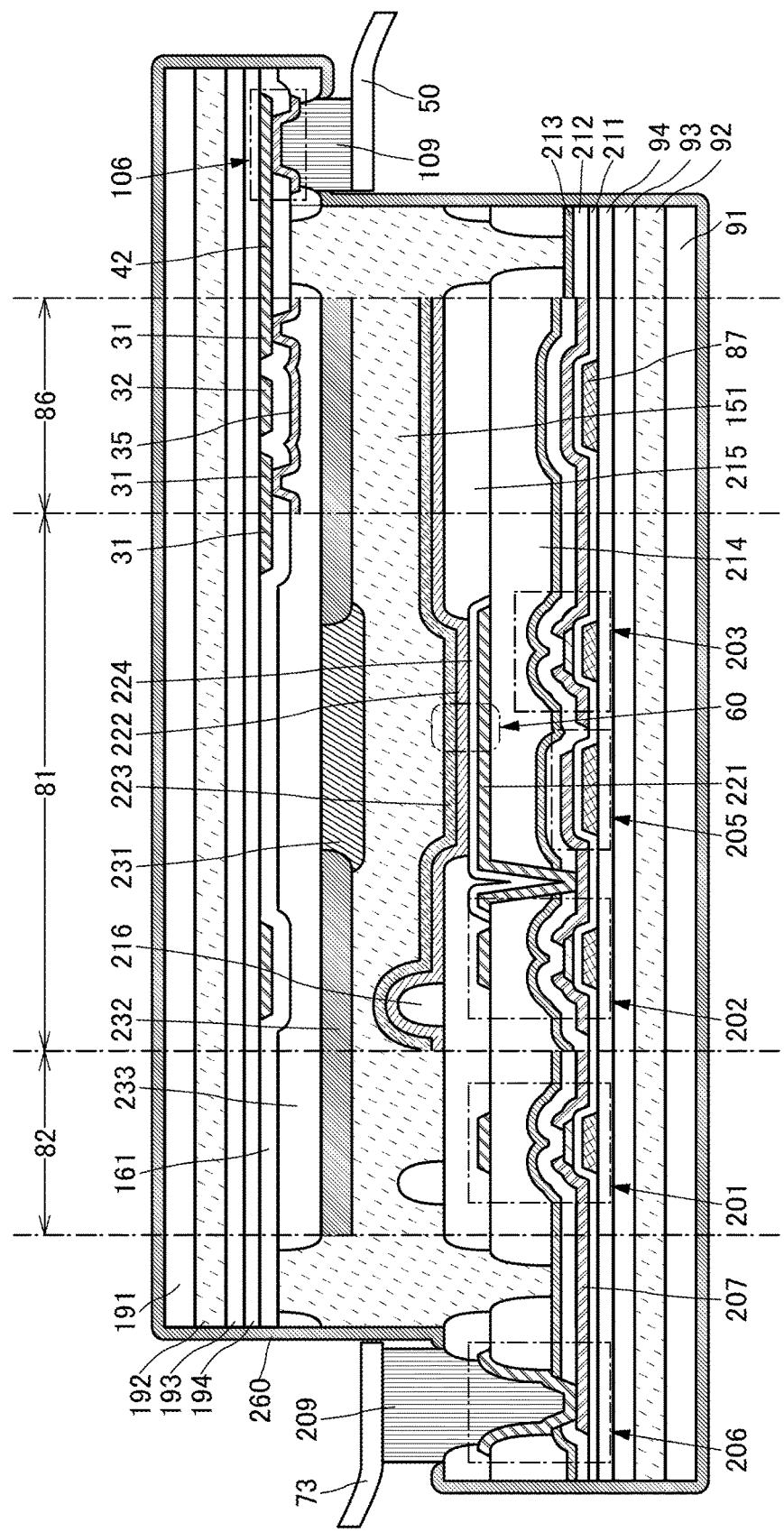
FIG. 27 illustrates a structure example of a touch panel of one embodiment.

FIG. 27 is a schematic cross-sectional view of the touch panel in FIG. 20 using a protective film 260.

The protective film 260 is provided so as to cover an exposed portion of the touch panel. Specifically, the protective film 260 is provided so as to partly or entirely cover exposed surfaces of the substrate 191, the adhesive layer 192, the substrate 193, the insulating layer 194, the insulating layer 161, the insulating layer 233, the adhesive layer 151, the insulating layer 215, the insulating layer 214, the insulating layer 213, the insulating layer 212, the insulating layer 211, the insulating layer 94, the substrate 93, the adhesive layer 92, the substrate 91, and the like.

As shown in FIG. 27, in the connection portion 206, an opening, of the protective film 260 is preferably provided in a portion overlapping with the connection layer 209. Similarly, in the connection portion 106, an opening of the protective film 260 is preferably provided in a portion overlapping with the connection layer 109. Thus, electrical connection between the FPC 73 and the connection portion 206 and between the FPC 50 and the connection portion 106 can be easily made.

That is, the structure in which the protective film 260 is provided so as to cover a region other than the connection portions (terminal portions) to which FPCs and the like are electrically connected is preferable because diffusion of impurities from the outside can be effectively suppressed.

A portion over which the protective film 260 is not provided, such as the connection portion 206 or the connection portion 106, is formed in the following manner: the protective film 260 is entirely formed and then part of which is physically separated. Alternatively, before forming the protective film 260, a portion without the protective film 260 may be formed by masking treatment.

Cross-Sectional Structure Example 16

Figure 28:
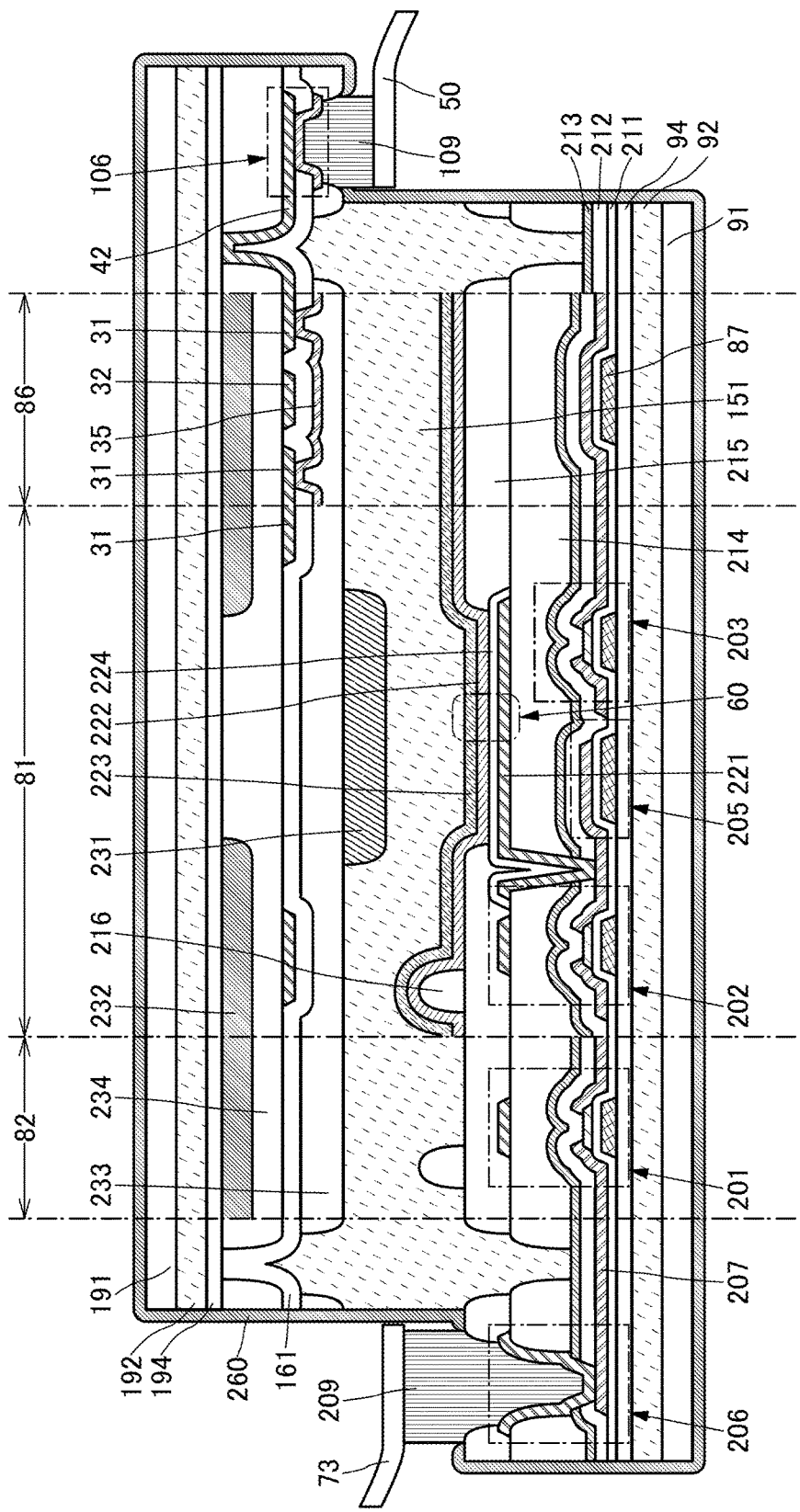
FIG. 28 illustrates a structure example of a touch panel of one embodiment.

FIG. 28 is a schematic cross-sectional view of the touch panel in FIG. 22 using the protective film 260.

The protective film 260 is provided so as to cover an exposed portion of the touch panel. Specifically, the protective film 260 is provided so as to partly or entirely cover exposed surfaces of the substrate 191, the adhesive layer 192, the insulating layer 194, the insulating layer 234, the insulating layer 161, the insulating layer 233, the adhesive layer 151, the insulating layer 213, the insulating layer 212, the insulating layer 211, the insulating layer 94, the adhesive layer 92, the substrate 91, and the like.

Cross-Sectional Structure Example 17

Figure 29:
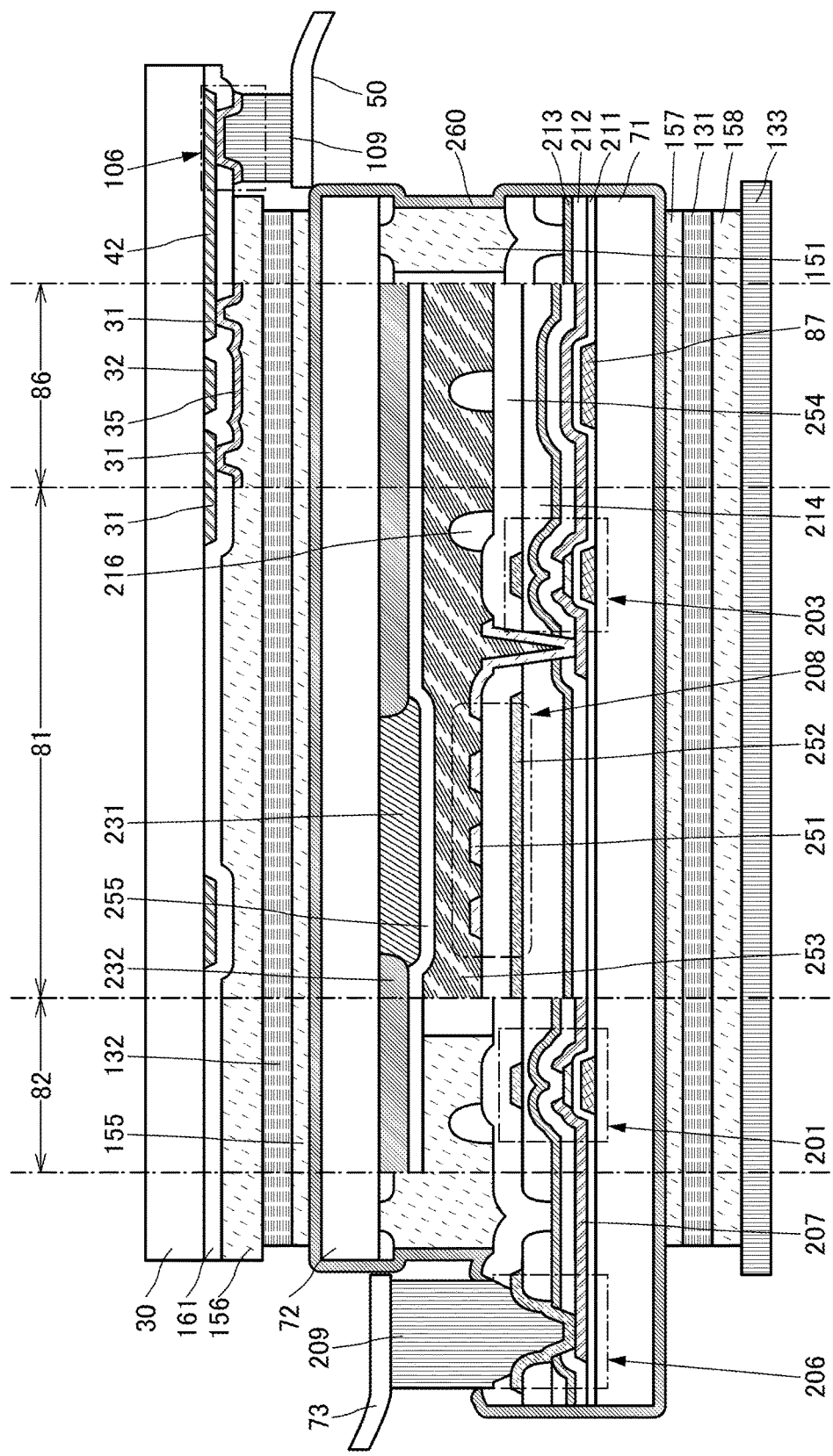
FIG. 29 illustrates a structure example of a touch panel of one embodiment.

FIG. 29 is a schematic cross-sectional view of the touch panel in FIG. 23 using the protective film 260.

In the structure illustrated in FIG. 29, the protective film 260 is provided so as to cover the display panel 70 in which the display element 208 that is a liquid crystal element is used. Specifically, the protective film 260 is provided so as to partly or entirely cover exposed surfaces of the substrate 72, the overcoat 255, the adhesive layer 151, the insulating layer 254, the insulating layer 214, the insulating layer 213, the insulating layer 212, the insulating layer 211, the substrate 71, and the like.

The adhesive layers 155 and 157 are each provided in contact with the protective film 260.

In these modification examples, three cross-sectional structure examples are illustrated; however, one embodiment of the present invention is not limited thereto, and the protective film 260 can be used in any of the touch panels illustrated in cross-sectional structure examples in FIG. 13 to FIG. 26.

The above is the description of the cross-sectional structure examples.

Example of Manufacturing Method

Here, a method for manufacturing a flexible touch panel is described.

For convenience, a structure including a pixel and a circuit, a structure including an optical member such as a color filter, a structure including an electrode or a wiring of a touch sensor, or the like is referred to as an element layer. An element layer includes a display element, for example, and may include a wiring electrically connected to a display element or an element such as a transistor used in a pixel or a circuit in addition to the display element.

Here, a support body (e.g., the substrate 91 or the substrate 191 in FIG. 22) with an insulating surface where an element layer is formed is referred to as a substrate.

As a method for forming an element layer over a flexible substrate provided with an insulating surface, there are a method in which an element layer is formed directly over a substrate, and a method in which an element layer is formed over a supporting base material that has stiffness and then the element layer is separated from the supporting base material and transferred to the substrate.

In the case where a material of the substrate can withstand heating temperature in a process for forming the element layer, it is preferable that the element layer be formed directly over the substrate, in which case a manufacturing process can be simplified. At this time, the element layer is preferably formed in a state where the substrate is fixed to a supporting base material, in which case transfer thereof in an apparatus and between apparatuses can be easy.

In the case of employing the method in which the element layer is formed over the supporting base material and then transferred to the substrate, first, a separation layer and an insulating layer are stacked over the supporting base material, and then the element layer is formed over the insulating layer. Next, the element layer is separated from the supporting base material and then transferred to the substrate. At this time, selected is a material with which separation at an interface between the supporting base material and the separation layer, at an interface between the separation layer and the insulating layer, or in the separation layer occurs.

For example, it is preferable that a stacked layer of a layer including a high-melting-point metal material, such as tungsten, and a layer including an oxide of the metal material be used as the separation layer, and a stacked layer of a plurality of layers, such as a silicon nitride layer, a silicon oxynitride layer, and a silicon nitride oxide layer be used as the insulating layer over the separation layer. The use of the high-melting-point metal material is preferable because the degree of freedom of the process for forming the element layer can be increased.

The separation may be performed by application of mechanical power, by etching of the separation layer, by dripping of a liquid into part of the separation interface to penetrate the entire separation interface, or the like. Alternatively, separation may be performed by heating the separation interface by utilizing a difference in thermal expansion coefficient.

The separation layer is not necessarily provided in the case where separation can occur at an interface between the supporting base material and the insulating layer. For example, glass and an organic resin such as polyimide may be used as the supporting base material and the insulating layer, respectively, and a separation trigger may be formed by locally heating part of the organic resin by laser light or the like, so that separation may be performed at an interface between the glass and the insulating layer. Alternatively, a metal layer may be provided between the supporting base material and the insulating layer formed of an organic resin, and separation may be performed at the interface between the metal layer and the insulating layer formed of an organic resin by heating the metal layer by feeding current to the metal layer. A layer of a light-absorbing material (e.g., a metal, a semiconductor, or an insulator) may be provided between the supporting base layer and the insulating layer formed of an organic resin and locally heated with laser light or the like to form a separation trigger. In these methods, the insulating layer formed of an organic resin can be used as a substrate.

In the structure shown in FIG. 22, for example, a first separation layer and the insulating layer 94 are formed in this order over a first supporting base material, and then components over the first separation layer and the insulating layer 94 are formed. Separately, a second separation layer and the insulating layer 194 are formed in this order over a second supporting base material, and then upper components are formed. Next, the first supporting base material and the second supporting base material are attached to each other with the adhesive layer 151. After that, separation at an interface between the second separation layer and the insulating layer 194 is conducted so that the second supporting base material and the second separation layer are removed, and then the substrate 191 is attached to the insulating layer 194 with the adhesive layer 192. Further, separation at an interface between the first separation layer and the insulating layer 94 is conducted so that the first supporting base material and the first separation layer are removed, and then the substrate 91 is attached to the insulating layer 94 with the adhesive layer 92. Note that either side may be subjected to separation and attachment first.

The above is the description of a manufacturing method of a flexible touch panel.

Although a light-emitting element and a liquid crystal element are used as a display element here, one embodiment of the present invention is not limited thereto.

For example, a display element such as a micro electro mechanical systems (MEMS) element or an electron-emissive element can be used in the display device. Examples of MEMS display elements include a MEMS shutter display element, an optical interference type MEMS display element, and the like. A carbon nanotube may be used for the electron-emissive element. Alternatively, electronic paper may be used. As the electronic paper, an element using a microcapsule method, an electrophoretic method, an electrowetting method, an Electronic Liquid Powder (registered trademark) method, or the like can be used.

Structure Example of Deposition Apparatus

An apparatus with which a thin film for forming a touch panel of one embodiment of the present invention can be deposited is described below. The apparatus described below can be preferably used for the deposition of particularly the protective film 217, the protective film 260, the insulating layer 212, the insulating layer 213, the insulating layer 94, the insulating layer 194, and the like.

Structure Example of Deposition Apparatus ALD

Figure 30:
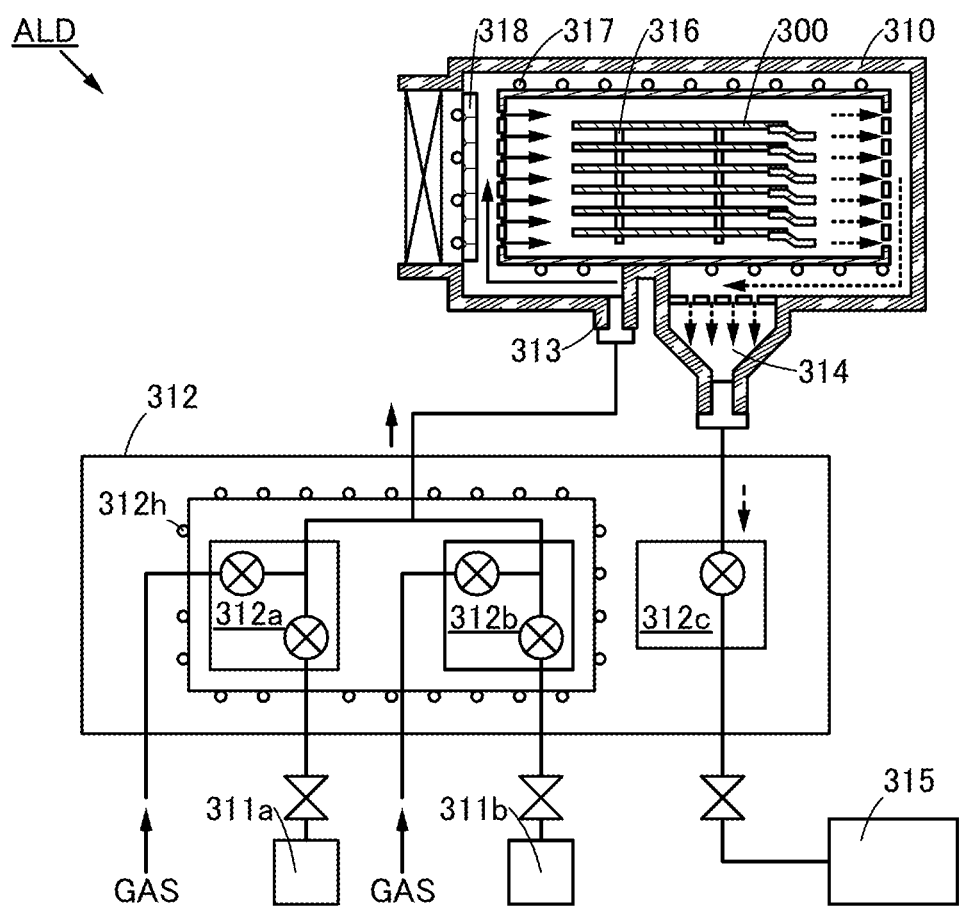
FIG. 30 illustrates a structure of a deposition apparatus of one embodiment.

FIG. 30 illustrates a deposition apparatus ALD.

The deposition apparatus ALD described in this embodiment includes a deposition chamber 310 and a control portion 312 connected to the deposition chamber 310 (see FIG. 30).

The control portion 312 includes a control unit (not shown) that supplies control signals and flow rate controllers 312a, 312b, and 312c to which the control signals are supplied. For example, high-speed valves can be used as the flow rate controllers. Specifically, flow rates can be precisely controlled by using ALD valves or the like. The control portion 312 includes a heating mechanism 312h which controls the temperature in the flow rate controllers and pipes.

The flow rate controller 312a is supplied with a control signal, a first source material, and an inert gas, and has a function of supplying the first source material or the inert gas in accordance with the control signal.

The flow rate controller 312b is supplied with a control signal, a second source material, and an inert gas and has a function of supplying the second source material or the inert gas in accordance with the control signal.

The flow rate controller 312c is supplied with a control signal, and has a function of connecting to an evacuation unit 315 in accordance with the control signal.
<<Source Material Supply Portion>>

A source material supply portion 311a has a function of supplying the first source material and is connected to the flow rate controller 312a.

A source material supply portion 311b has a function of supplying the second source material and is connected to the flow rate controller 312b.

A vaporizer, a heating unit, or the like can be used as each of the source material supply portions. Thus, a gaseous source material can be generated from a solid or liquid source material.

Note that the number of the source material supply portions is not limited to two and may be three or more. The flow rate controllers may be arranged in accordance with the number of the source material supply portions.
<<Source Material>>

Any of a variety of substances can be used as the first source material.

For example, a volatile organometallic compound, a volatile metal alkoxide, or the like can be used as the first source material.

Any of a variety of substances that react with the first source material can be used as the second source material. For example, a substance that contributes to an oxidation reaction, a substance that contributes to a reduction reaction, a substance that contributes to an addition reaction, a substance that contributes to a decomposition reaction, a substance that contributes to a hydrolysis reaction, or the like can be used as the second source material.

Alternatively, a radical or the like can be used. For example, plasma obtained by supplying a source material to a plasma source or the like can be used. Specifically, an oxygen radical, a nitrogen radical, or the like can be used.

Note that the second source material used in combination with the first source material is preferably a source material that reacts with the first source material at a temperature close to room temperature. For example, a source material which reacts with the first source material at a temperature higher than or equal to room temperature and lower than or equal to 200° C., preferably higher than or equal to 50° C. and lower than or equal to 150° C., is preferable.
<<Evacuation Unit>>

The evacuation unit 315 has an evacuating function and is connected to the flow rate controller 312c. Note that a trap for capturing a source material to be evacuated may be provided between an outlet port 314 and the flow rate controller 312c. At that time, an evacuated gas is preferably removed by using a removal unit.
<<Control Portion>>

The control unit supplies the control signals for controlling the flow rate controllers, control signals for controlling the heating mechanism, or the like. For example, in a first step, the first source material is supplied to a surface of a process member 300. Then, in a second step, the second source material which reacts with the first source material is supplied. Accordingly, a reaction product of the first source material and the second source material can be deposited onto a surface of the process member 300.

The amount of the reaction product to be deposited onto the surface of the process member 300 can be controlled by repetition of the first step and the second step.

The amount of the first source material to be supplied to the process member 300 is limited to the maximum possible amount of adsorption on the surface of the process member 300. For example, conditions are selected so that a monomolecular layer of the first source material is formed on the surface of the process member 300, and the formed monomolecular layer of the first source material is reacted with the second source material, whereby a significantly uniform layer containing the reaction product of the first source material and the second source material can be formed.

As a result, a variety of materials can be deposited on the surface of the process member 300 even when the surface has a complicated structure. For example, a film with a thickness of greater than or equal to 3 nm and less than or equal to 200 nm can be formed on the process member 300.

For example, in the case where a small hole called a pinhole, a crack called a microcrack, or the like is formed in the surface of the process member 300, the pinhole or the microcrack can be filled by depositing material into the pinhole or the microcrack.

When the deposition apparatus ALD is used, a film to be deposited can have extremely high step coverage. Even in the case where the surface of the process member 300 has unevenness, a film with a uniform quality can be formed on the uneven surface.

The remainder of the first source material and the second source material are evacuated from the deposition chamber 310 with the use of the evacuation unit 315. For example, the evacuation may be performed while an inert gas such as argon or nitrogen is introduced.

<<Deposition Chamber>>

The deposition chamber 310 includes an inlet port 313 from which the first source material, the second source material, and the inert gas are supplied, and the outlet port 314 from which the first material, the second material, and the inert gas are evacuated.

The deposition chamber 310 includes a support portion 316 which has a function of supporting one or a plurality of process members 300, a heating mechanism 317 which has a function of heating the one or plurality of process members, and a door 318 which has a function of opening or closing to load and unload the one or plurality of process members 300.

For example, a resistive heater, an infrared lamp, or the like can be used as the heating mechanism 317.

The heating mechanism 317 has a function of heating up, for example, to 80° C. or higher, 100° C. or higher, or 150° C. or higher.

The heating mechanism 317 heats the one or plurality of process members 300 to a temperature higher than or equal to room temperature and lower than or equal to 200° C., preferably higher than or equal to 50° C. and lower than or equal to 150° C.

The deposition chamber 310 also includes a pressure regulator and a pressure detector.

<<Support Portion>>

The support portion 316 supports the one or plurality of process members 300. Thus, an insulating film, for example, can be formed over the one or the plurality of process members 300 in each treatment.

For the process member 300, in addition to a substrate, a touch panel, a display device, an input device, a touch panel to which a module such as an FPC is connected, or the like can be used.

Example of Film

Films which can be formed using the deposition apparatus ALD described in this embodiment will be described.

For example, a film containing an oxide, a nitride, a fluoride, a sulfide, a ternary compound, a metal, or a polymer can be formed.

For example, a material containing aluminum oxide, hafnium oxide, aluminum silicate, hafnium silicate, lanthanum oxide, silicon oxide, strontium titanate, tantalum oxide, titanium oxide, zinc oxide, niobium oxide, zirconium oxide, tin oxide, yttrium oxide, cerium oxide, scandium oxide, erbium oxide, vanadium oxide, indium oxide, or the like can be deposited.

For example, a material containing aluminum nitride, hafnium nitride, silicon nitride, tantalum nitride, titanium nitride, niobium nitride, molybdenum nitride, zirconium nitride, gallium nitride, or the like can be deposited.

For example, a material containing copper, platinum, ruthenium, tungsten, iridium, palladium, iron, cobalt, nickel, or the like can be deposited.

For example, a material containing zinc sulfide, strontium sulfide, calcium sulfide, lead sulfide, calcium fluoride, strontium fluoride, zinc fluoride, or the like can be deposited.

For example, a material that includes a nitride containing titanium and aluminum, an oxide containing titanium and aluminum, an oxide containing aluminum and zinc, a sulfide containing manganese and zinc, a sulfide containing cerium and strontium, an oxide containing erbium and aluminum, an oxide containing yttrium and zirconium, or the like can be deposited.

<<Film Containing Aluminum Oxide>>

For example, a gas obtained by vaporizing a source material containing an aluminum precursor compound can be used as the first source material. Specifically, trimethylaluminum (TMA, or $Al(CH_3)_3$ (chemical formula)), tris(dimethylamide)aluminum, triisobutylaluminum, and aluminum tris(2,2,6,6-tetramethyl-3,5-heptanedionate), or the like can be used.

Water vapor (chemical formula: $H_2O$) can be used as the second source material.

With the use of the deposition apparatus ALD, a film containing aluminum oxide can be formed from the first source material and the second source material <<Film Containing Hafnium Oxide>>

For example, a gas obtained by vaporizing a source material containing a hafnium precursor compound can be used as the first source material. Specifically, a source material containing hafnium amide such as tetrakis(dimethylamide)hafnium (TDMAH; chemical formula: $Hf[N(CH_3)_2]_4$) or tetrakis(ethylmethylamide)hafnium can be used.

Ozone can be used as the second source material.

With the use of the deposition apparatus ALD, a film containing hafnium oxide can be formed from the first source material and the second source material.

<<Film Containing Hafnium Tungsten>>

For example, a $WF_6$ gas can be used as the first source material.

A $B_2H_6$ gas, an $SiH_4$ gas, or the like can be used as the second source material.

With the use of the deposition apparatus ALD, a film containing tungsten can be formed from the first source material and second source material.

At least part of this embodiment can be implemented in combination with any of the other embodiments described in this specification as appropriate.

Embodiment 2

In this embodiment, examples of a driving method of an input device or an input/output device of one embodiment of the present invention are described with reference to drawings.

Example of Sensing Method of Sensor

Figure 31A:
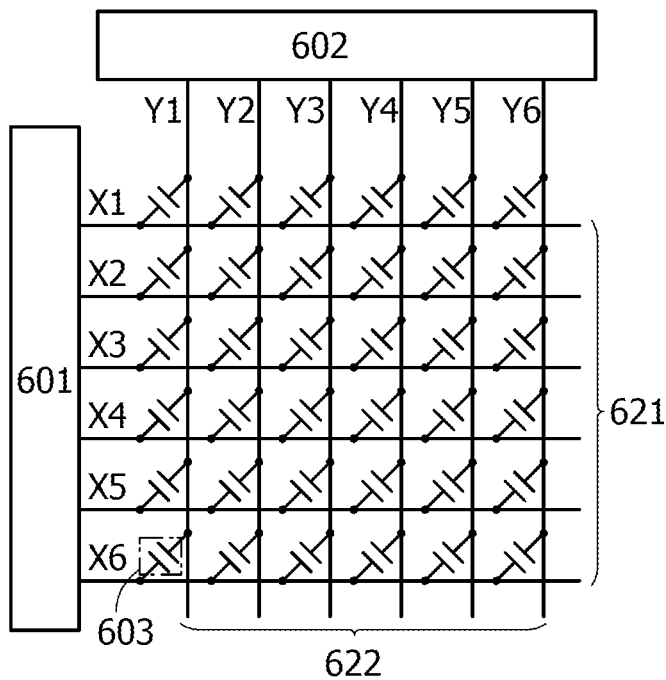
FIGS. 31A and 31B are a block diagram and a timing chart of a touch sensor of one embodiment.

FIG. 31A is a block diagram illustrating the structure of a mutual capacitive touch sensor. FIG. 31A illustrates a pulse voltage output circuit 601 and a current sensing circuit 602. Note that in FIG. 31A, six wirings X1 to X6 represent electrodes 621 to which a pulse voltage is applied, and six wirings Y1 to Y6 represent electrodes 622 that sense changes in current. FIG. 31A also illustrates a capacitor 603 that is formed where electrodes 621 and 622 overlap with each other. Note that functional replacement between the electrodes 621 and 622 is possible.

The pulse voltage output circuit 601 is a circuit for sequentially applying a pulse voltage to the wirings X1 to X6. By application of a pulse voltage to one of the wirings X1 to X6, an electric field is generated between the electrodes 621 and 622 of the capacitor 603. When the electric field between the electrodes is shielded, for example, a change occurs in the capacitance of the capacitor 603. The approach or contact of an object can be sensed by utilizing this change.

The current sensing circuit 602 is a circuit for sensing changes in current flowing through the wirings Y1 to Y6 that are caused by the change in the capacitance of the capacitor 603. No change in the current value is sensed in the wirings Y1 to Y6 when there is no approach or contact of an object, whereas a decrease in the current value is sensed when capacitance is decreased owing to the approach or contact of an object. Note that an integrator circuit or the like is used for sensing of the current values.

Figure 31B:
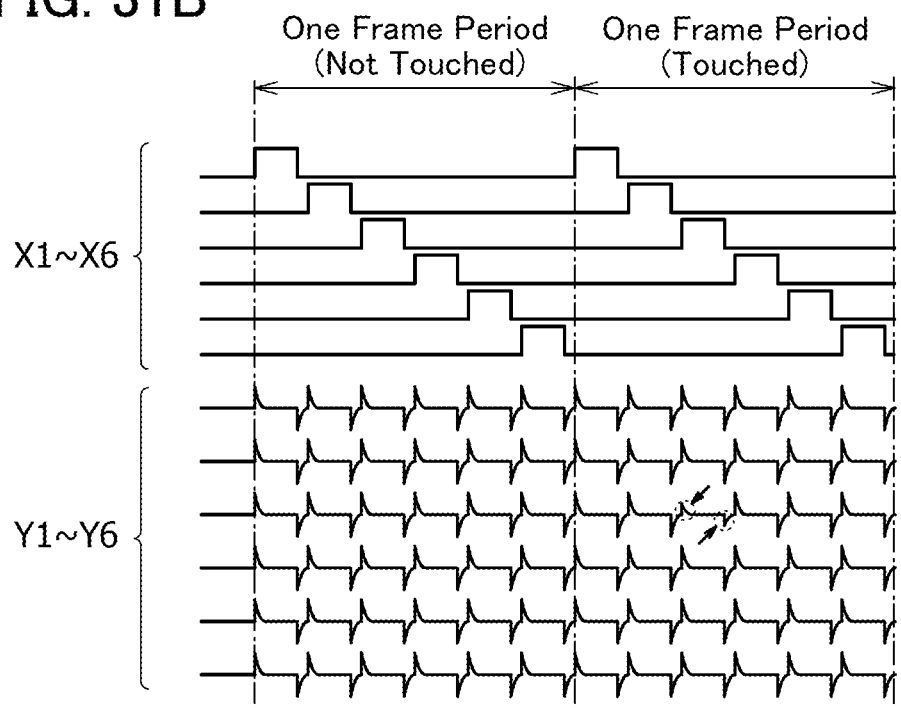

FIG. 31B is a timing chart showing input and output waveforms in the mutual capacitive touch sensor illustrated in FIG. 31A. In FIG. 31B, detection of an object is performed in all the rows and columns in one frame period. FIG. 31B shows a period when an object is not detected (not touched) and a period when an object is detected (touched). Sensed current values of the wirings Y1 to Y6 are shown as waveforms of voltage values.

A pulse voltage is sequentially applied to the wirings X1 to X6, and waveforms of the wirings Y1 to Y6 change in accordance with the pulse voltage. When there is no proximity or contact of an object, the waveforms of the wirings Y1 to Y6 change in accordance with changes in the voltages of the wirings X1 to X6. The current value is decreased at the point of approach or contact of the object and accordingly the waveform of the voltage value changes.

By sensing a change in mutual capacitance in this manner, proximity or contact of an object can be detected.

It is preferable that the pulse voltage output circuit 601 and the current sensing circuit 602 be mounted on a substrate in a housing of an electronic device or on the touch panel in the form of an IC. In the case where the touch panel has flexibility, parasitic capacitance might be increased in a bent portion of the touch panel, and the influence of noise might be increased. In view of this, it is preferable to use an IC to which a driving method less influenced by noise is applied. For example, it is preferable to use an IC to which a driving method capable of increasing a signal-noise ratio (S/N ratio) is applied.

Figure 32:
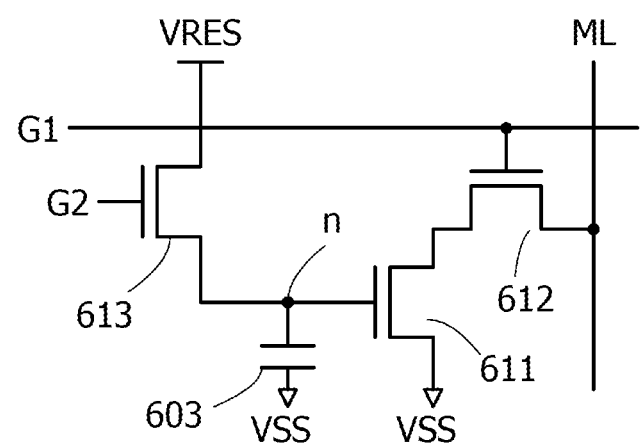
FIG. 32 is a circuit diagram of a touch sensor of one embodiment.

Although FIG. 31A is a passive matrix type touch sensor in which only the capacitor 603 is provided at the intersection portion of wirings as a touch sensor, an active matrix type touch sensor including a transistor and a capacitor may be used. FIG. 32 is a sensor circuit included in an active matrix type touch sensor.

The sensor circuit includes the capacitor 603 and transistors 611, 612, and 613. A signal G2 is input to a gate of the transistor 613. A voltage VRES is applied to one of a source and a drain of the transistor 613, and one electrode of the capacitor 603 and a gate of the transistor 611 are electrically connected to the other of the source and the drain of the transistor 613. One of a source and a drain of the transistor 611 is electrically connected to one of a source and a drain of the transistor 612, and a voltage VSS is applied to the other of the source and the drain of the transistor 611. A signal G1 is input to a gate of the transistor 612, and a wiring ML is electrically connected to the other of the source and the drain of the transistor 612. The voltage VSS is applied to the other electrode of the capacitor 603.

Next, the operation of the sensor circuit will be described. First, a potential for turning on the transistor 613 is supplied as the signal G2, and a potential with respect to the voltage VRES is thus applied to a node n connected to the gate of the transistor 611. Then, a potential for turning off the transistor 613 is applied as the signal G2, whereby the potential of the node n is maintained.

Then, capacitance of the capacitor 603 changes owing to the approach or contact of an object such as a finger, and accordingly the potential of the node n is changed from VRES.

In reading operation, a potential for turning on the transistor 612 is supplied as the signal G1. A current flowing through the transistor 611, that is, a current flowing through the wiring ML is changed in accordance with the potential of the node n. By sensing this current, the approach or contact of an object can be detected.

It is preferable that the transistors 611, 612, and 613 each include an oxide semiconductor in a semiconductor layer where a channel is formed. In particular, by using an oxide semiconductor in a semiconductor layer where a channel of the transistor 613 is formed, the potential of the node n can be held for a long time and the frequency of operation (refresh operation) of resupplying VRES to the node n can be reduced.

Structure Example of In-Cell Touchscreen

Although the examples where the electrodes in the touch sensor are formed over a substrate different from a substrate where the display element and the like are provided are described above, one or both of the pair of electrodes in the touch sensor may be formed over the substrate where the display element and the like are provided.

A structural example of a touch panel incorporating the touch sensor into a display portion including a plurality of pixels is described below. Here, an example where a liquid crystal element is used as a display element provided in the pixel is shown.

Figure 33A:
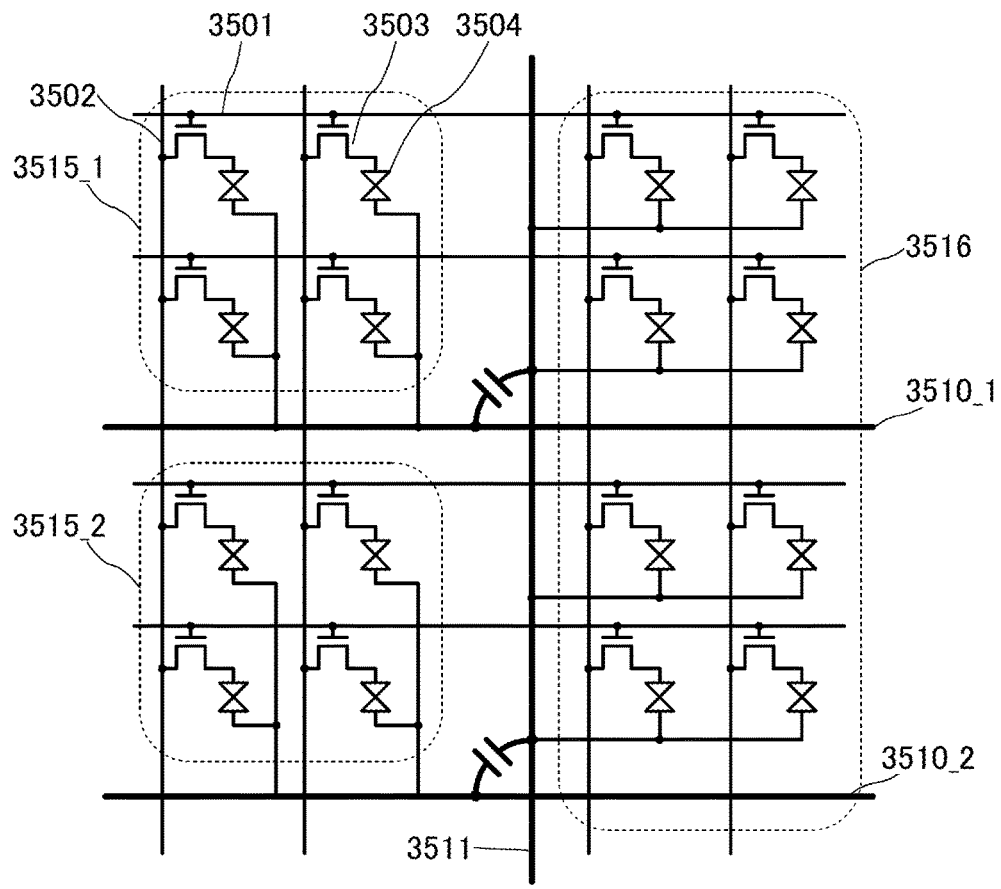
FIGS. 33A and 33B illustrate a pixel provided with a touch sensor of one embodiment.

FIG. 33A is an equivalent circuit diagram of part of a pixel circuit provided in the display portion of the touch panel in this structure example.

Each pixel includes at least a transistor 3503 and a liquid crystal element 3504. In addition, a gate of the transistor 3503 is electrically connected to a wiring 3501, and one of a source and a drain of the transistor 3503 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511). These wirings are provided to intersect with each other, and capacitance is formed therebetween.

Among the pixels provided in the pixel circuit, electrodes on one side of the liquid crystal elements of some pixels adjacent to each other are electrically connected to each other to form one block. The block is classified into two types: an island-shaped block (e.g., a block 3515_1 or a block 3515_2) and a linear block (e.g., a block 3516)

extending in the Y direction. Note that only part of the pixel circuit is illustrated in FIGS. 33A and 33B, but actually, these two kinds of blocks are repeatedly arranged in the X direction and the Y direction.

The wiring 3510_1 (or 3510_2) extending in the X direction is electrically connected to the island-shaped block 3515_1 (or the block 3515_2). Although not illustrated, the wiring 3510_1 extending in the X direction is electrically connected to a plurality of island-shaped blocks 3515_1 which are provided discontinuously along the X direction with the linear blocks therebetween. Further, the wiring 3511 extending in the Y direction is electrically connected to the linear block 3516.

Figure 33B:
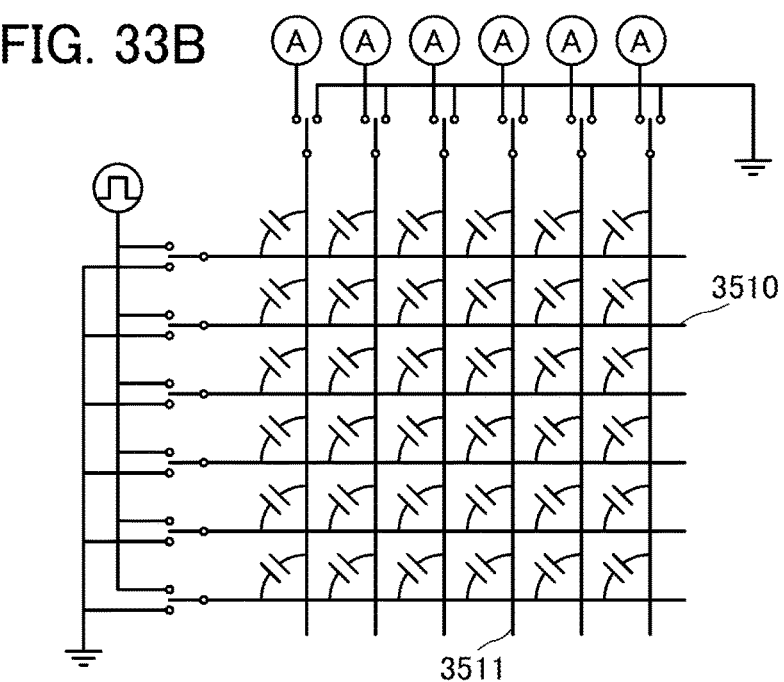

FIG. 33B is an equivalent circuit diagram illustrating the connection between a plurality of wirings 3510 extending in the X direction and the plurality of wirings 3511 extending in the Y direction. An input voltage or a common potential can be input to each of the wirings 3510 extending in the X direction. Further, a ground potential can be input to each of the wirings 3511 extending in the Y direction, or the wirings 3511 can be electrically connected to the sensing circuit.

Operation of the above-described touch panel is described with reference to FIGS. 34A and 34B.

Here, one frame period is divided into a writing period and a sensing period. The writing period is a period in which image data is written to a pixel, and the wirings 3501 (also referred to as gate lines or scan lines) are sequentially selected. On the other hand, the sensing period is a period in which sensing is performed by a touch sensor, and the wirings 3510 extending in the X direction are sequentially selected and an input voltage is input.

Figure 34A:
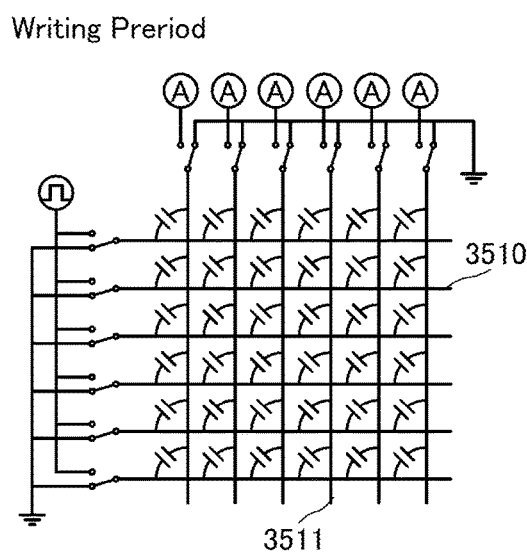
FIGS. 34A and 34B each illustrate operation of a touch sensor and a pixel of one embodiment.

FIG. 34A is an equivalent circuit diagram in the writing period. In the writing period, a common potential is input to both the wiring 3510 extending in the X direction and the wiring 3511 extending in the Y direction.

Figure 34B:
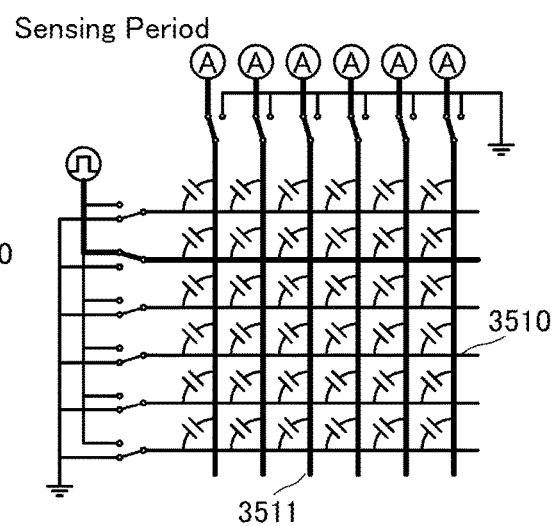

FIG. 34B is an equivalent circuit diagram at a certain point of time in the sensing period. In the sensing period, each of the wirings 3511 extending in the Y direction is electrically connected to the sensing circuit. An input voltage is input to the wirings 3510 extending in the X direction which are selected, and a common potential is input to the wirings 3510 extending in the X direction which are not selected.

Note that the driving method described here can be applied to not only an in-cell touch panel but also the above-described touch panels, and can be used in combination with the method described in the driving method example.

It is preferable that a period in which an image is written and a period in which sensing is performed by a touch sensor be separately provided as described above. Thus, a decrease in sensitivity of the touch sensor caused by noise generated when data is written to a pixel can be suppressed.

At least part of this embodiment can be implemented in combination with any of the other embodiments described in this specification as appropriate.

Embodiment 3

In this embodiment, electronic devices and lighting devices of one embodiment of the present invention will be described with reference to drawings.

Electronic devices and lighting devices can be manufactured by using the input device, the display device, or the input/output device of one embodiment of the present invention. Highly reliable electronic devices and lighting devices with curved surfaces can be manufactured by using the input device, the display device, or the input/output device of one embodiment of the present invention. In addition, flexible and highly reliable electronic devices and lighting devices can be manufactured by using the input device, the display device, or the input/output device of one embodiment of the present invention. Furthermore, electronic devices and lighting devices including touch sensors with improved detection sensitivity and sensing accuracy can be manufactured by using the input device or the input/output device of one embodiment of the present invention.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The electronic device or the lighting device of one embodiment of the present invention has flexibility and therefore can be incorporated along a curved inside/outside wall surface of a house or a building or a curved interior/exterior surface of a car.

Furthermore, the electronic device of one embodiment of the present invention may include a secondary battery. It is preferable that the secondary battery be capable of being charged by contactless power transmission.

As examples of the secondary battery, a lithium ion secondary battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include an antenna. When a signal is received by the antenna, the electronic device can display an image, data, or the like on a display portion. When the electronic device includes a secondary battery, the antenna may be used for contactless power transmission.

FIGS. 35A, 35B1, 35B2, 35C1, 35C2, 35D, and 35E illustrate examples of electronic devices including a display portion 7000 with a curved surface. The display surface of the display portion 7000 is bent, and images can be displayed on the bent display surface. The display portion 7000 may be flexible.

The display portion 7000 can be formed using the display device, the input/output device, or the like of one embodiment of the present invention. One embodiment of the present invention makes it possible to provide a highly reliable electronic device having a curved display portion.

FIG. 35A illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 illustrated in FIG. 35A includes a touch sensor in the display portion 7000. Moreover, operations such as making a call and inputting a letter can be performed by touch on the display portion 7000 with a finger, a stylus, or the like.

With the operation buttons 7103, power ON or OFF can be switched. In addition, types of images displayed on the display portion 7000 can be switched; for example, switching from a mail creation screen to a main menu screen can be performed.

FIG. 35B1 illustrates an example of a television set. In a television set 7200, the display portion 7000 is incorporated into a housing 7201. Here, the housing 7201 is supported by a stand 7203.

The television set 7200 illustrated in FIG. 35B1 can be operated with an operation switch of the housing 7201 or a separate remote controller 7211 (shown in FIG. 35B2). The display portion 7000 may include a touch sensor. The display portion 7000 can be operated by touching the display portion with a finger or the like. The remote controller 7211 may be provided with a display portion for displaying data output from the remote controller 7211. With operation keys or a touch panel of the remote controller 7211, channels and volume can be controlled and images displayed on the display portion 7000 can be controlled.

The television set 7200 is provided with a receiver, a modem, and the like. A general television broadcast can be received with the receiver. When the television set is connected to a communication network with or without wires via the modem, one-way (from a transmitter to a receiver) or two-way (between a transmitter and a receiver or between receivers) data communication can be performed.

FIGS. 35C1, 35C2, 35D, and 35E illustrate examples of a portable information terminal. Each of the portable information terminals includes a housing 7301 and the display portion 7000. Each of the portable information terminals may also include an operation button, an external connection port, a speaker, a microphone, an antenna, a battery, or the like. The display portion 7000 is provided with a touch sensor. An operation of the portable information terminal can be performed by touching the display portion 7000 with a finger, a stylus, or the like.

FIG. 35C1 is a perspective view of a portable information terminal 7300. FIG. 35C2 is a top view of the portable information terminal 7300. FIG. 35D is a perspective view of a portable information terminal 7310. FIG. 35E is a perspective view of a portable information terminal 7320.

Each of the portable information terminals illustrated in this embodiment functions as, for example, one or more of a telephone set, a notebook, and an information browsing system. Specifically, the portable information terminals each can be used as a smartphone. Each of the portable information terminals illustrated in this embodiment is capable of executing a variety of applications such as mobile phone calls, e-mailing, reading and editing texts, music reproduction, Internet communication, and a computer game, for example.

The portable information terminals 7300, 7310, and 7320 can display characters and image information on its plurality of surfaces. For example, as illustrated in FIGS. 35C1 and 35D, three operation buttons 7302 can be displayed on one surface, and information 7303 indicated by a rectangle can be displayed on another surface. FIGS. 35C1 and 35C2 illustrate an example in which information is displayed at the top of the portable information terminal. FIG. 35D illustrates an example in which information is displayed on the side of the portable information terminal. Information may be displayed on three or more surfaces of the portable information terminal. FIG. 35E illustrates an example where information 7304, information 7305, and information 7306 are displayed on different surfaces.

Examples of the information include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed instead of the information.

For example, a user of the portable information terminal 7300 can see the display (here, the information 7303) on the portable information terminal 7300 put in a breast pocket of his/her clothes.

Specifically, a caller's phone number, name, or the like of an incoming call is displayed in a position that can be seen from above the portable information terminal 7300. Thus, the user can see the display without taking out the portable information terminal 7300 from the pocket and decide whether to answer the call.

FIGS. 35F to 35H each illustrate an example of a lighting device having a curved light-emitting portion.

The light-emitting portion included in each of the lighting devices illustrated in FIGS. 35F to 35H can be manufactured using the display device, the input/output device, or the like of one embodiment of the present invention. According to one embodiment of the present invention, a highly reliable lighting device having a curved light-emitting portion can be provided.

A lighting device 7400 illustrated in FIG. 35F includes a light-emitting portion 7402 with a wave-shaped light-emitting surface and thus is a good-design lighting device.

A light-emitting portion 7412 included in a lighting device 7410 illustrated in FIG. 35G has two convex-curved light-emitting portions symmetrically placed. Thus, all directions can be illuminated with the lighting device 7410 as a center.

A lighting device 7420 illustrated in FIG. 35H includes a concave-curved light-emitting portion 7422. This is suitable for illuminating a specific range because light emitted from the concave-curved light-emitting portion 7422 is collected to the front of the lighting device 7420. In addition, with this structure, a shadow is less likely to be produced.

The light-emitting portion included in each of the lighting devices 7400, 7410 and 7420 may be flexible. The light-emitting portion may be fixed on a plastic member, a movable frame, or the like so that a light-emitting surface of the light-emitting portion can be bent freely depending on the intended use.

The lighting devices 7400, 7410, and 7420 each include a stage 7401 provided with an operation switch 7403 and the light-emitting portion supported by the stage 7401.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a concave shape, whereby a particular region can be brightly illuminated, or the light-emitting surface is curved to have a convex shape, whereby a whole room can be brightly illuminated.

FIGS. 36A1, 36A2, 36B, 36C, 36D, 36E, 36F, 36G, 36H, and 36I each illustrate an example of a portable information terminal including a display portion 7001 having flexibility.

The display portion 7001 is manufactured using the display device, the input/output device, or the like of one embodiment of the present invention. For example, a display device, or an input/output device that can be bent with a radius of curvature of greater than or equal to 0.01 mm and less than or equal to 150 mm can be used. The display portion 7001 may include a touch sensor so that the portable information terminal can be operated by touching the display portion 7001 with a finger or the like. One embodiment of the present invention makes it possible to provide a highly reliable electronic device including a display portion having flexibility.

FIGS. 36A1 and 36A2 are a perspective view and a side view illustrating an example of the portable information terminal, respectively. A portable information terminal 7500 includes a housing 7501, the display portion 7001, a display portion tab 7502, operation buttons 7503, and the like.

The portable information terminal 7500 includes a rolled flexible display portion 7001 in the housing 7501.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal or power can be directly supplied from the outside with a wiring.

By pressing the operation buttons 7503, power ON/OFF, switching of displayed videos, and the like can be performed. Although FIGS. 36A1, 36A2, and 36B illustrate an example where the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

FIG. 36B illustrates the portable information terminal 7500 in a state where the display portion 7001 is pulled out with the display portion tab 7502. Videos can be displayed on the display portion 7001 in this state. In addition, the portable information terminal 7500 may perform different displays in the state where part of the display portion 7001 is rolled as shown in FIG. 36A1 and in the state where the display portion 7001 is pulled out with the display portion tab 7502 as shown in FIG. 36B. For example, in the state shown in FIG. 36A1, the rolled portion of the display portion 7001 is put in a non-display state, which results in a reduction in power consumption of the portable information terminal 7500.

A reinforcement frame may be provided for a side portion of the display portion 7001 so that the display portion 7001 has a flat display surface when pulled out.

Note that in addition to this structure, a speaker may be provided for the housing so that sound is output with an audio signal received together with a video signal.

FIGS. 36C to 36E illustrate an example of a foldable portable information terminal. FIG. 36C illustrates a portable information terminal 7600 that is opened. FIG. 36D illustrates the portable information terminal 7600 that is being opened or being folded. FIG. 36E illustrates the portable information terminal 7600 that is folded. The portable information terminal 7600 is highly portable when folded, and is highly browsable when opened because of a seamless large display area.

The display portion 7001 is supported by three housings 7601 joined together by hinges 7602. By folding the portable information terminal 7600 at a connection portion between two housings 7601 with the hinges 7602, the portable information terminal 7600 can be reversibly changed in shape from an opened state to a folded state.

FIGS. 36F and 36G illustrate an example of a foldable portable information terminal. FIG. 36F illustrates a portable information terminal 7650 that is folded so that the display portion 7001 is on the inside. FIG. 36G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged.

FIG. 36H illustrates an example of a flexible portable information terminal. A portable information terminal 7700 includes a housing 7701 and the display portion 7001. The portable information terminal 7700 may include buttons 7703a and 7703b which serve as input means, speakers 7704a and 7704b which serve as sound output means, an external connection port 7705, a microphone 7706, or the like. A flexible battery 7709 can be included in the portable information terminal 7700. The battery 7709 may be arranged to overlap with the display portion 7001, for example.

The housing 7701, the display portion 7001, the battery 7709 are flexible. Thus, it is easy to curve the portable information terminal 7700 into a desired shape or to twist the portable information terminal 7700. For example, the portable information terminal 7700 can be folded so that the display portion 7001 is on the inside or on the outside. The portable information terminal 7700 can be used in a rolled state. Since the housing 7701 and the display portion 7001 can be transformed freely in this manner, the portable information terminal 7700 is less likely to be broken even when the portable information terminal 7700 falls down or external stress is applied to the portable information terminal 7700.

The portable information terminal 7700 can be used conveniently in various situations because the portable information terminal 7700 is lightweight. For example, the portable information terminal 7700 can be used in the state where the upper portion of the housing 7701 is suspended by a clip or the like, or in the state where the housing 7701 is fixed to a wall by magnets or the like.

FIG. 36I illustrates an example of a wrist-watch-type portable information terminal. The portable information terminal 7800 includes a band 7801, the display portion 7001, an input-output terminal 7802, operation buttons 7803, and the like. The band 7801 has a function of a housing. A flexible battery 7805 can be included in the portable information terminal 7800. The battery 7805 may overlap with the display portion 7001 and the band 7801, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of silent mode, and setting and cancellation of power saving mode can be performed. For example, the functions of the operation buttons 7803 can be set freely by the operating system incorporated in the portable information terminal 7800.

By touching an icon 7804 displayed on the display portion 7001 with a finger or the like, application can be started.

The portable information terminal 7800 can employ near field communication conformable to a communication standard. In that case, for example, mutual communication between the portable information terminal and a headset capable of wireless communication can be performed, and thus hands-free calling is possible.

The portable information terminal 7800 may include the input-output terminal 7802. In the case where the input-output terminal 7802 is included in the portable information terminal 7800, data can be directly transmitted to and received from another information terminal via a connector. Charging through the input-output terminal 7802 is also possible. Note that charging of the portable information terminal described as an example in this embodiment can be performed by contactless power transmission without using the input-output terminal.

Figure 37A:
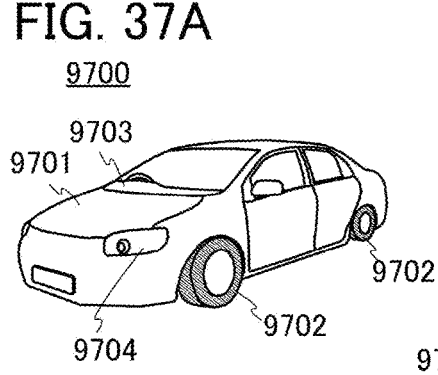
FIGS. 37A to 37E illustrate examples of electronic devices of embodiments.
Figure 37B:
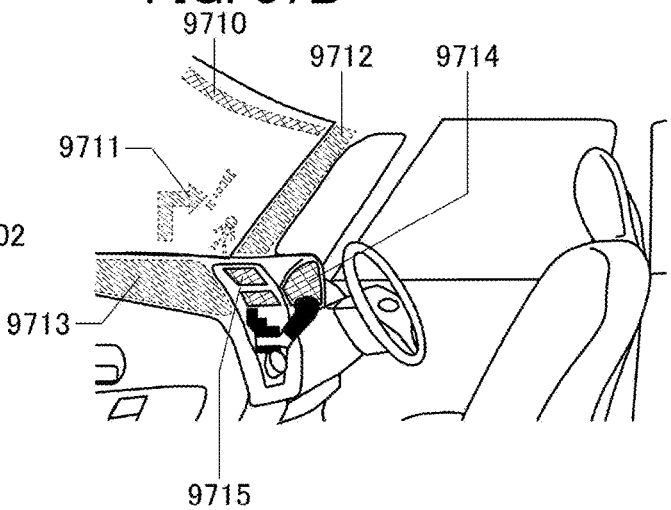

FIG. 37A is an external view of an automobile 9700. FIG. 37B illustrates a driver's seat of the automobile 9700. The automobile 9700 includes a car body 9701, wheels 9702, a dashboard 9703, lights 9704, and the like. The display device or the input/output device of one embodiment of the present invention can be used in a display portion or the like of the automobile 9700. For example, the display device or the input/output device of one embodiment of the present invention can be used in display portions 9710 to 9715 illustrated in FIG. 37B.

The display portion 9710 and the display portion 9711 are display devices or input/output devices provided in an automobile windshield. The display device or input/output device of one embodiment of the present invention can be a see-through display device or input/output device, through which the opposite side can be seen, by using a light-transmitting conductive material for its electrodes. Such a see-through display device or input/output device does not hinder driver's vision during the driving of the automobile 9700. Therefore, the display device or input/output device of one embodiment of the present invention can be provided in the windshield of the automobile 9700. Note that in the case where a transistor or the like for driving the display device or input/output device is provided in the display device or input/output device, a transistor having light-transmitting properties, such as an organic transistor using an organic semiconductor material or a transistor using an oxide semiconductor, is preferably used.

The display portion 9712 is a display device or input/output device provided on a pillar portion. For example, an image taken by an imaging unit provided in the car body is displayed on the display portion 9712, whereby the view hindered by the pillar portion can be compensated. The display portion 9713 is a display device or an input device provided on the dashboard. For example, an image taken by an imaging unit provided in the car body is displayed on the display portion 9713, whereby the view hindered by the dashboard can be compensated. That is, by displaying an image taken by an imaging unit provided on the outside of the automobile, blind areas can be eliminated and safety can be increased. Displaying an image to compensate for the area which a driver cannot see makes it possible for the driver to confirm safety easily and comfortably.

Figure 37C:
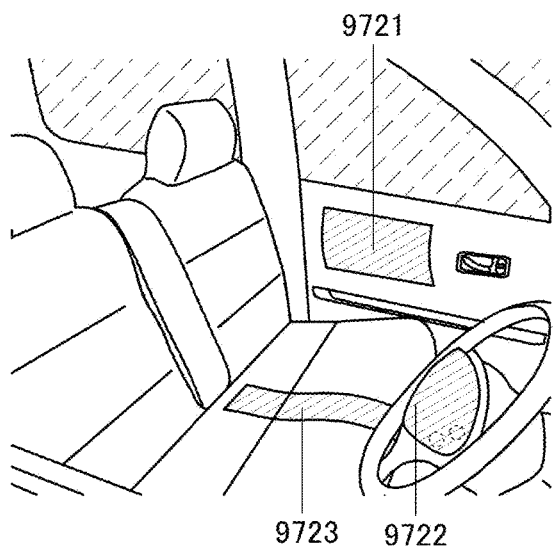

FIG. 37C illustrates the inside of a car in which a bench seat is used as a driver seat and a front passenger seat. A display portion 9721 is a display device or input/output device provided in a door portion. For example, the display portion 9721 can compensate for the view hindered by the door portion by showing an image taken by an imaging unit provided on the car body. A display portion 9722 is a display device or input/output device provided in a steering wheel. A display portion 9723 is a display device or input/output device provided in the middle of a seating face of the bench seat. Note that the display device or input/output device can be used as a seat heater by providing the display device or input/output device on the seating face or backrest and by using heat generated by the display device or input/output device as a heat source.

The display portion 9714, the display portion 9715, and the display portion 9722 can provide a variety of kinds of information such as navigation data, a speedometer, a tachometer, a mileage, a fuel meter, a gearshift indicator, and air-condition setting. The content, layout, or the like of the display on the display portions can be changed freely by a user as appropriate. The information listed above can also be displayed on the display portions 9710 to 9713, 9721, and 9723. The display portions 9710 to 9715 and 9721 to 9723 can also be used as lighting devices. The display portions 9710 to 9715 and 9721 to 9723 can also be used as heating devices.

The display portions each including the display device or input/output device of one embodiment of the present invention can be flat, in which case the display device or input/output device of one embodiment of the present invention does not necessarily have a curved surface or flexibility.

Figure 37D:
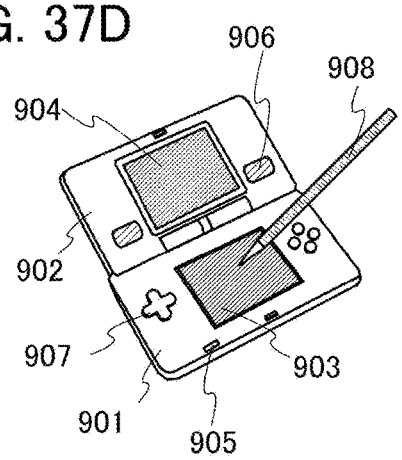

FIG. 37D illustrates a portable game machine including a housing 901, a housing 902, a display portion 903, a display portion 904, a microphone 905, a speaker 906, an operation button 907, a stylus 908, and the like.

The portable game machine illustrated in FIG. 37D includes two display portions 903 and 904. Note that the number of display portions of an electronic device of one embodiment of the present invention is not limited to two and can be one or three or more as long as at least one display portion includes the display device or input/output device of one embodiment of the present invention.

Figure 37E:
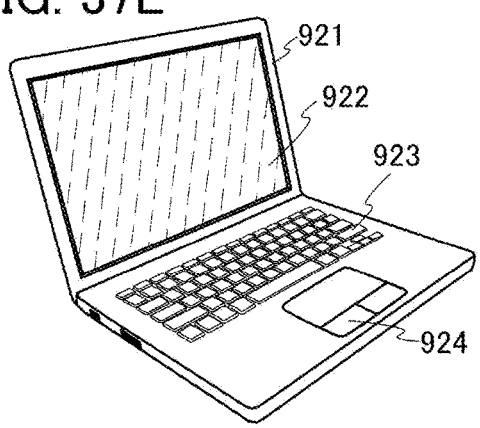

FIG. 37E illustrates a laptop personal computer, which includes a housing 921, a display portion 922, a keyboard 923, a pointing device 924, and the like.

The display device or input/output device of one embodiment of the present invention can be used in the display portion 922.

Figure 38A:
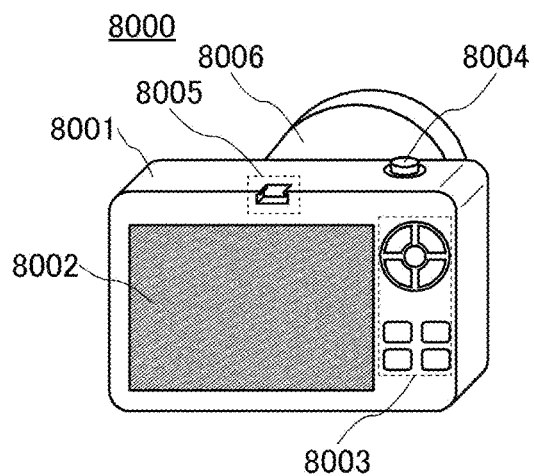
FIGS. 38A to 38C illustrate examples of electronic devices of embodiments.

FIG. 38A is an external view of a camera 8000. The camera 8000 includes a housing 8001, a display portion 8002, an operation button 8003, a shutter button 8004, a connection portion 8005, and the like. A lens 8006 can be put on the camera 8000.

The connection portion 8005 includes an electrode to connect with a finder 8100, which is described below, a stroboscope, or the like.

Although the lens 8006 of the camera 8000 here is detachable from the housing 8001 for replacement, the lens 8006 may be included in the housing.

Images can be taken by touching the shutter button 8004. In addition, images can be taken by touching the display portion 8002 which serves as a touch panel.

The display device or input/output device of one embodiment of the present invention can be used in the display portion 8002.

Figure 38B:
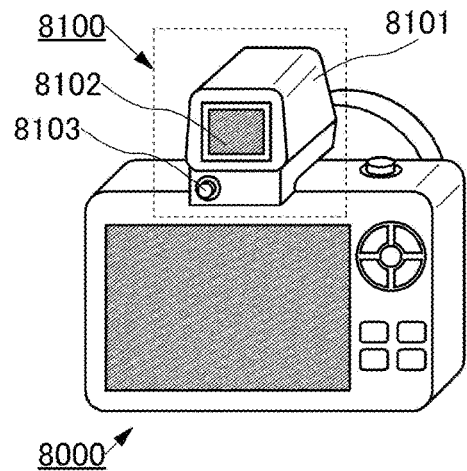

FIG. 38B shows the camera 8000 with the finder 8100 connected.

The finder 8100 includes a housing 8101, a display portion 8102, and a button 8103.

The housing 8101 includes a connection portion for the connection portion 8005 of the camera 8000, and the finder 8100 can be connected to the camera 8000. The connection portion includes an electrode, and an image or the like received from the camera 8000 through the electrode can be displayed on the display portion 8102.

The button 8103 has a function of a power button, and the display portion 8102 can be turned on and off with the button 8103.

The display device or input/output device of one embodiment of the present invention can be used in the display portion 8102.

Although the camera 8000 and the finder 8100 are separate and detachable electronic devices in FIGS. 38A and 38B, the housing 8001 of the camera 8000 may include a finder having the display device or input/output device of one embodiment of the present invention.

Figure 38C:
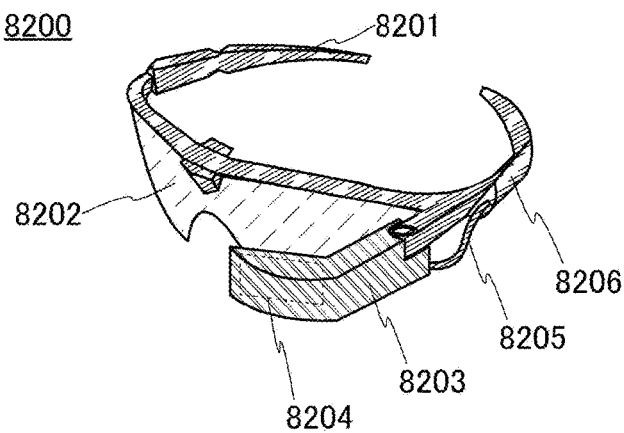

FIG. 38C illustrates an external view of a head-mounted display 8200.

The head-mounted display 8200 includes a mounting portion 8201, a lens 8202, a main body 8203, a display portion 8204, a cable 8205, and the like. The mounting portion 8201 includes a battery 8206.

Power is supplied from the battery 8206 to the main body 8203 through the cable 8205. The main body 8203 includes a wireless receiver or the like to receive video data, such as image data, and display it on the display portion 8204. In addition, the movement of the eyeball and the eyelid of a user can be captured by a camera in the main body 8203 and then coordinates of the points the user looks at can be calculated using the captured data to utilize the eye of the user as an input means.

The mounting portion 8201 may include a plurality of electrodes so as to be in contact with the user. The main body 8203 may be configured to sense current flowing through the electrodes with the movement of the user's eyeball to recognize the direction of his or her eyes. The main body 8203 may be configured to sense current flowing through the electrodes to monitor the user's pulse. The mounting portion 8201 may include sensors, such as a temperature sensor, a pressure sensor, or an acceleration sensor so that the user's biological information can be displayed on the display portion 8204. The main body 8203 may be configured to sense the movement of the user's head or the like to move an image displayed on the display portion 8204 in synchronization with the movement of the user's head or the like.

The display device or input/output device of one embodiment of the present invention can be used in the display portion 8204.

At least part of this embodiment can be implemented in combination with any of the other embodiments described in this specification as appropriate.

This application is based on Japanese Patent Application serial no. 2014-243346 filed with Japan Patent Office on Dec. 1, 2014, the entire contents of which are hereby incorporated by reference.

What is claimed is:

1. A touch panel comprising:
    a first conductive layer;
    a second conductive layer;
    a third conductive layer;
    a fourth conductive layer;
    a fifth conductive layer; and
    a display portion,
    wherein the display portion comprises an outline including a portion parallel to a first direction and a portion parallel to a second direction intersecting with the first direction,
    wherein the display portion includes a plurality of display elements,
    wherein the plurality of display elements is arranged at regular intervals in the first direction and the second direction,
    wherein the first to the fourth conductive layers and the display portion partly overlap with each other,
    wherein the first conductive layer and the second conductive layer are arranged in the first direction,
    wherein the third conductive layer and the fourth conductive layer are arranged in the first direction,
    wherein the first conductive layer and the third conductive layer are arranged in the second direction,
    wherein the second conductive layer and the fourth conductive layer are arranged in the second direction,
    wherein the first conductive layer and the fourth conductive layer are electrically connected to each other through a first connection portion,
    wherein the second conductive layer and the third conductive layer are electrically connected to each other through a second connection portion,
    wherein the first connection portion and the second connection portion intersect with each other,
    wherein the fifth conductive layer is positioned on a side opposite to the first conductive layer with the fourth conductive layer provided therebetween, and
    wherein the fourth conductive layer and the fifth conductive layer are electrically connected to each other through a third connection portion.

2. The touch panel according to claim 1,
    wherein the first to the fourth conductive layers each comprises an outline partly including a first portion that is linear and parallel to the first direction and a second portion that is linear and parallel to the second direction in a plan view,
    wherein the second portion of the first conductive layer and the second portion of the second conductive layer are provided to face each other,
    wherein the first portion of the first conductive layer and the first portion of the third conductive layer are provided to face each other, and
    wherein the first portion of the second conductive layer and the first portion of the fourth conductive layer are provided to face each other.

3. The touch panel according to claim 1,
    wherein the fifth conductive layer is positioned with the third conductive layer provided between the fifth conductive layer and the first conductive layer.

4. The touch panel according to any one of claim 1,
    wherein the first to the fourth conductive layers each comprises a lattice shape where first striped portions and second striped portions are parallel to the first direction and the second direction, respectively,
    wherein opening portions are provided between the first striped portions and the second striped portions, and
    wherein opening portions overlap with the plurality of display elements.

5. The touch panel according to claim 1, further comprising a first substrate and a second substrate,
    wherein the first to the fourth conductive layers and the plurality of display elements are positioned between the first substrate and the second substrate.

6. The touch panel according to claim 1,
    wherein one of the first connection portion and the second connection portion and the first to the fourth conductive layers are formed on a same surface.

7. The touch panel according to claim 1,
    wherein the first conductive layer, the fourth conductive layer, and the first connection portion are formed on a first surface, and
    wherein the second conductive layer, the third conductive layer, and the second connection portion are formed on a second surface.

8. The touch panel according to claim 1,
    wherein distances between the first conductive layer and the second conductive layer and between the first conductive layer and the third conductive layer are each greater than or equal to 1 µm and less than or equal to 10 mm.

9. A touch panel module comprising the touch panel according to claim 1, and an FPC.

10. An electronic device comprising:
the touch panel according to claim 1 or the touch panel module according to claim 9, and
at least one of an antenna, a button, a battery, a speaker, a microphone, and a lens.

11. A touch panel comprising:
a first electrode;
a second electrode;
a third electrode;
a fourth electrode; and
a display portion,
wherein the display portion comprises an outline including a portion parallel to a first direction and a portion parallel to a second direction intersecting with the first direction,
wherein the display portion includes a plurality of display elements,
wherein the plurality of display elements is arranged at regular intervals in the first direction and the second direction,
wherein the first to the fourth electrode and the display portion partly overlap with each other,
wherein the first to the fourth electrode are in contact with an insulator layer,
wherein the first electrode and the second electrode are arranged in the first direction,
wherein the third electrode and the fourth electrode are arranged in the first direction,
wherein the first electrode and the third electrode are arranged in the second direction,
wherein the second electrode and the fourth electrode are arranged in the second direction,
wherein the first electrode and the fourth electrode are electrically connected to each other through a first connection portion,
wherein the second electrode and the third electrode are electrically connected to each other through a second connection portion, and
wherein the first connection portion and the second connection portion intersect with each other.

12. The touch panel according to claim 11,
wherein distances between the first electrode and the second electrode and between the first electrode and the third electrode are each greater than or equal to 1 μm and less than or equal to 10 mm.

13. A touch panel comprising:
a first electrode;
a second electrode;
a third electrode;
a fourth electrode; and
a display portion,
wherein the display portion comprises an outline including a portion parallel to a first direction and a portion parallel to a second direction intersecting with the first direction,
wherein the display portion includes a plurality of display elements,
wherein the plurality of display elements is arranged at regular intervals in the first direction and the second direction,
wherein the first to the fourth electrode and the display portion partly overlap with each other,
wherein the first electrode and the fourth electrode are in contact with a first insulator layer,
wherein the second electrode and the third electrode are in contact with a second insulator layer,
wherein the first electrode and the second electrode are arranged in the first direction,
wherein the third electrode and the fourth electrode are arranged in the first direction,
wherein the first electrode and the third electrode are arranged in the second direction,
wherein the second electrode and the fourth electrode are arranged in the second direction,
wherein the first electrode and the fourth electrode are electrically connected to each other through a first connection portion,
wherein the second electrode and the third electrode are electrically connected to each other through a second connection portion, and
wherein the first connection portion and the second connection portion intersect with each other.

14. The touch panel according to claim 13,
wherein distances between the first electrode and the second electrode and between the first electrode and the third electrode are each greater than or equal to 1 μm and less than or equal to 10 mm.

* * * * *